US011287677B2

(12) United States Patent
Ihas et al.

(10) Patent No.: US 11,287,677 B2
(45) Date of Patent: Mar. 29, 2022

(54) OPTICAL STACK FOR PRIVACY DISPLAY

(71) Applicant: ReaID Spark, LLC, Beverly Hills, CA (US)

(72) Inventors: Ben Ihas, Boulder, CO (US); Robert A. Ramsey, Boulder, CO (US); Graham J. Woodgate, Henley-on-Thames (GB); Jonathan Harrold, Leamington Spa (GB); Michael G. Robinson, Boulder, CO (US)

(73) Assignee: ReaID Spark, LLC, Beverly Hills, CA (US)

( * ) Notice: Subject to any disclaimer, the term of this patent is extended or adjusted under 35 U.S.C. 154(b) by 245 days.

(21) Appl. No.: 16/713,544

(22) Filed: Dec. 13, 2019

(65) Prior Publication Data

US 2020/0218101 A1 Jul. 9, 2020

Related U.S. Application Data

(60) Provisional application No. 62/882,022, filed on Aug. 2, 2019, provisional application No. 62/789,305, filed on Jan. 7, 2019.

(51) Int. Cl.
*G02F 1/13* (2006.01)
*G02F 1/01* (2006.01)
*F21V 8/00* (2006.01)

(52) U.S. Cl.
CPC ......... *G02F 1/1323* (2013.01); *G02B 6/0053* (2013.01); *G02B 6/0068* (2013.01); *G02F 1/0136* (2013.01)

(58) Field of Classification Search
CPC ... G02F 1/1323; G02F 1/0136; G02B 6/0053; G02B 6/0068
USPC ................................................... 359/489.07
See application file for complete search history.

(56) References Cited

U.S. PATENT DOCUMENTS

| 3,914,022 A | 10/1975 | Kashnow |
| 4,059,916 A | 11/1977 | Tachihara et al. |
| 4,621,898 A | 11/1986 | Cohen |
| 4,974,941 A | 12/1990 | Gibbons et al. |
| 5,005,108 A | 4/1991 | Pristash et al. |
| 5,035,491 A | 7/1991 | Kawagishi et al. |

(Continued)

FOREIGN PATENT DOCUMENTS

| CA | 2222313 A1 | 6/1998 |
| CN | 1125943 C | 10/2003 |

(Continued)

OTHER PUBLICATIONS

CN201880042320.X Notification of the First Office Action dated May 25, 2021.

(Continued)

*Primary Examiner* — Bryon T Gyllstrom
(74) *Attorney, Agent, or Firm* — Penny L. Lowry

(57) ABSTRACT

A display apparatus comprises at least one spatial light modulator and at least one curved view angle control element that comprises plural retarders arranged between the display polariser of each spatial light modulator, and an additional polariser. The curvature of the view angle control element provides increased luminance uniformity for a head-on user and increased visual security to an off-axis snooper.

31 Claims, 31 Drawing Sheets

(56) References Cited

U.S. PATENT DOCUMENTS

| | | |
|---|---|---|
| 5,126,882 A | 6/1992 | Oe et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 | 3/2001 | Tillin et al. |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 7,067,985 B2 | 6/2006 | Adachi |
| 7,072,096 B2 * | 7/2006 | Holman ............ G02B 27/1026 359/298 |
| 7,163,319 B2 | 1/2007 | Kuo et al. |
| 7,227,602 B2 | 6/2007 | Jeon et al. |
| 7,366,392 B2 | 4/2008 | Honma et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 * | 6/2013 | Weber ........................ F21V 7/04 362/609 |
| 8,646,931 B2 | 2/2014 | Choi et al. |
| 8,801,260 B2 | 8/2014 | Urano et al. |
| 8,848,132 B2 * | 9/2014 | O'Neill ................ G02B 6/0096 349/64 |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 * | 1/2017 | Wheatley ............ G02B 6/0046 |
| 10,054,732 B2 | 8/2018 | Robinson et al. |
| 10,126,575 B1 | 11/2018 | Robinson et al. |
| 10,303,030 B2 | 5/2019 | Robinson et al. |
| 10,401,638 B2 | 9/2019 | Robinson et al. |
| 10,488,705 B2 | 11/2019 | Xu et al. |
| 10,527,775 B2 | 1/2020 | Yang et al. |
| 10,649,248 B1 | 5/2020 | Jiang et al. |
| 10,649,259 B2 | 5/2020 | Lee et al. |
| 10,935,714 B2 | 3/2021 | Woodgate et al. |
| 11,016,341 B2 * | 5/2021 | Robinson ................ F21K 9/64 |
| 11,070,791 B2 | 7/2021 | Woodgate et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0171793 A1 | 11/2002 | Sharp et al. |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0214615 A1 | 11/2003 | Colgan et al. |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0240777 A1 | 12/2004 | Woodgate et al. |
| 2004/0264910 A1 | 12/2004 | Suzuki et al. |
| 2005/0002174 A1 | 1/2005 | Min et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0213348 A1 | 9/2005 | Parikka et al. |
| 2005/0219693 A1 | 10/2005 | Hartkop et al. |
| 2005/0270798 A1 | 12/2005 | Lee et al. |
| 2006/0066785 A1 | 3/2006 | Moriya |
| 2006/0082702 A1 | 4/2006 | Jacobs et al. |
| 2006/0098296 A1 | 5/2006 | Woodgate et al. |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0139772 A1 | 6/2007 | Wang |
| 2007/0223251 A1 | 9/2007 | Liao |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 * | 8/2008 | Ohta .................... G02B 27/285 362/311.06 |
| 2008/0285310 A1 | 11/2008 | Aylward et al. |
| 2008/0316198 A1 | 12/2008 | Fukushima et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0205667 A1 | 8/2010 | Anderson et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0176089 A1 | 7/2011 | Ishikawa et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |

(56) References Cited

U.S. PATENT DOCUMENTS

| | | |
|---|---|---|
| 2012/0086875 A1 | 4/2012 | Yokota |
| 2012/0127573 A1 | 5/2012 | Robinson et al. |
| 2012/0147280 A1 | 6/2012 | Osterman et al. |
| 2012/0188792 A1 | 7/2012 | Matsumoto et al. |
| 2012/0212414 A1* | 8/2012 | Osterhout ............... G06F 3/011 345/158 |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0201844 A1 | 7/2014 | Buck |
| 2014/0211125 A1 | 7/2014 | Kurata |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293289 A1 | 10/2015 | Shinohara et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1* | 12/2015 | Kao ................... G02F 1/13338 349/12 |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0090103 A1 | 3/2017 | Holman |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1* | 11/2018 | Robinson .......... G02F 1/133602 |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196235 A1 | 6/2019 | Robinson et al. |
| 2019/0196236 A1* | 6/2019 | Chen .................. G02F 1/13363 |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1* | 9/2019 | Sakai .................... H01L 27/322 |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2019/0361165 A1 | 11/2019 | Chang et al. |
| 2020/0026125 A1* | 1/2020 | Robinson ............. G02B 27/288 |
| 2020/0159055 A1 | 5/2020 | Robinson et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2021/0149233 A1 | 5/2021 | Robinson et al. |

FOREIGN PATENT DOCUMENTS

| | | |
|---|---|---|
| CN | 1776484 A | 5/2006 |
| CN | 101256251 A | 9/2008 |
| CN | 101518095 A | 8/2009 |
| CN | 101681061 A | 3/2010 |
| CN | 103473494 A | 12/2013 |
| CN | 104133292 A | 11/2014 |
| CN | 104303085 A | 1/2015 |
| CN | 104321686 A | 1/2015 |
| CN | 104380177 A | 2/2015 |
| CN | 204740413 U | 11/2015 |
| CN | 106104372 A | 11/2016 |
| CN | 106415342 A | 2/2017 |

(56) References Cited

FOREIGN PATENT DOCUMENTS

| | | |
|---|---|---|
| CN | 209171779 U | 7/2019 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | H01130783 U | 9/1989 |
| JP | H11174489 A | 7/1999 |
| JP | 2007148279 A | 6/2007 |
| JP | 2007273288 A | 10/2007 |
| KR | 20120011228 A | 2/2012 |
| KR | 101990286 B1 | 6/2019 |
| TW | M537663 U | 3/2017 |
| TW | I612360 B | 1/2018 |
| WO | 2005071449 A2 | 8/2005 |
| WO | 2010021926 A2 | 2/2010 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2018035492 A1 | 2/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

EP-18855604.7 Extended European Search Report of European Patent Office dated Jun. 1, 2021.
EP-18857077.4 Extended European Search Report of European Patent Office dated Jun. 16, 2021.
PCT/US2021/029937 International search report and written opinion of the international searching authority dated Aug. 6, 2021.
PCT/US2021/029944 International search report and written opinion of the international searching authority dated Aug. 3, 2021.
PCT/US2021/029947 International search report and written opinion of the international searching authority dated Aug. 10, 2021.
PCT/US2021/029954 International search report and written opinion of the international searching authority dated Aug. 10, 2021.
PCT/US2021/029958 International search report and written opinion of the international searching authority dated Aug. 10, 2021.
Adachi, et al. "P-228L: Late-News Poster: Controllable Viewing-Angle Displays using a Hybrid Aligned Nematic Liquid Crystal Cell", ISSN, SID 2006 Digest, pp. 705-708.
Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
CN201780030715.3 Notification of the First Office Action dated Jan. 21, 2020.
EP-16860628.3 Extended European Search Report of European Patent Office dated Apr. 26, 2019.
EP-17799963.8 Extended European Search Report of European Patent Office dated Oct. 9, 2019.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
Kalantar, et al. "Backlight Unit With Double Surface Light Emission," J. Soc. Inf. Display, vol. 12, Issue 4, pp. 379-387 (Dec. 2004).
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International Preliminary Report on Patentability dated Nov. 21, 2019.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
PCT/US2020/040686 International search report and written opinion of the international searching authority dated Nov. 20, 2020.
PCT/US2020/044574 International search report and written opinion of the international searching authority dated Oct. 21, 2020.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
PCT/US2020/053863 International search report and written opinion of the international searching authority dated Mar. 12, 2021.
PCT/US2020/060155 International search report and written opinion of the international searching authority dated Feb. 5, 2021.
PCT/US2020/060191 International search report and written opinion of the international searching authority dated Feb. 8, 2021.
PCT/US2020/063638 International search report and written opinion of the international searching authority dated Mar. 2, 2021.
PCT/US2020/064633 International search report and written opinion of the international searching authority dated Mar. 15, 2021.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks for Large-Scale Image Recognition", ICLR 2015.
Cheng, et al., "Fast-Response Liquid Crystal Variable Optical Retarder and Multilevel Attenuator," Optical Engineering 52 (10), 107105 (Oct. 16, 2013). (Year: 2013).
CN201880073578.6 Notification of the First Office Action dated Aug. 27, 2021.
PCT/US2021/043435 International search report and written opinion of the international searching authority dated Nov. 1, 2021.
PCT/US2021/043444 International search report and written opinion of the international searching authority dated Nov. 1, 2021.
CN201680061632.6 Notification of the First Office Action dated Sep. 14, 2021.

(56) References Cited

OTHER PUBLICATIONS

EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
CN-201980020303.0—Notification of the First Office Action dated Dec. 16, 2021.

* cited by examiner

OPTICAL STACK FOR PRIVACY DISPLAY

TECHNICAL FIELD

This disclosure generally relates to optical stacks for use in privacy display and low stray light displays.

BACKGROUND

Privacy displays provide image visibility to a primary user that is typically in an on-axis position and reduced visibility of image content to a snooper, that is typically in an off-axis position. A privacy function may be provided by micro-louvre optical films that transmit a high luminance from a display in an on-axis direction with low luminance in off-axis positions, however such films are not switchable, and the display is limited to privacy only function.

Switchable privacy displays may be provided by control of the off-axis optical output. Control of off-axis privacy may be provided by means of contrast reduction, for example by adjusting the liquid crystal bias tilt in an In-Plane-Switching LCD. Control may be further provided by means of off-axis luminance reduction. Luminance reduction may be achieved by means of switchable backlights for a liquid crystal display (LCD) spatial light modulator. Off-axis luminance reduction may also be provided by switchable liquid crystal retarders and compensation retarders arranged to modulate the input and/or output directional luminance profile of a spatial light modulator.

Control may be further provided by means of off-axis reflectivity increase. Reflectivity increase may be achieved by means of switchable liquid crystal retarders, compensation retarders that are arranged to control the polarisation of ambient light that falls onto a reflective polariser.

BRIEF SUMMARY

According to a first aspect of the present disclosure there is provided a display apparatus comprising: at least one spatial light modulator arranged to output light on an output side; a display polariser arranged on a side of each of the at least one spatial light modulators; and a view angle control element arranged on the same side of the at least one spatial light modulator as the display polariser of the at least one spatial light modulator; wherein the view angle control element comprises: an additional polariser; and at least one retarder arranged between the additional polariser and the display polariser of the at least one spatial light modulator, the at least one retarder is capable of simultaneously introducing no net relative phase shift to orthogonal polarisation components of light passed by the display polariser along an axis along a normal to the at least one retarder and introducing a relative phase shift to orthogonal polarisation components of light passed by the display polariser along an axis inclined to a normal to the at least one retarder; and the view angle control element is curved with a concave curvature as viewed from the output side.

Advantageously the uniformity of the image as seen by a user in the front of the display operating in privacy mode may be increased. The uniformity of the visual security level as seen by an off-axis snooper may be increased, desirably reducing image visibility across the whole width of the display apparatus.

The view angle control element may be curved in a first direction and is linear in a second direction orthogonal to the first direction. The display apparatus may have a major axis and a minor axis and the first direction is the direction of the major axis. Advantageously the curvature may be conveniently achieved by low cost forming methods for the view angle control element.

The at least one spatial light modulator may be curved with a concave curvature as viewed from the output side. Advantageously an image wrap-around may be seen by the display user.

The display apparatus may further comprise at least two spatial light modulators wherein the spatial light modulators are tiled. At least two of the spatial light modulators may be tilted with respect to each other in at least the first direction. Advantageously multiple monitors may be configured to achieve privacy operation over a large image size, with high uniformity in privacy mode between two adjacent monitors.

The display apparatus may further comprise at least two view angle control elements wherein the at least two view angle control elements may be arranged in series. Advantageously a wide angle backlight or an emissive display may be provided. In a privacy mode of operation, off-axis luminance and reflectivity may be sufficient to achieve desirable visual security levels. In a public mode of operation, off-axis luminance may be sufficiently high to achieve high image visibility to multiple display users.

The curvature in the first direction of the at least one view angle control element may be different to the curvature in the first direction of the at least one spatial light modulator. The curvature of the view angle control element may be greater than the curvature of the at least one spatial light modulator. Advantageously the uniformity of the image to the primary user in privacy mode may be increased. Distortion of images on the spatial light modulator may be reduced or eliminated.

The spatial light modulator may comprise an emissive spatial light modulator arranged to output light, in which case the display polariser may be an output display polariser arranged on the output side of the emissive spatial light modulator. Advantageously display thickness may be reduced.

Alternatively, the at least one spatial light modulator may be a transmissive spatial light modulator, in which case the display apparatus may further comprise at least one backlight arranged to illuminate the at least one spatial light modulator.

Where plural spatial light modulators are present, each of the spatial light modulators may be illuminated by a respective backlight. Advantageously, the individual spatial light modulators and their respective backlights may be provided as integrated units. Multiple off-the-shelf displays may be provided to illuminate the view angle control element.

Where plural spatial light modulators are present, a single backlight may be provided to illuminate plural spatial light modulators. The at least one backlight may be curved with a concave curvature as viewed from the output side. Advantageously the image uniformity may be further increased. Large area display may be provided using spatial light modulators of reduced size, reducing total display cost.

Where the at least one spatial light modulator is a transmissive spatial light modulator, the at least one view angle control element may be arranged on the input side of the at least one spatial light modulator between the at least one spatial light modulator and the at least one backlight. Advantageously the thickness of the view angle control elements in front of the spatial light modulator may be reduced.

Where the at least one spatial light modulator is a transmissive or an emissive spatial light modulator, the at least one view angle control element may be arranged on the output side of the spatial light modulator to receive output light from the spatial light modulator.

In this case, a reflective polariser may be arranged between the display polariser and the additional polariser. Advantageously the visual security level of the display apparatus may be increased. The snooper may see a curved reflective polariser so that the uniformity of the visual security level is increased.

An air gap may be arranged between the display polariser and the additional polariser; wherein the at least one retarder comprises: an air gap input retarder comprising at least one retarder arranged between the display polariser and the air gap; and an air gap output retarder comprising at least one retarder arranged between the air gap and the additional polariser, wherein the air gap input retarder is arranged to provide a phase shift to provide a circularly polarised light component in the air gap of light passed by the display polariser along an axis along a normal to the plane of the air gap input retarder, and the at least one retarder is capable of simultaneously introducing no net relative phase shift to orthogonal polarisation components of light passed by the display polariser along an axis along a normal to the plane of the at least one retarder and introducing a net relative phase shift to orthogonal polarisation components of light passed by the display polariser along an axis inclined to a normal to the plane of the at least one retarder. An air gap is arranged to achieve reduced assembly cost and improve manufacturing yield. Multiple spatial light modulators may be arranged with a single retardation stack and additional polariser. Image contrast may be optimised for the head-on user.

The display apparatus may further comprise a further view angle control element arranged on the same side of the spatial light modulator as the first-mentioned view angle control element, or on the opposite side of the spatial light modulator as the first-mentioned view angle control element in the case that the spatial light modulator is transmissive. Advantageously the off-axis luminance may be further reduced in privacy mode in comparison to displays comprising a single additional polariser. Desirable visual security levels may be achieved using wide angle luminance output profiles from the spatial light modulator. Wide angle backlights may be used that may be manufactured with higher yields in comparison to collimated backlights. Emissive displays may be provided with switchable privacy functionality while achieving high visual security levels.

The display polariser and the at least one additional polariser may have electric vector transmission directions that are parallel. The at least one retarder may comprise a switchable liquid crystal retarder. The at least one retarder may comprise a switchable liquid crystal retarder. Advantageously the display may be switchable between a wide angle mode and a privacy mode of operation.

The plural polar control retarders may include a switchable liquid crystal retarder comprising a layer of liquid crystal material. The switchable liquid crystal retarder may comprise two surface alignment layers disposed adjacent to the layer of liquid crystal material and on opposite sides thereof, each of the surface alignment layers being arranged to provide homeotropic alignment in the adjacent liquid crystal material. The layer of liquid crystal material of the switchable liquid crystal retarder may comprise a liquid crystal material with a negative dielectric anisotropy. The layer of liquid crystal material may have a retardance for light of a wavelength of 550 nm in a range from 500 nm to 1000 nm, preferably in a range from 600 nm to 900 nm and most preferably in a range from 700 nm to 850 nm. The plural polar control retarders may further include: a passive retarder which has an optical axis perpendicular to the plane of the retarder, the passive retarder having a retardance for light of a wavelength of 550 nm in a range from −300 nm to −900 nm, preferably in a range from −450 nm to −800 nm and most preferably in a range from −500 nm to −725 nm; or a pair of passive retarders which have optical axes in the plane of the retarders that are crossed, each retarder of the pair of passive retarders having a retardance for light of a wavelength of 550 nm in a range from 300 nm to 800 nm, preferably in a range from 500 nm to 700 nm and most preferably in a range from 550 nm to 675 nm. Advantageously the public mode may be provided with low power consumption. Advantageously the passive retarders may be provided to match the liquid crystal mode.

The switchable liquid crystal retarder may comprise two surface alignment layers disposed adjacent to the layer of liquid crystal material and on opposite sides thereof, each of the surface alignment layers being arranged to provide homogeneous alignment in the adjacent liquid crystal material. The layer of liquid crystal material of the switchable liquid crystal retarder may comprise a liquid crystal material with a positive dielectric anisotropy. The layer of liquid crystal material may have a retardance for light of a wavelength of 550 nm in a range from 500 nm to 1000 nm, preferably in a range from 600 nm to 850 nm and most preferably in a range from 700 nm to 800 nm. The plural polar control retarders may further include: a passive retarder which has an optical axis perpendicular to the plane of the retarder, the retarder having a retardance for light of a wavelength of 550 nm in a range from −300 nm to −700 nm, preferably in a range from −350 nm to −600 nm and most preferably −400 nm to −500 nm; or a pair of passive retarders which have optical axes in the plane of the retarders that are crossed, each retarder of the pair of passive retarders having a retardance for light of a wavelength of 550 nm in a range from 300 nm to 800 nm, preferably in a range from 350 nm to 650 nm and most preferably in a range from 450 nm to 550 nm. Advantageously the display may have increased resilience to applied mechanical stress.

The backlight may provide a luminance at polar angles to the normal to the spatial light modulator greater than 45 degrees that is at most 33% of the luminance along the normal to the spatial light modulator, preferably at most 20% of the luminance along the normal to the spatial light modulator, and most preferably at most 10% of the luminance along the normal to the spatial light modulator. Advantageously a further additional polariser may not be required in order to achieve desirable visual security levels for off-axis snoopers. Display thickness, complexity and cost may be reduced.

According to a second aspect of the present disclosure there is provided a view angle control optical element for application to a display apparatus comprising a spatial light modulator and a display polariser arranged on a side of the spatial light modulator, the view angle control optical element comprising: an additional polariser; and at least one retarder arranged between the additional polariser and the display polariser of the at least one spatial light modulator, wherein the at least one retarder is capable of simultaneously introducing no net relative phase shift to orthogonal polarisation components of light passed by the display polariser along an axis along a normal to the at least one retarder and introducing a relative phase shift to orthogonal polarisation components of light passed by the display polariser along an axis inclined to a normal to the at least one retarder, and the view angle control element is curved with a concave curvature as viewed from the output side.

Advantageously a separate view control element may be provided to achieve a switchable privacy display without bonding, and a display comprising the optical element and an air gap can achieve high image contrast.

The view angle control element may further comprise at least one further retarder and a further additional polariser, wherein the further additional polariser is arranged on output side of the first-mentioned additional polariser, and the at least one further retarder is arranged between the first-mentioned additional polariser and the further additional polariser.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1:
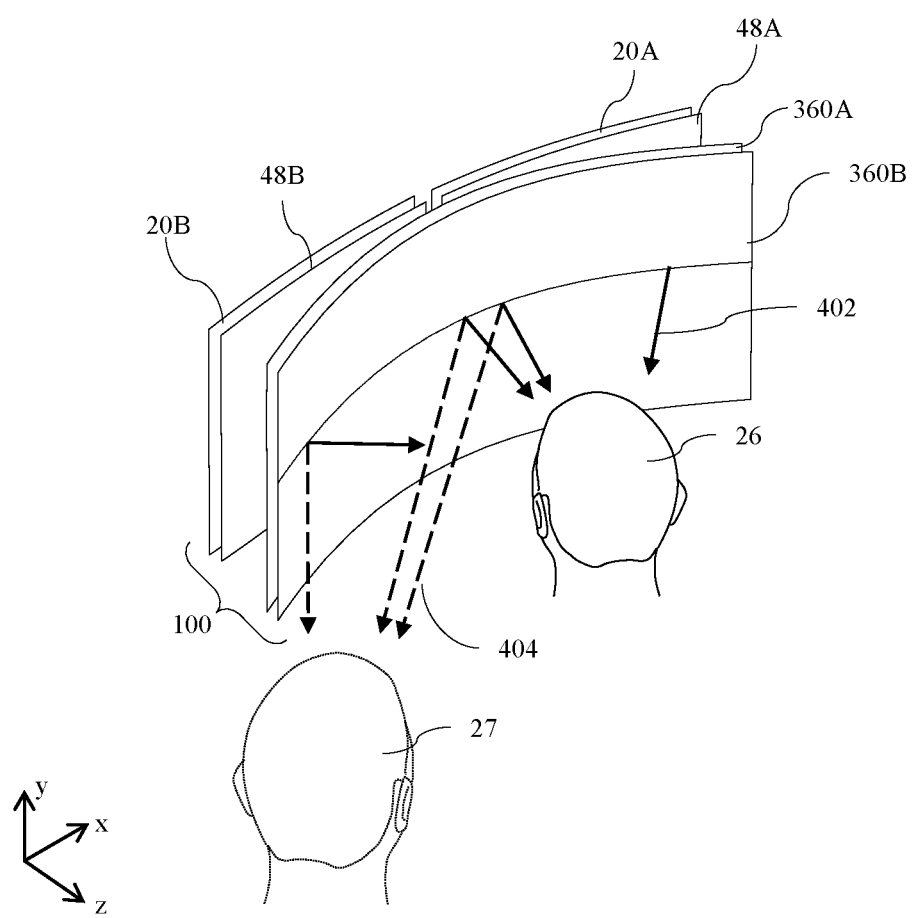
FIG. 1 is a schematic diagram illustrating in perspective front view a privacy display apparatus comprising two curved spatial light modulators and first and second curved view angle control elements.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a relative phase shift between two orthogonal polarization components of the light wave incident thereon and is characterized by the amount of relative phase, F, that it imparts on the two polarization components In some contexts, the term "phase shift" is used without the word "relative" but still meaning relative phase shift. The relative phase shift is related to the birefringence $\Delta n$ and the thickness d of the retarder by:

$$\Gamma = 2 \cdot \pi \cdot \Delta n \cdot d / \lambda_0 \qquad \text{eqn. 1}$$

In eqn. 1, $\Delta n$ is defined as the difference between the extraordinary and the ordinary index of refraction, i.e.

$$\Delta n = n_e - n_o \qquad \text{eqn. 2}$$

For a half-wave retarder, the relationship between d, $\Delta n$, and $\lambda_0$ is chosen so that the phase shift between polarization components is $\Gamma = \pi$. For a quarter-wave retarder, the relationship between d, $\Delta n$, and $\lambda_0$ is chosen so that the phase shift between polarization components is $\Gamma = \pi/2$.

The term half-wave retarder herein typically refers to light propagating normal to the retarder and normal to the spatial light modulator.

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to a positively birefringent C-plate, i.e. a C-plate with a positive $\Delta n$. A 'negative C-plate' refers to a negatively birefringent C-plate, i.e. a C-plate with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with a retardance $\Delta n \cdot d$ that varies with wavelength $\lambda$ as $$\Delta n \cdot d / \lambda = \kappa \qquad \text{eqn. 3}$$

where $\kappa$ is substantially a constant.

Examples of suitable materials include modified polycarbonates from Teijin Films. Achromatic retarders may be provided in the present embodiments to advantageously minimise color changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in spatial light modulators typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$VSL=(Y+R)/(Y-K) \qquad \text{eqn. 4}$$

where VSL is the visual security level, Y is the luminance of the white state of the display at a snooper viewing angle, K is the luminance of the black state of the display at the snooper viewing angle and R is the luminance of reflected light from the display.

Panel contrast ratio is given as:

$$C=Y/K \qquad \text{eqn. 5}$$

For high contrast optical LCD modes, the white state transmission remains substantially constant with viewing angle. In the contrast reducing liquid crystal modes of the present embodiments, white state transmission typically reduces as black state transmission increases such that $$Y+K \sim P \cdot L \qquad \text{eqn. 6}$$

The visual security level may then be further given as:

$$VSL = \frac{(C + I \cdot \rho / \pi \cdot (C+1) / (P \cdot L))}{(C-1)} \qquad \text{eqn. 7}$$

where off-axis relative luminance, P is typically defined as the percentage of head-on luminance, L at the snooper angle and the display may have image contrast ratio C and the surface reflectivity is $\rho$.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$VSL=1+I \cdot \rho / (\pi \cdot P \cdot L) \qquad \text{eqn. 8}$$

In comparison to privacy displays, desirably wide angle displays are easily observed in standard ambient illuminance conditions. One measure of image visibility is given by the contrast sensitivity such as the Michelson contrast which is given by:

$$M=(I_{max}-I_{min})/(I_{max}+I_{min}) \qquad \text{eqn. 9}$$

and so:

$$M=((Y+R)-(K+R))/((Y+R)+(K+R))=(Y-K)/(Y+K+2 \cdot R) \qquad \text{eqn. 10}$$

Thus the visual security level (VSL), is equivalent (but not identical to) 1/M. In the present discussion, for a given off-axis relative luminance, P the wide angle image visibility, W is approximated as $$W=1/VSL=1/(1+I \cdot \rho /(\pi \cdot P \cdot L)) \qquad \text{eqn. 11}$$

Curvature is a property of a line that is curved and for the present disclosure is the inverse radius of curvature. A planar surface has a curvature of zero.

Switchable directional display apparatuses for use in privacy display for example and comprising plural retarders arranged between a display polariser and an additional polariser are described in U.S. Pat. No. 10,126,575 and in U.S. Patent Publ. No. 2019-0086706, both of which are herein incorporated by reference in their entireties. Directional display apparatuses further comprising reflective polarisers arranged between the display polariser and retarders are described in U.S. Pat. No. 10,303,030 and in U.S. Patent Publ. No. 2019-0250458, both of which are herein incorporated by reference in their entireties. Directional display polarisers comprising passive retarders arranged between a display polariser and an additional polariser are described in U.S. Patent Publ. No. 2018-0321553, which is herein incorporated by reference in its entirety.

FIG. 1 is a schematic diagram illustrating in perspective front view a privacy display apparatus 100 comprising two curved spatial light modulators 48A, 48B respectively illuminated by backlights 20A, 20B and first and second curved view angle control elements 360A, 360B.

The display is viewed by primary user 26 from the output side of the spatial light modulators 48A, 48B that are curved and concave as viewed from the output side. Light rays 402 are directed from the display apparatus 100 to the eyes of the observer 26. It is desirable to maximise the uniformity of luminance directed to the user 26 across the area of the spatial light modulators 48A, 48B.

In privacy operation, the display may be viewed by a snooper 27. It is desirable to maximise the visual security level of light on rays 404 directed from the display apparatus 100 to the snooper 27.

Figure 2:
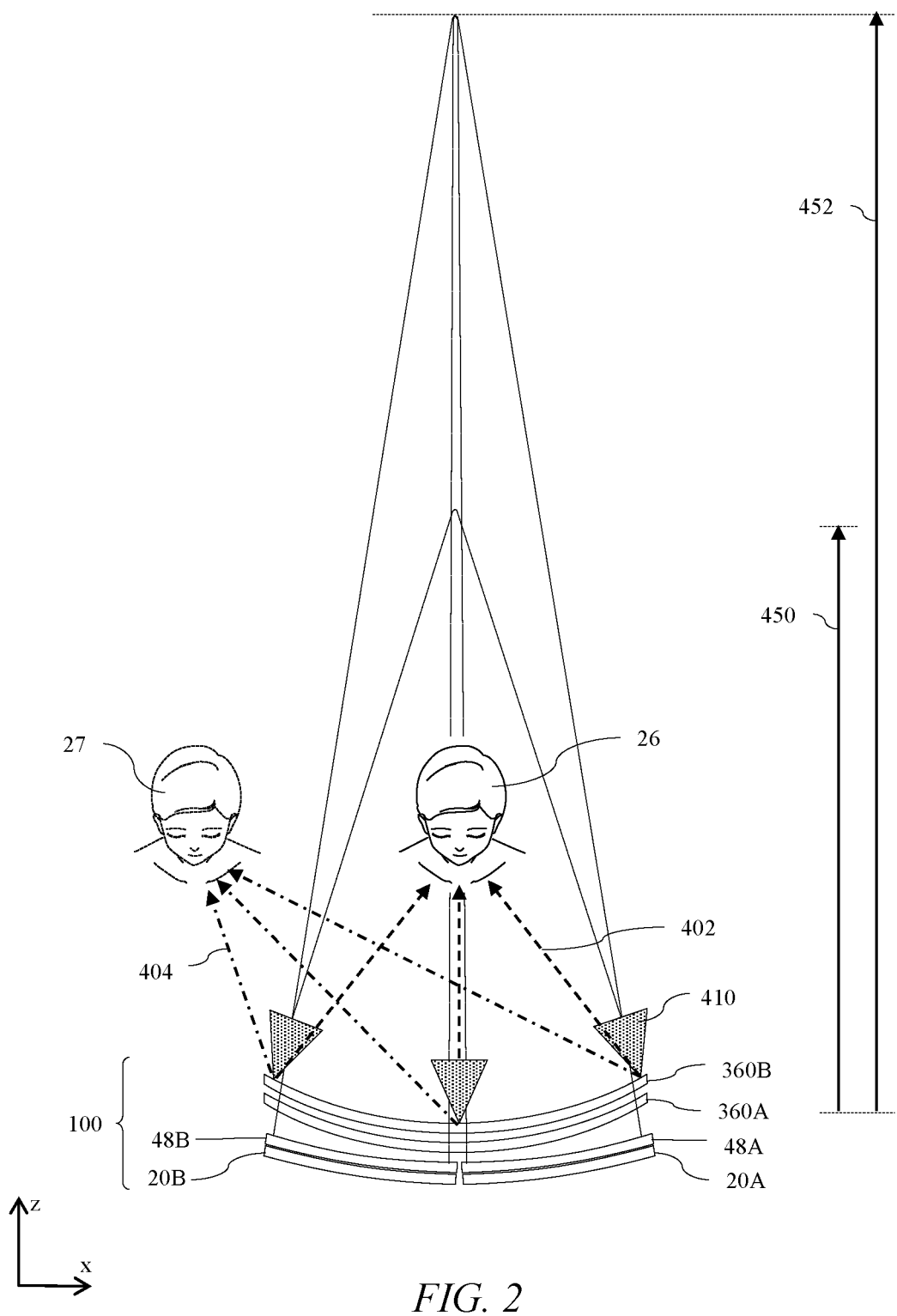
FIG. 2 is a schematic diagram illustrating in top view the privacy display apparatus of FIG. 1.

FIG. 2 is a schematic diagram illustrating in top view the privacy display apparatus 100 of FIG. 1. View angle control elements 360A, 360B provide for privacy operation restricted light cones 410. The cones 410 may for example represent the full width half maximum (FWHM) cone size of the luminance profile from the display. Light rays 402 are within the cones 410 and light rays 404 are outside the cones. The formation of cones 410 will be described further in FIGS. 3A-B and FIG. 5 below.

The curvature of the view angle control elements 360A, 360B provides light cones 410 that are tilted at the edges of the display such that light rays 402 from the edge of the display remain inside the cones. Advantageously display uniformity is increased to the user 26 and visual security level, V to the snooper may be increased across the width of the display apparatus 100.

The display apparatus 100 comprises: plural spatial light modulators 48A, 48B arranged to output light on an output side of each spatial light modulator 48A, 48B. Each spatial light modulator 48A, 48B is curved with a concave curvature as viewed from the output side of the respective spatial light modulator 48A, 48B. The spatial light modulators 48A, 48B are tiled and are also tilted with respect to each other in a first direction. The display apparatus has a major axis and a minor axis and the first direction is the direction of the major axis. Typically for a monitor application in which the monitor is intended for use in a landscape orientation, the first direction is the horizontal direction.

Each of the spatial light modulators 48A, 48B is illuminated by a respective backlight 20A, 20B. Each backlight 20A, 20B is curved with a concave curvature as viewed from the output side.

The view angle control elements 360A, 360B are arranged to receive output light from the spatial light modulator. View angle control elements 360A, 360B are arranged in series on the output side of the spatial light modulators 48A, 48B. Thus light that is output from the spatial light modulators 48A, 48B is directed through the first view angle control element 360A. View angle control element 360B is arranged to receive light from the view angle control element 360B.

In the embodiment of FIG. 1, the view angle control elements 360A, 360B is curved in a first direction and is linear in a second direction orthogonal to the first direction.

The curvature may typically be cylindrical in the first direction only. The curvature may have a circular profile or may have other profile shapes, for example the central regions may be linear and the outer regions may be curved. Advantageously, curvature may be achieved by attaching view angle control elements 360A, 360B to a curved mechanical alignment fixture. In other embodiments, curvatures that are curved in two directions may be provided, for example by forming substrate surfaces on curved formers and applying heat during a curving step.

The curvature in the first direction of the view angle control elements 360A, 360B is different to the curvature in the first direction of the at least one spatial light modulator 48A, 48B. Referring to FIG. 2, the radius of curvature of the view angle control elements 360A, 360B is shown as distance 450. The curved spatial light modulators 48A, 48B are tilted with respect to each other and are arranged to have a common radius of curvature 452. The radius 450 is less than the radius 452 so that the curvature of the view angle control elements 360A, 360B is greater than the curvature of the at least one spatial light modulator 48A, 48B. The operation of the curved view angle control elements 360A, 360B will be further described with reference to FIGS. 7-9.

The structure of a portion of a display apparatus will now be described.

Figure 3A:
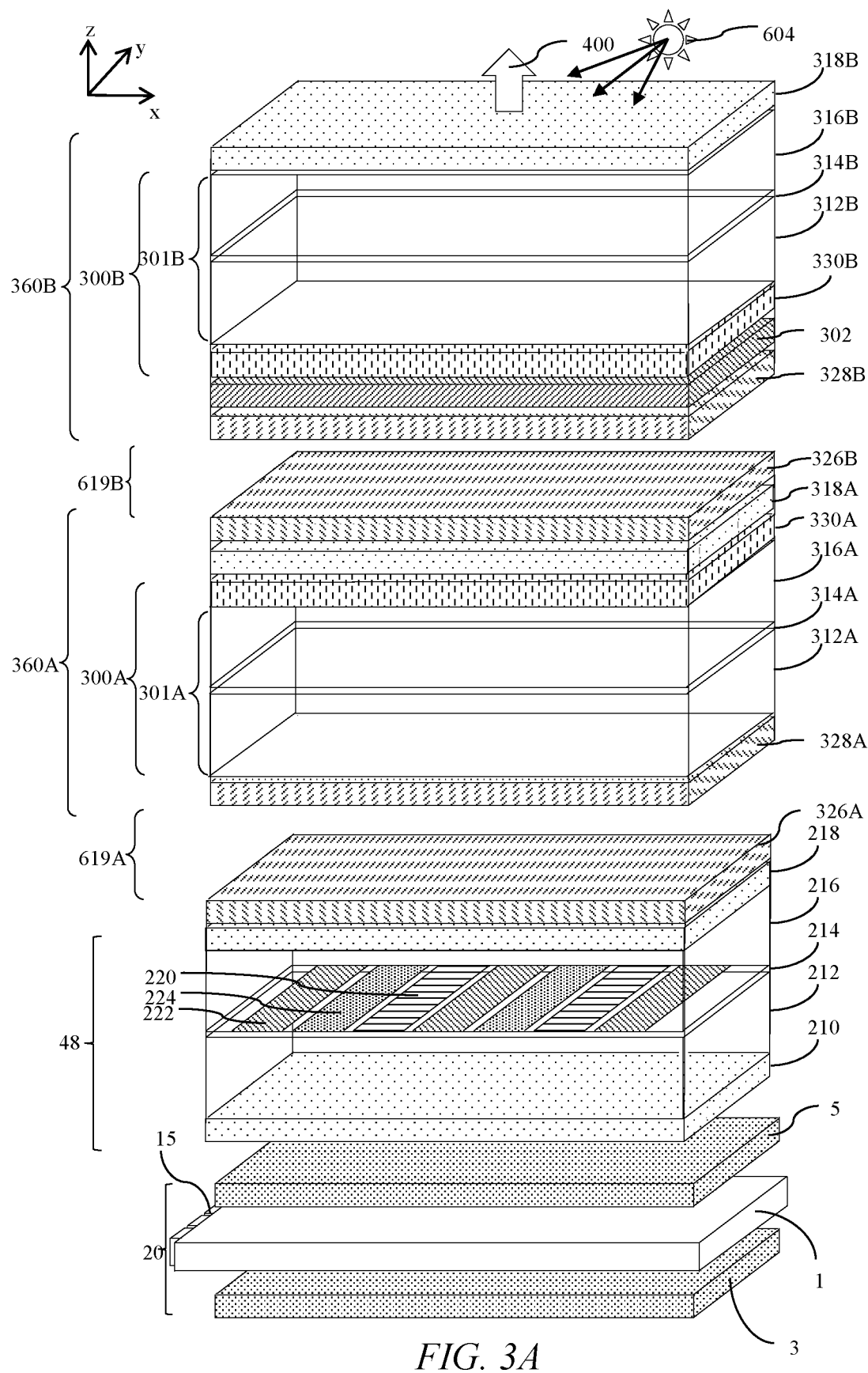
FIG. 3A is a schematic diagram illustrating in perspective side view a privacy display apparatus comprising a spatial light modulator, first and second pairs of quarter waveplates, first and second switchable retarder stacks, an additional polariser and a further additional polariser.
Figure 3B:
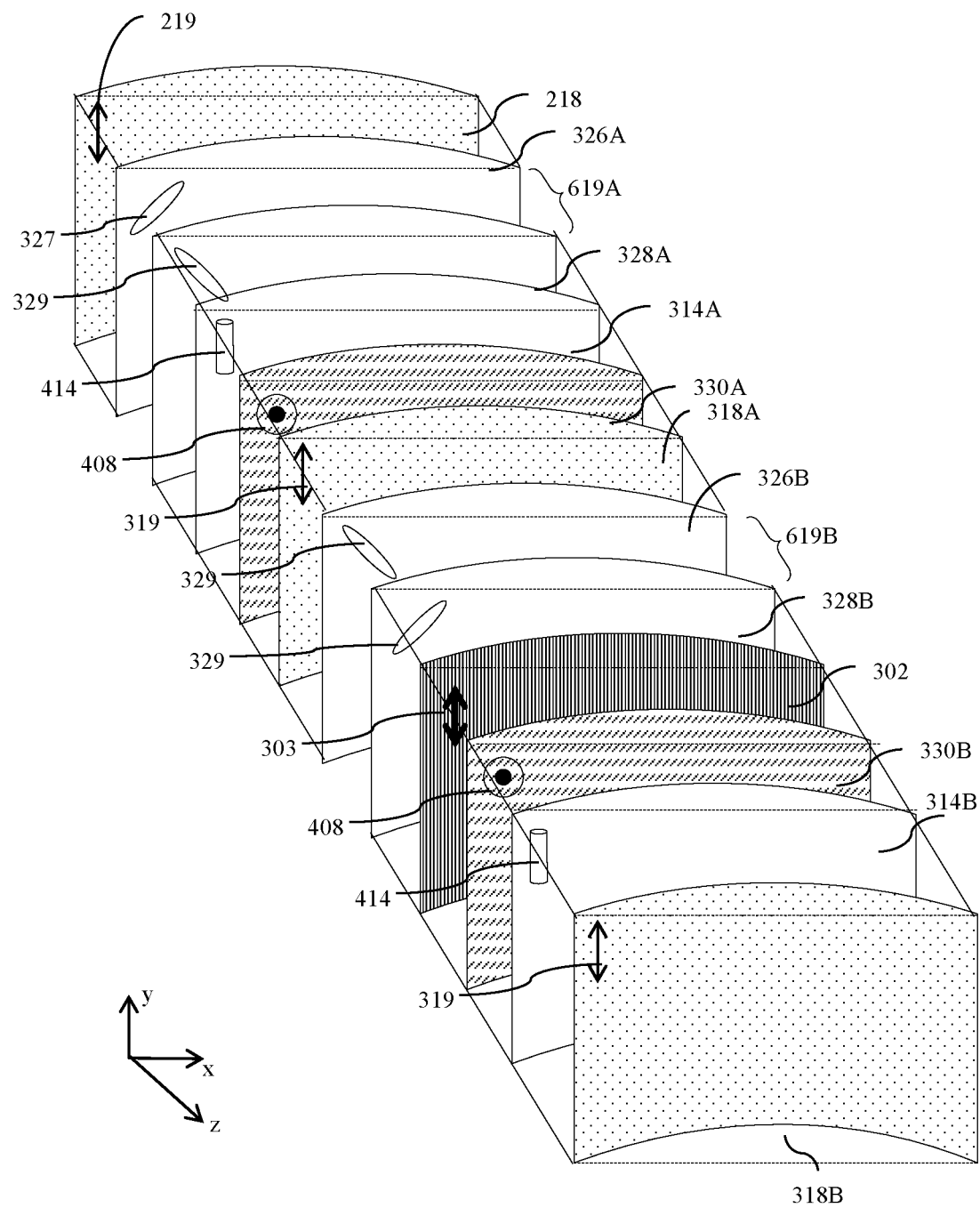
FIG. 3B is a schematic diagram illustrating in expanded view the arrangement of polarisers and retarders of FIG. 3A.

FIG. 3A is a schematic diagram illustrating in perspective side view a privacy display apparatus 100 comprising backlight 20, spatial light modulator 48, and first and second view angle control elements; and FIG. 3B is a schematic diagram illustrating in expanded view the arrangement of polarisers and retarders of FIG. 3A.

The spatial light modulator 48 is a liquid crystal spatial light modulator comprising display polarisers that are input polariser 210 and output polariser 218. View angle control elements 360A, 360B are arranged on the same side of the at least one spatial light modulator 48 as the display polariser of the at least one spatial light modulator 48. In FIG. 3, the view angle control elements are arranged on the output side of the spatial light modulator 48 and the display polariser is the output polariser 218.

In the present embodiments, the polariser 210, 218, 318, 302 (and any other polarisers) are typically linear polarisers, that is they output linearly polarised light with electric vector transmission directions 211, 219, 319, 303 respectively.

The view angle control elements 360A, 360B each comprises an additional polariser 318A, 318B; plural retarders 300A, 300B arranged between the additional polariser 318A, 218B and the display polariser 218 of the spatial light modulator 48. The plural retarders 300A, 300B are capable of simultaneously introducing no net relative phase shift to orthogonal polarisation components of light passed by the display polariser 218 along an axis along a normal to the plural retarders 300A, 300B and introducing a relative phase shift to orthogonal polarisation components of light passed by the display polariser along an axis inclined to a normal to the plural retarders 300A, 300B.

View angle control elements 300A, 300B are arranged in series so that element 300B is arranged to receive light transmitted by element 300A.

View angle control element 300B further comprises a reflective polariser 302 arranged between the display polariser and the additional polariser and arranged between the additional polarisers 318A, 318B.

The structure of the display apparatus 100 will now be described in more detail.

A display apparatus 100 comprises: a spatial light modulator 48 arranged to output light 400; wherein the spatial light modulator 48 comprises an output polariser 218 arranged on the output side of the spatial light modulator 48.

In the present disclosure, spatial light modulator 48 may comprise a liquid crystal display comprising input polariser 210, output polariser 218 with substrates 212, 216, liquid crystal layer 214 and red, green and blue pixels 220, 222, 224. Backlight 20 may be arranged to illuminate the spatial light modulator 48 and comprises input light sources 15, waveguide 1, rear reflector 3 and optical stack 5 comprising diffusers, light turning films and other known optical backlight structures. Asymmetric diffusers, that may comprise asymmetric surface relief features for example, may be provided in the optical stack 5 with increased diffusion in the elevation direction in comparison to the lateral direction may be provided.

In the present embodiments, the backlight 20 may be arranged to provide an angular light distribution that has reduced luminance for off-axis viewing positions in comparison to head-on luminance. A typical wide angle backlight has a roll-off at higher angles such that the full width half maximum of relative luminance may be preferably greater than 40 degrees, more preferably greater than 60 degrees and most preferably greater than 80 degrees.

Backlight 20 may further comprise a switchable backlight arranged to switch the output angular luminance profile in order to provide reduced off-axis luminance in a privacy mode of operation and higher off-axis luminance in a wide angle mode of operation. Such a directional backlight provides some off-axis luminance reduction, advantageously increasing head-on efficiency and reducing display visibility and stray light for off-axis locations.

The spatial light modulator 48 may alternatively be provided by other display types that provide output light 400 by emission, such as organic LED displays (OLED), with output polariser 218 in which case backlight 20 is omitted.

Thus the spatial light modulator 48 comprises an output polariser 218 arranged on the output side of the spatial light modulator 48. The output polariser 218 may be arranged to provide high extinction ratio for light from the pixels 220, 222, 224 of the spatial light modulator 48.

The optical stack further comprises view angle control elements 360A, 360B as illustrated in FIGS. 1-2. The view angle control elements 360A, 360B may have any of the constructions disclosed in U.S. Pat. No. 10,126,575 and in U.S. Patent Publ. No. 2018-0321553, both of which are herein incorporated by reference in their entireties.

An illustrative example of view angle control elements 360A, 360B will now be given.

View angle control element 360A comprises additional polariser 318A arranged on the output side of the output polariser 218; and plural retarders 300A arranged between the additional polariser 318A and output polariser 218. The electric vector transmission direction 219 of the output polariser 218 is parallel to the electric vector transmission direction 319A of the additional polariser 318A.

Plural retarders 300A are arranged between the output polariser 218 and the additional polariser 318A. In the embodiments of FIGS. 3A-B, the plural retarders 300A comprise passive retarder 330A and switchable liquid crystal retarder 301A, but in general may be replaced by other configurations of at least one retarder. The retarders 300A do not affect the luminance of light passing through the retarders 300A and the additional polariser 318A along an axis along a normal to the plane of the retarders 300A but the retarders 300A do reduce the luminance of light passing therethrough along an axis inclined to a normal to the plane of the retarders 300A, at least in one of the switchable states of the switchable retarder 301A. The principles leading to this effect are described in greater detail below with reference to FIGS. 22A-26 and arises from the presence or absence of a phase shift introduced by the retarders 300 to light along axes that are angled differently with respect to the liquid crystal material of the retarders 300. A similar effect is achieved in all the devices described below.

The substrates 312A, 316A of the switchable liquid crystal retarder 301 comprise electrodes arranged to provide a voltage across the layer 314A of liquid crystal material 414. Control system (not shown) is arranged to control the voltage applied by voltage driver across the electrodes of the switchable liquid crystal retarder 301.

FIGS. 3A-B further illustrate that an air gap 619A is provided between the output polariser 218 of the spatial light modulator 48 and the additional polariser 318A. It would be desirable to provide high contrast for on-axis image viewing of a switchable privacy display in both privacy and public modes of operation. Further it would be desirable to provide an air gap between the spatial light modulator and other components in the optical system to achieve reduced cost and complexity of assembly.

The plural retarders further comprise: an air gap input retarder 326A comprising at least one retarder arranged between the display polariser 218 and the air gap 619A; and an air gap output retarder 328A comprising at least one retarder arranged between the air gap 619 and the additional polariser 318.

The air gap input retarder 326A is arranged to provide a net phase shift to provide a circularly polarised light component in the air gap 619 of light passed by the display polariser 218 along an axis along a normal to the plane of the air gap input retarder 326A. The air gap input and output retarders advantageously achieve reduction of reflected light in the air gap 619A between the view angle control element 360A and spatial light modulator 48. The principles leading to this effect are described in greater detail below with reference to FIGS. 17-18.

In combination the plural retarders 326A, 328A, 300A are capable of simultaneously introducing no net relative phase shift to orthogonal polarisation components of light passed by the display polariser 218 along an axis along a normal to the plane of the plural retarders 326, 328, 300 and introducing a net relative phase shift to orthogonal polarisation components of light passed by the display polariser along an axis inclined to a normal to the plane of the plural retarders 326A, 328A, 300A.

View angle control element 360B is similar in structure and operation to view angle control element 360A in the embodiment of FIG. 3A-3B.

Element 360B comprises further additional polariser 318B arranged on the output side of the additional polariser 318A; a reflective polariser 302 arranged between the additional polariser 318A and the further additional polariser 318B; and plural retarders 300B arranged between the reflective polariser 302 and the further additional polariser 318B. The electric vector transmission direction 303 of the reflective polariser 302 is parallel to the electric vector transmission direction 319A of the additional polariser 318A. The electric vector transmission direction 303 of the reflective polariser 302 is parallel to the electric vector transmission direction 219 of the additional polariser 318A.

Plural retarders 300B are arranged between the reflective polariser 302 and the further additional polariser 318B. In the embodiment of FIGS. 3A-B, the plural retarders 300B comprise passive retarder 330B and switchable liquid crystal retarder 301B, but in general may be replaced by other configurations of at least one retarder. The retarders 300B do not affect the luminance of light passing through the reflective polariser 302, the retarders 300B and the further additional polariser 318B along an axis along a normal to the plane of the retarders 300, but the retarders 300B do reduce the luminance of light passing therethrough along an axis inclined to a normal to the plane of the retarders 300B, at least in one of the switchable states of the switchable retarder 301.

The substrates 312B, 316B of the switchable liquid crystal retarder 301B comprise electrodes arranged to provide a voltage across the layer 314B of liquid crystal material 414. Control system 352 is arranged to control the voltage applied by voltage driver 350 across the electrodes of the switchable liquid crystal retarder 301B.

The display apparatus may be arranged for use in ambient illumination 604. Thus a display apparatus 100 for use in ambient illumination 604 comprises a spatial light modulator 48 arranged to output light 400.

FIGS. 3A-B further illustrate that an air gap 619B is provided between the additional polariser 318A and the reflective polariser 302.

An air gap input retarder 326B comprises at least one retarder arranged between the additional polariser 318A and the air gap 619B; and an air gap output retarder 328B comprising at least one retarder arranged between the air gap 619B and the reflective polariser 302.

The air gap input retarder 326B is arranged to provide a phase shift to provide a circularly polarised light component in the air gap 619 of light passed by the additional polariser 318A along an axis along a normal to the plane of the air gap input retarder 326B. In combination the plural retarders 326B, 328B are capable of introducing no phase shift to polarisation components of light passed by the display polariser 218 along an axis along a normal to the plane of the plural retarders 326B, 328B. The air gap input and output retarders advantageously achieve reduction of reflected light in the air gap 619B between the view angle control element 360A and the view angle control element 360B. The principles leading to this effect are described in greater detail below with reference to FIG. 17.

Features of the embodiment of FIGS. 3A-B not discussed in further detail may be assumed to correspond to the features with equivalent reference numerals as discussed above, including any potential variations in the features.

An illustrative embodiment of the arrangement of FIGS. 3A-3B is given in TABLES 1-2.

TABLE 1

| | | Active LC retarder | | | | |
|---|---|---|---|---|---|---|
| Mode | Alignment layers | Orientation/deg | Pretilt/deg | Δn · d/nm | Δε | Voltage/V |
| Public | Homogeneous | +90 | 4 | 750 | 16.4 | 10 |
| Privacy | Homogeneous | −90 | 4 | | | 2.1 |

TABLE 2

| Layer | Orientation/° | Retarder | Retardance/nm |
|---|---|---|---|
| Polariser 218 | 0 | — | — |
| Retarder 326 | 45 | A-plate | +135 |
| Air gap 619 | | | |
| Retarder 328 | 135 | A-plate | +135 |
| Retarder 330A | 45 | A-plate | +575 |
| Retarder 330B | 135 | A-plate | +575 |
| Switchable LC 314 | | See TABLE 1 | |
| Polariser 318 | 0 | — | — |
| Reflective polariser 302 | 0 | — | — |
| Retarder 326 | 45 | A-plate | +135 |
| Air gap 619 | | | |
| Retarder 328 | 135 | A-plate | +135 |
| Retarder 330A | 45 | A-plate | +575 |
| Retarder 330B | 135 | A-plate | +575 |
| Switchable LC 314 | | See TABLE 1 | |
| Polariser 318 | 0 | — | — |

The plural retarders 300A, 300B comprise switchable liquid crystal retarders 301A, 301B. Further arrangements of plural retarders will now be described.

In one alternative, the switchable liquid crystal retarder 301A, 301B may comprise two surface alignment layers disposed adjacent to the layer 413A, 413B of liquid crystal material 414 and on opposite sides thereof and each arranged to provide homeotropic alignment in the adjacent liquid crystal material. The layer 413A, 413B of liquid crystal material 414 of the switchable liquid crystal retarder 301A, 301B may comprise a liquid crystal material with a negative dielectric anisotropy. The layer 413A, 413B of liquid crystal material 414 may have a retardance for light of a wavelength of 550 nm in a range from 500 nm to 1000 nm, preferably in a range from 600 nm to 900 nm and most preferably in a range from 700 nm to 850 nm.

Where two surface alignment layers providing homeotropic alignment are provided, the at least one passive compensation retarder 330A, 330B may comprise a retarder having its optical axis perpendicular to the plane of the retarder, the at least one passive retarder having a retardance for light of a wavelength of 550 nm in a range from −300 nm to −900 nm, preferably in a range from −450 nm to −800 nm and most preferably in a range from −500 nm to −725 nm.

Alternatively, where two surface alignment layers providing homeotropic alignment are provided, the at least one passive compensation retarder 330A, 330B may comprise a pair of retarders which have optical axes in the plane of the retarders that are crossed, each retarder of the pair of retarders having a retardance for light of a wavelength of 550 nm in a range from 300 nm to 800 nm, preferably in a range from 500 nm to 700 nm and most preferably in a range from 550 nm to 675 nm. Advantageously, in this case increased field of view in wide angle mode of operation may be provided. Further, zero voltage operation in wide angle mode of operation may be provided, reducing power consumption.

In another alternative, the switchable liquid crystal retarder 301A, 301B may comprise two surface alignment layers disposed adjacent to the layer 413A, 413B of liquid crystal material 414 and on opposite sides thereof and each arranged to provide homogeneous alignment in the adjacent liquid crystal material. Advantageously in comparison to homeotropic alignment on opposite sides of the liquid crystal, increased resilience to the visibility of flow of liquid crystal material during applied pressure may be achieved.

The layer 413A, 413B of liquid crystal material 414 of the switchable liquid crystal retarder 301A, 301B may comprise a liquid crystal material with a positive dielectric anisotropy. The layer 413A, 413B of liquid crystal material 414 may have a retardance for light of a wavelength of 550 nm in a range from 500 nm to 900 nm, preferably in a range from 600 nm to 850 nm and most preferably in a range from 700 nm to 800 nm.

Where two surface alignment layers providing homogeneous alignment are provided, the at least one passive compensation retarder 330A, 330B may comprise a retarder having its optical axis perpendicular to the plane of the retarder, the at least one passive retarder having a retardance for light of a wavelength of 550 nm in a range from −300 nm to −700 nm, preferably in a range from −350 nm to −600 nm and most preferably in a range from −400 nm to −500 nm.

Alternatively, where the two surface alignment layers providing homogeneous alignment are provided, the at least one passive compensation retarder 330A, 330B may comprise a pair of retarders which have optical axes in the plane of the retarders that are crossed, each retarder of the pair of retarders having a retardance for light of a wavelength of 550 nm in a range from 300 nm to 800 nm, preferably in a range from 350 nm to 650 nm and most preferably in a range from 450 nm to 550 nm. Advantageously, in this case increased resilience to the visibility of flow of liquid crystal material during applied pressure may be achieved.

In another alternative, the switchable liquid crystal retarder 301A, 301B may comprise two surface alignment layers disposed adjacent to the layer 413A, 413B of liquid crystal material 414 and on opposite sides thereof, one of the surface alignment layers being arranged to provide homeotropic alignment in the adjacent liquid crystal material and the other of the surface alignment layers being arranged to provide homogeneous alignment in the adjacent liquid crystal material.

When the surface alignment layer arranged to provide homogeneous alignment is between the layer 413A, 413B of liquid crystal material 414 and the compensation retarder 330A, 330B, the layer 413A, 413B of liquid crystal material 414 may have a retardance for light of a wavelength of 550 nm in a range from 700 nm to 2000 nm, preferably in a range from 1000 nm to 1500 nm and most preferably in a range from 1200 nm to 1500 nm.

When the surface alignment layer arranged to provide homogeneous alignment is between the layer 413A, 413B of liquid crystal material 414 and the compensation retarder 330A, 330B, the at least one passive compensation retarder 330A, 330B may comprise a retarder having its optical axis perpendicular to the plane of the retarder, the at least one passive retarder having a retardance for light of a wavelength of 550 nm in a range from −400 nm to −1800 nm, preferably in a range from −700 nm to −1500 nm and most preferably in a range from −900 nm to −1300 nm.

When the surface alignment layer arranged to provide homogeneous alignment is between the layer 413A, 413B of liquid crystal material 414 and the compensation retarder 330A, 330B, the at least one passive compensation retarder 330A, 330B may comprise a pair of retarders which have optical axes in the plane of the retarders that are crossed, each retarder of the pair of retarders having a retardance for light of a wavelength of 550 nm in a range from 400 nm to 1800 nm, preferably in a range from 700 nm to 1500 nm and most preferably in a range from 900 nm to 1300 nm.

When the surface alignment layer arranged to provide homeotropic alignment is between the layer 413A, 413B of liquid crystal material 414 and the compensation retarder 330A, 330B, the layer 413A, 413B of liquid crystal material 414 may have a retardance for light of a wavelength of 550 nm in a range from 500 nm to 1800 nm, preferably in a range from 700 nm to 1500 nm and most preferably in a range from 900 nm to 1350 nm.

When the surface alignment layer arranged to provide homeotropic alignment is between the layer 413A, 413B of liquid crystal material 414 and the compensation retarder 330A, 330B, the at least one passive compensation retarder 330A, 330B may comprise a retarder having its optical axis perpendicular to the plane of the retarder, the at least one passive retarder having a retardance for light of a wavelength of 550 nm in a range from −300 nm to −1600 nm, preferably in a range from −500 nm to −1300 nm and most preferably in a range from −700 nm to −1150 nm.

When the surface alignment layer arranged to provide homeotropic alignment is between the layer 413A, 413B of liquid crystal material 414 and the compensation retarder 330A, 330B, the at least one passive compensation retarder 330A, 330B may comprise a pair of retarders which have optical axes in the plane of the retarders that are crossed, each retarder of the pair of retarders having a retardance for light of a wavelength of 550 nm in a range from 400 nm to 1600 nm, preferably in a range from 600 nm to 1400 nm and most preferably in a range from 800 nm to 1300 nm. Advantageously, in this case increased resilience to the visibility of flow of liquid crystal material during applied pressure may be achieved.

Each alignment layer may have a pretilt having a pretilt direction with a component in the plane of the liquid crystal layer that is parallel or anti-parallel or orthogonal to the electric vector transmission direction of the display polariser. Advantageously a display may be provided with narrow viewing angle in a lateral direction and a wide viewing freedom for display rotation about a horizontal axis. Such a display may be comfortable to view for a head-on display user and difficult to view for an off-axis display user.

The at least one passive retarder may comprise at least two passive retarders with at least two different orientations of optical axes which may have optical axes in the plane of the retarders that are crossed. Field of view for liquid crystal retarders with homogeneous alignment is increased while providing resilience to the visibility of flow of liquid crystal material during applied pressure.

The pair of passive retarders may have optical axes that extend at 45 degrees and at 135 degrees, respectively, with respect to an electric vector transmission direction that is parallel to the electric vector transmission of the display polariser. The passive retarders may be provided using stretched films to advantageously achieve low cost and high uniformity.

The switchable liquid crystal retarder 301A, 301B may be provided between the pair of passive retarders. Advantageously the thickness and complexity of the plural retarders may be reduced.

A transparent electrode and a liquid crystal alignment layer may be formed on a side of each of the pair of passive retarders adjacent the switchable liquid crystal retarder 301A, 301B; and may further comprise first and second substrates between which the switchable liquid crystal retarder 301A, 301B is provided, the first and second substrates each comprising one of the pair of passive retarders, wherein each of the pair of passive retarders has a retardance for light of a wavelength of 550 nm in a range from 150 nm to 800 nm, preferably in a range from 200 nm to 700 nm and most preferably in a range from 250 nm to 600 nm.

In one alternative, the at least one passive compensation retarder 330A, 330B may comprise a retarder having an optical axis perpendicular to the plane of the retarder. Advantageously the thickness and complexity of the passive retarder stack may be reduced.

The at least one passive compensation retarder 330A, 330B may comprise two passive retarders having an optical axis perpendicular to the plane of the passive retarders, and the switchable liquid crystal retarder 301A, 301B is provided between the two passive retarders. Advantageously the thickness and complexity of the plural retarders may be reduced. High head-on efficiency may be achieved in both wide and privacy modes, a wide field of view for wide angle mode and snoopers may be unable to perceive image data from a wide range of off-axis viewing locations.

A transparent electrode and a liquid crystal alignment layer may be formed on a side of each of the two passive retarders adjacent the switchable liquid crystal retarder 301A, 301B. First and second substrates between which the switchable liquid crystal retarder 301A, 301B may be provided, the first and second substrates each comprising one of the two passive retarders. The two passive retarders may have a total retardance for light of a wavelength of 550 nm in a range −300 nm to −700 nm, preferably in a range from −350 nm to −600 nm and most preferably in a range from −400 nm to −500 nm.

In another alternative, the at least one passive compensation retarder 330A, 330B may comprise a retarder having an optical axis with a component perpendicular to the plane of the retarder and with a component in the plane of the retarder. Advantageously fields of view in wide angle mode may be increased and snoopers may be unable to perceive image data from a wide range of off-axis viewing locations.

The component in the plane of the passive retarder may extend at 0 degrees, with respect to an electric vector transmission direction that is parallel or perpendicular to the electric vector transmission of the display polariser. The at least one passive retarder may further comprise a passive retarder having an optical axis perpendicular to the plane of the passive retarder or a pair of passive retarders which have optical axes in the plane of the passive retarders that are crossed.

The retardance of the at least one passive compensation retarder 330A, 330B may be equal and opposite to the retardance of the switchable liquid crystal retarder 301A, 301B.

The switchable liquid crystal retarder 301A, 301B may comprise first and second pretilts; and the at least one passive compensation retarder 330A, 330B may comprise a compensation retarder 330A, 330B with first and second pretilts, the first pretilt of the compensation retarder 330A, 330B being the same as the first pretilt of the liquid crystal retarder and the second pretilt of the compensation retarder 330A, 330B being the same as the second pretilt of the liquid crystal retarder.

The switchable liquid crystal retarder 301A, 301B may further comprise electrodes arranged to apply a voltage for controlling the layer 413A, 413B of liquid crystal material 414. The electrodes may be on opposite sides of the layer 413A, 413B of liquid crystal material 414. The display may be switched by control of the liquid crystal layer, advantageously achieving a switchable privacy display, or other display with reduced off-axis stray light. The display may further comprise a control system arranged to control the voltage applied across the electrodes of the at least one switchable liquid crystal retarder 301A, 301B.

The display uniformity from the display structure of FIGS. 1A-1B using the exemplary embodiment of FIGS. 3A-B will now be described.

Figure 4:
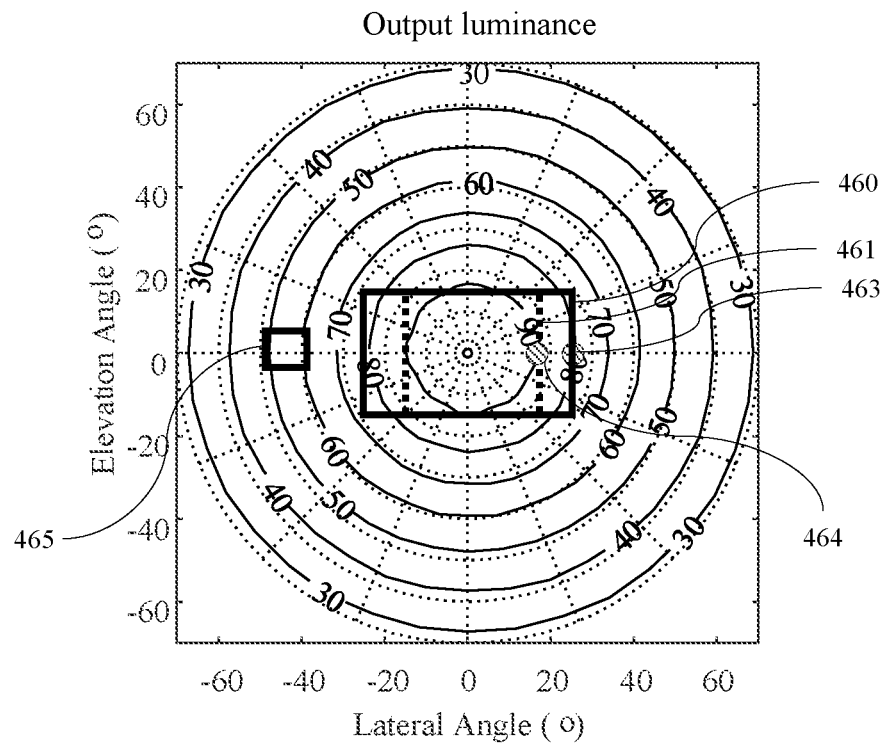
FIG. 4 is a schematic graph illustrating the variation of output luminance with polar direction in a public mode of operation of the privacy display apparatus of FIG. 3A.

FIG. 4 is a schematic graph illustrating the variation of output luminance with polar direction in a public mode of operation with the illustrative embodiment illustrated in TABLE 3 and for the display apparatus of FIGS. 3A-B.

operation for a display comprising planar view angle control elements. In comparison to FIG. 4, the roll of luminance with viewing angle is significantly increased. Thus the change of edge luminance at polar locations 463 and 464 from approximately 15% (with no curvature of the view angle control elements 360A, 360B) to approximately 45% (with 0.55 m curvature of view angle control elements 360A, 360B) is a desirable increase in display uniformity for the user 26.

A snooper 27 may see a polar region 465 which has a small lateral extent because the curvature of the display 100 is similar to the viewing distance of the snooper. Advantageously the uniformity of visual security level is high to the snooper.

Figure 5:
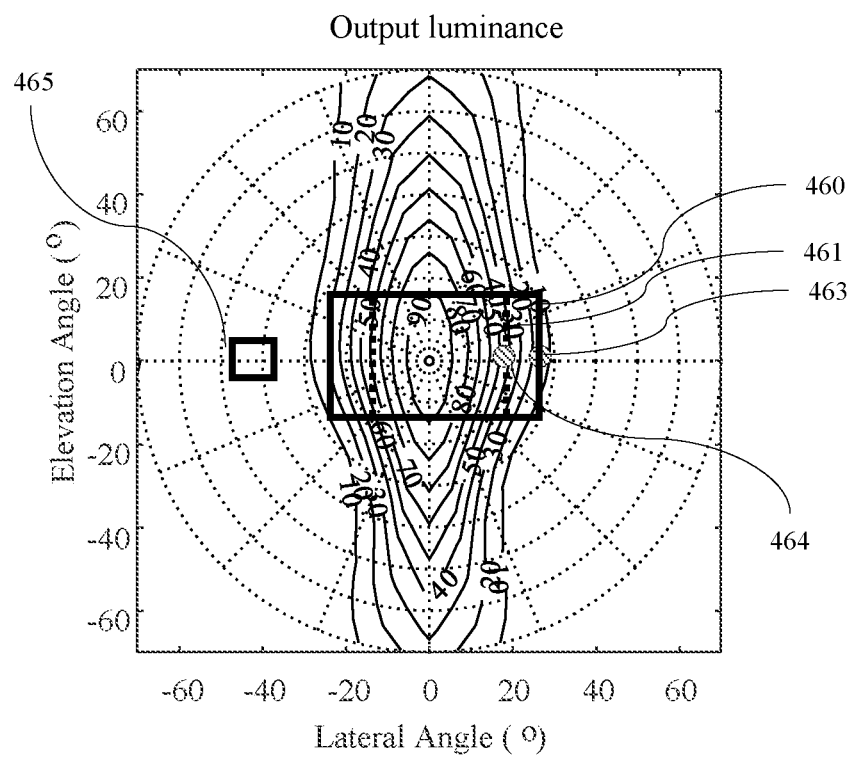
FIG. 5 is a schematic graph illustrating the variation of output luminance with polar direction in a privacy mode of operation for a display comprising planar view angle control elements.

It would be desirable to increase the display uniformity further in comparison to that illustrated in FIG. 5.

Figure 6:
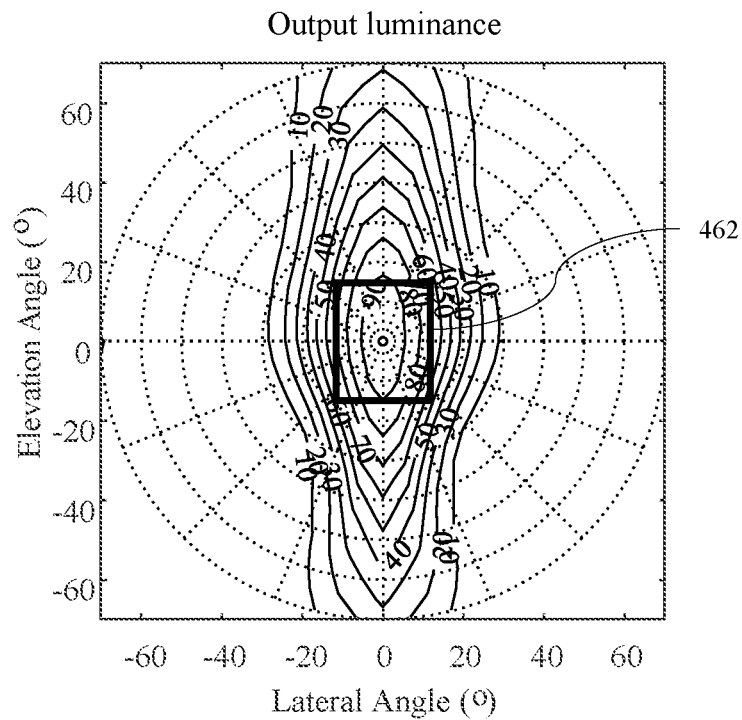
FIG. 6 is a schematic graph illustrating the variation of output luminance with polar direction in a privacy mode of operation for curved view angle control elements.

FIG. 6 is a schematic graph illustrating the variation of output luminance with polar direction in a privacy mode of operation for curved view angle control elements 360A, 360B. The operation of a display apparatus 100 of FIG. 1 wherein the curvature of the view angle control elements 360A, 360B is greater than is desirable curvature for the spatial light modulator, with an illustrative embodiment of planar spatial light modulators 48A, 48B and view angle control elements 360A, 360B with a radius of curvature of

TABLE 3

| FIG. | MODE | Display diagonal/inches | Display aspect ratio | Viewing distance/mm | View angle control element curvature/m$^{-1}$ | Spatial light modulator curvature/m$^{-1}$ |
|---|---|---|---|---|---|---|
| 4 | Public luminance | 25 | 16:9 | 600 | 1 | 0/0.56 |
| 5 | Privacy luminance | | | | | |
| 6 | Privacy luminance | | | | | 0 |
| 7 | Privacy reflectivity | | | | | |

FIG. 4 illustrates the luminance contours that may be achieved by a wide angle backlight 20. The view angle control elements 360A, 360B are driven with a high voltage as shown in TABLE 1 to provide public mode (wide angle) operation and do not substantially change the field of view of the light output from the spatial light modulator 48 and backlight 20.

Polar region 460 illustrates the field of view of the display apparatus 100 for an on-axis eye of user 26, where the spatial light modulator 48 and backlight 20 are planar such that all light cones 410 from the display are parallel. The contours within the region 460 illustrate the change in luminance seen by the user from the display apparatus 100.

Polar region 461 illustrates the field of view of the display apparatus 100 for an on-axis user 26, where the spatial light modulator 48 and backlight 20 has a radius of curvature of 1800 mm about the horizontal direction. The change of edge luminance (compared to head-on luminance of 100%) from approximately 82% to approximately 88% at polar locations 463 and 464 are not easily discernible to a typical user and thus the curved spatial light modulator and backlight 20 does not significantly change the luminance uniformity of the image seen by the user.

FIG. 4 further illustrates the field of view in polar region 465 of user 27 at 2000 mm from the display apparatus 100 with radius of curvature 1800 mm (curvature=0.55 m), centred at 45 degrees lateral angle and zero degrees elevation. In such a position, the user 27 desirably sees a high luminance image with good luminance uniformity.

FIG. 5 is a schematic graph illustrating the variation of output luminance with polar direction in a privacy mode of 1000 mm. Advantageously image uniformity is significantly increased as illustrated by polar region 462 for the on-axis user 26, with a luminance uniformity of greater than 60% over most of the display area.

Figure 7:
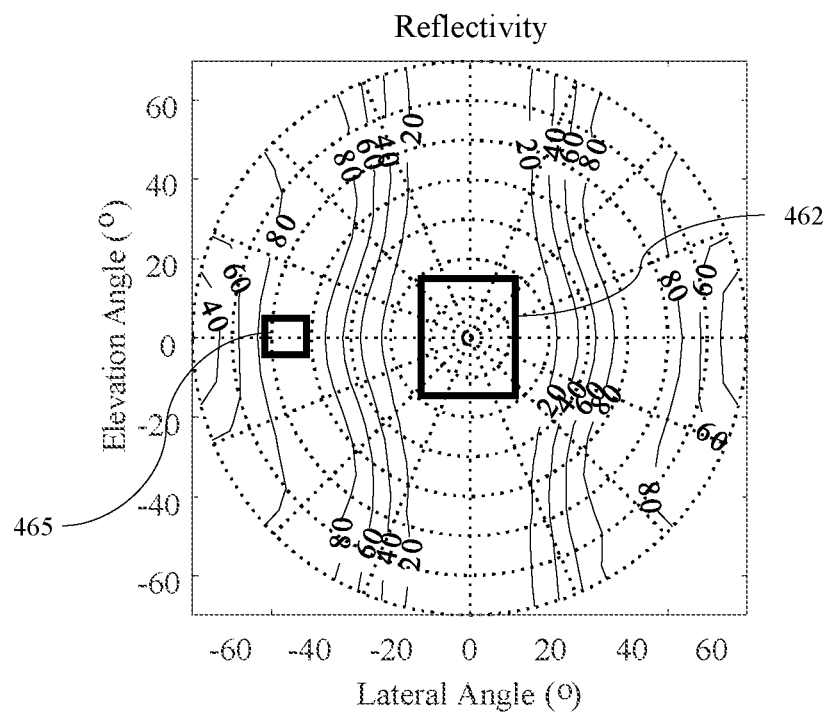
FIG. 7 is a schematic graph illustrating the variation of display relative reflectivity with polar direction in a privacy mode of operation for curved view angle control elements.

FIG. 7 is a schematic graph illustrating the variation of display relative reflectivity with polar direction in a privacy mode of operation for curved view angle control elements 360A, 360B. The reflectivity is normalised to a maximum reflectivity, in practice the reflectivity is approximately 40% taking into account polariser losses, reflective polariser reflectivity and front surface Fresnel reflections.

Thus the image reflectivity is low for the on-axis user, that is the display corners to not have high reflectivity. However, the off-axis snooper 27 sees high reflectivity across the display area, for example greater than 30%. Advantageously high visual security is achieved for all parts of the image area for the snooper viewing region. Further as the snooper moves towards a more on-axis position the luminance may increase, but high reflectivity is maintained so that increased visual security levels are achieved away from the optimisation polar location.

Other arrangements of curved view angle control elements 360 will now be described.

Figure 8A:
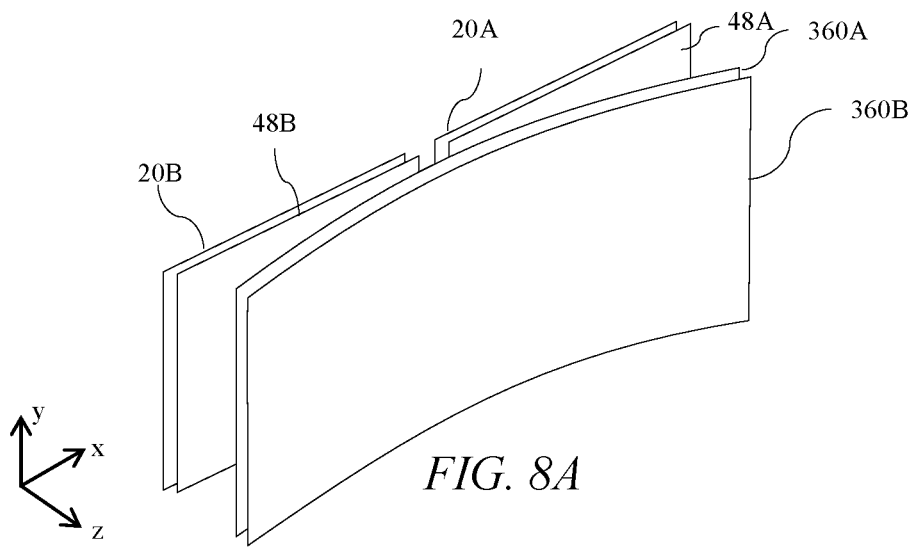
FIG. 8A is a schematic diagram illustrating in perspective front view a privacy display apparatus comprising two planar spatial light modulators and first and second curved view angle control elements.
Figure 8B:
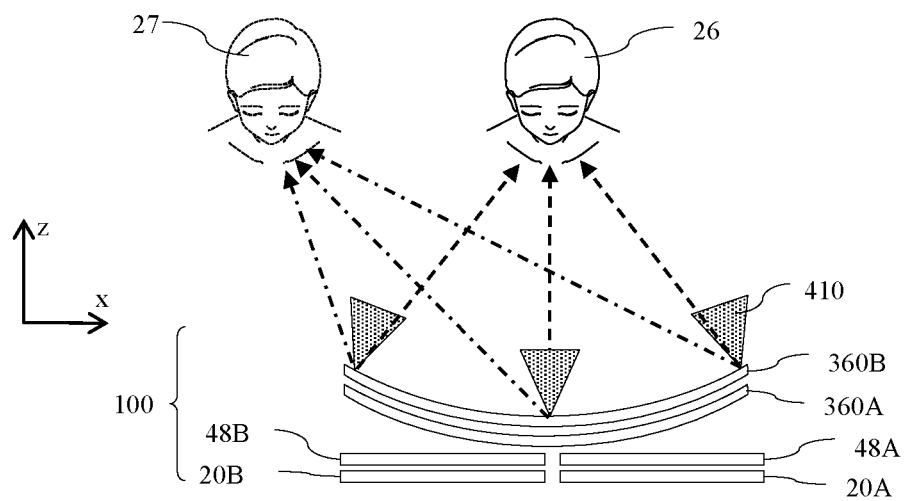
FIG. 8B is a schematic diagram illustrating in top view the privacy display apparatus of FIG. 8A.

FIG. 8A is a schematic diagram illustrating in perspective front view a privacy display apparatus 100 comprising two planar spatial light modulators 48A, 48B and a curved view angle control element comprising first and second curved view angle control elements 360A, 360B; and FIG. 8B is a schematic diagram illustrating in top view the privacy display apparatus of FIG. 8A. Features of the embodiment of FIGS. 8A-B not discussed in further detail may be assumed to correspond to the features with equivalent reference numerals as discussed above, including any potential variations in the features.

In comparison to FIG. 1, the spatial light modulators 48A, 48B may be planar. Advantageously image distortion on the surface of the curved spatial light modulator may be reduced. For example straight lines may be perceived as straight to the display user 360 rather than being curved due to spatial light modulator 48 surface curvature of FIG. 1.

However, as illustrated in FIGS. 6-7, the curved view angle control elements 360A, 360B may maintain light cones 410 that are directed towards the primary user 26 so that advantageously high image uniformity is observed.

Figure 9:
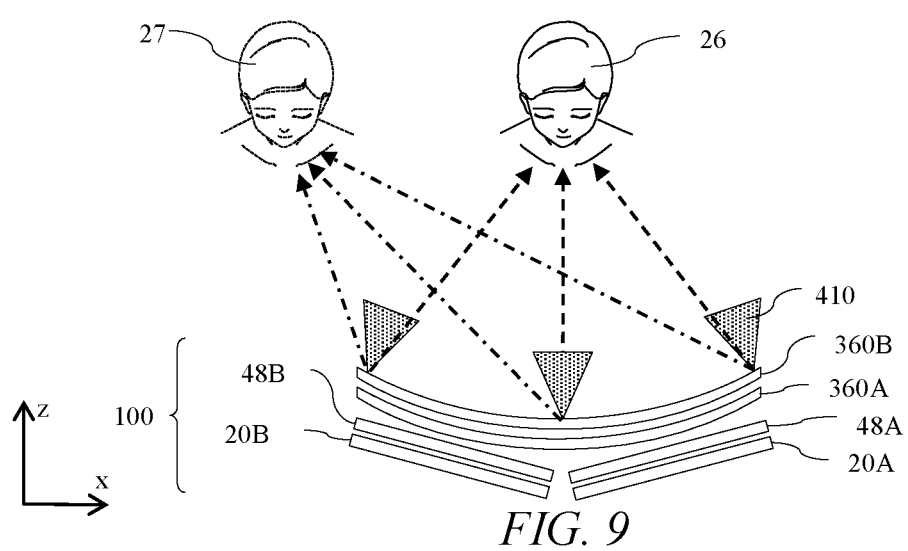
FIG. 9 is a schematic diagram illustrating in top view a privacy display comprising two tilted planar spatial light modulators and a curved view angle control element comprising first and second curved view angle control elements.

FIG. 9 is a schematic diagram illustrating in top view a privacy display comprising two tilted planar spatial light modulators and a curved view angle control element comprising first and second curved view angle control elements. Features of the embodiment of FIG. 9 not discussed in further detail may be assumed to correspond to the features with equivalent reference numerals as discussed above, including any potential variations in the features.

The tilted spatial light modulators 48A, 48B may provide desirable multiple display configurations for typical multi-screen environments while achieving increased uniformity in privacy mode to the central observer 326.

Arrangements with single backlights 20 will now be described.

Figure 10A:
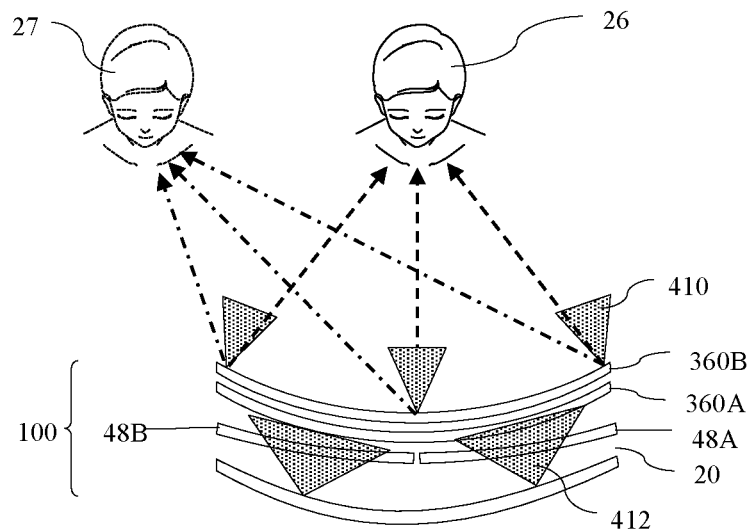
FIG. 10A is a schematic diagram illustrating in top view a privacy display comprising two tilted curved spatial light modulators, a single curved backlight and first and second curved view angle control elements.
Figure 10B:
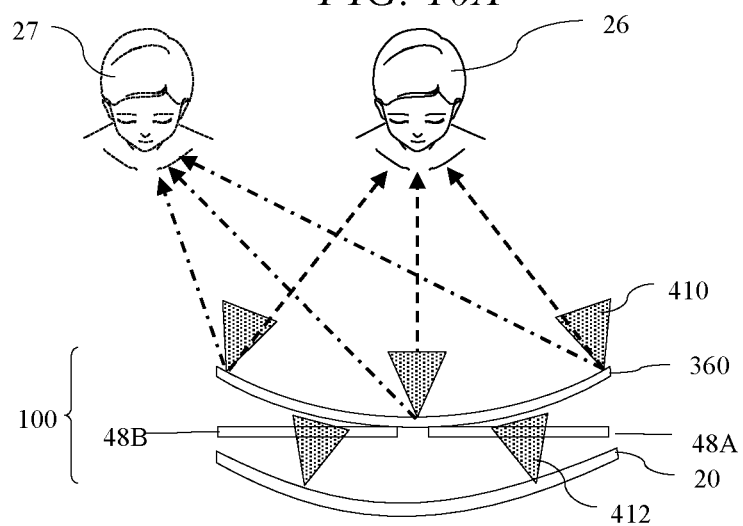
FIG. 10B is a schematic diagram illustrating in top view a privacy display comprising two planar spatial light modulators, a single curved collimated backlight and a curved view angle control element.

FIG. 10A is a schematic diagram illustrating in top view a privacy display comprising two tilted planar spatial light modulators, a single curved backlight and a curved view angle control element comprising first and second curved view angle control elements; and FIG. 10B is a schematic diagram illustrating in top view a privacy display comprising two planar spatial light modulators, a single curved collimated backlight and a curved view angle control element 360.

In FIGS. 10A-B a single backlight 20 is provided to illuminate the spatial light modulators 48A, 48B. FIG. 10A illustrates that the backlight 20 may have a relatively high luminance roll-off light cone 412 (but not Lambertian), while FIG. 10B shows that a collimated backlight of the types illustrated in FIGS. 19I-E below with narrow light cones 412.

Advantageously, the backlight 20 light cones 412 and view angle correction elements 360 cooperate to provide increased uniformity for the head-on user in front of the display, and to increase visual security level to the snooper. Further the curvature of the spatial light modulator may be independent of the curvature of the spatial light modulators 48A, 48B.

Various arrangements with single spatial light modulators 48 will now be described.

Figure 11:
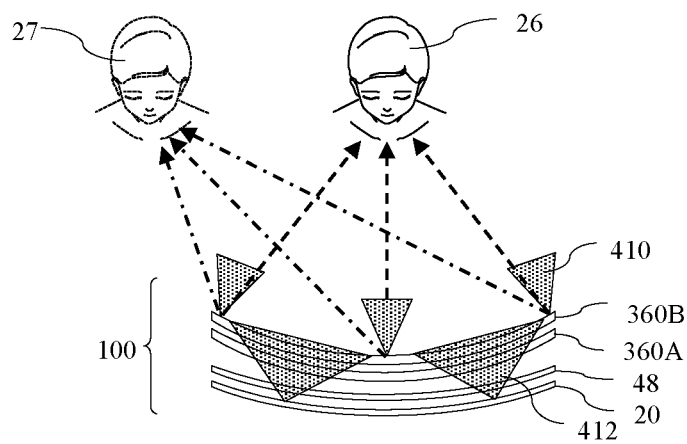
FIG. 11 is a schematic diagram illustrating in top view a privacy display comprising a curved spatial light modulator and backlight and first and second curved view angle control elements wherein the curvature of the spatial light modulator and backlight is less than the curvature of the view angle control elements.
Figure 12:
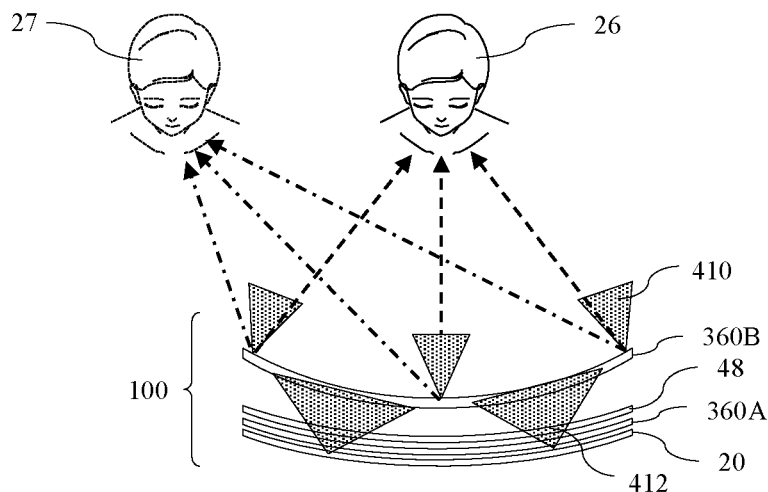
FIG. 12 is a schematic diagram illustrating in top view a privacy display comprising a curved backlight and first curved view angle control element arranged behind a curved spatial light modulator, and a second curved view angle control element arranged to receive light from the spatial light modulator wherein the curvature of the spatial light modulator, backlight and first view angle control element is less than the curvature of the second view angle control element.
Figure 13:
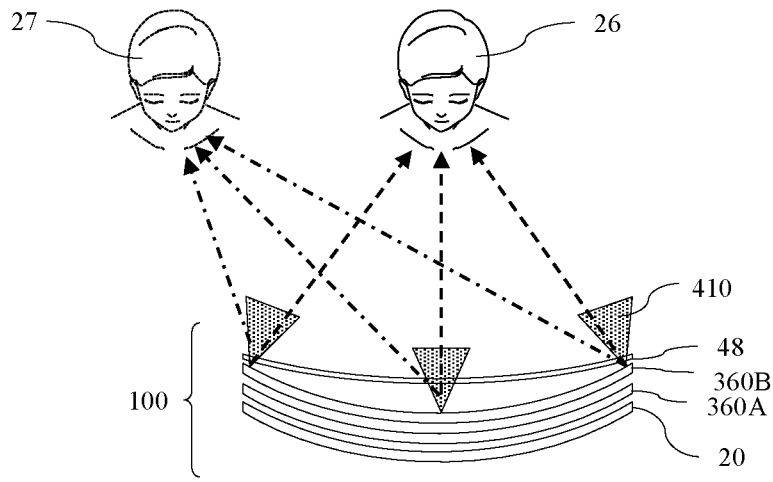
FIG. 13 is a schematic diagram illustrating in top view a privacy display comprising a curved backlight and first and second curved view angle control elements arranged behind a curved spatial light modulator wherein the curvature of the spatial light modulator is less than the curvature of the view angle control elements and backlight.
Figure 14:
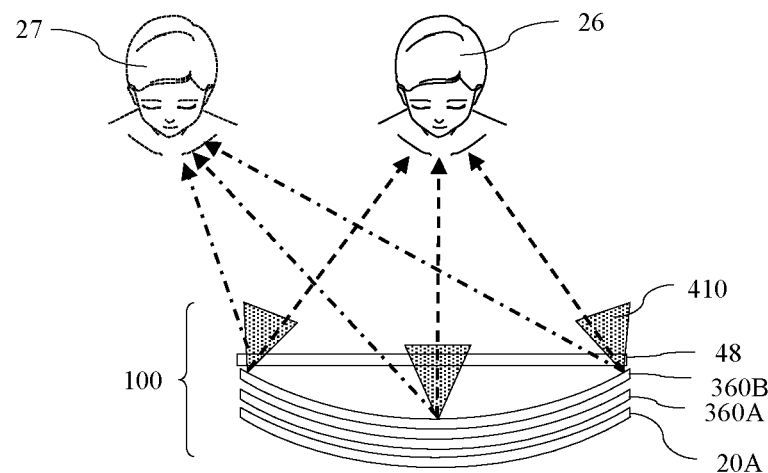
FIG. 14 is a schematic diagram illustrating in top view a privacy display comprising a curved backlight and first and second curved view angle control elements arranged behind a planar spatial light modulator.
Figure 15:
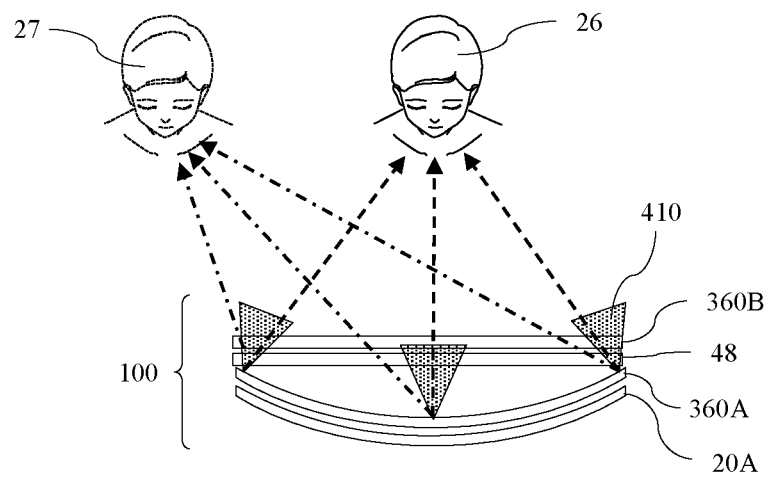
FIG. 15 is a schematic diagram illustrating in top view a privacy display comprising a curved backlight and first curved view angle control elements arranged behind a planar spatial light modulator and planar view angle control element.

FIG. 11 is a schematic diagram illustrating in top view a privacy display comprising a curved spatial light modulator and backlight and a curved view angle control element comprising first and second curved view angle control elements wherein the curvature of the spatial light modulator and backlight is less than the curvature of the view angle control elements; FIG. 12 is a schematic diagram illustrating in top view a privacy display comprising a curved backlight and first curved view angle control element arranged behind a curved spatial light modulator, and a second curved view angle control element arranged to receive light from the spatial light modulator wherein the curvature of the spatial light modulator, backlight and first view angle control element is less than the curvature of the second view angle control element; FIG. 13 is a schematic diagram illustrating in top view a privacy display comprising a curved backlight and first and second curved view angle control elements arranged behind a curved spatial light modulator wherein the curvature of the spatial light modulator is less than the curvature of the view angle control elements and backlight; FIG. 14 is a schematic diagram illustrating in top view a privacy display comprising a curved backlight and first and second curved view angle control elements arranged behind a planar spatial light modulator; and FIG. 15 is a schematic diagram illustrating in top view a privacy display comprising a curved backlight and first curved view angle control elements arranged behind a planar spatial light modulator and planar view angle control element.

Features of the embodiment of FIGS. 11-15 not discussed in further detail may be assumed to correspond to the features with equivalent reference numerals as discussed above, including any potential variations in the features.

FIG. 11 illustrates an embodiment similar to FIG. 1 comprising a single spatial light modulator 48 and backlight 20, wherein the curvature of the spatial light modulator 48 and backlight is different from the curvature of the view angle control elements 360A, 360B. Advantageously distortion of straight lines on the spatial light modulator 48 are reduced, while the uniformity in privacy mode is improved. Further, the luminance uniformity in public mode is improved in comparison to planar untilted spatial light modulators 48A, 48B of FIG. 9.

FIG. 12 illustrates an embodiment wherein one view angle control element 360A is arranged between the at least one spatial light modulator 48 and the backlight 20. The added thickness of the curved front elements may be advantageously reduced, while a reflective front view angle control element 360B of the type illustrated in FIG. 3A may be used to advantageously increase visual security level to off-axis users 27.

FIGS. 13-14 illustrate that both view angle control elements 360A, 360B may be arranged between the backlight 20 and the spatial light modulator 48 which may be curved as in FIG. 13 or planar as in FIG. 14. Advantageously the linearity of straight image lines may be provided independently of the uniformity provided to the display user 26.

FIG. 15 illustrates that planar view angle control element 360B may be applied to the front of a planar spatial light modulator while curved view angle control element 360A is provided between a curved collimated backlight 20 and the spatial light modulator. Advantageously display uniformity may be increased while the thickness of the front-of-screen elements is reduced while achieving switchable reflectivity with the type of view angle control element 360B illustrated in FIG. 3A.

View angle control elements will now be described.

Figure 16:
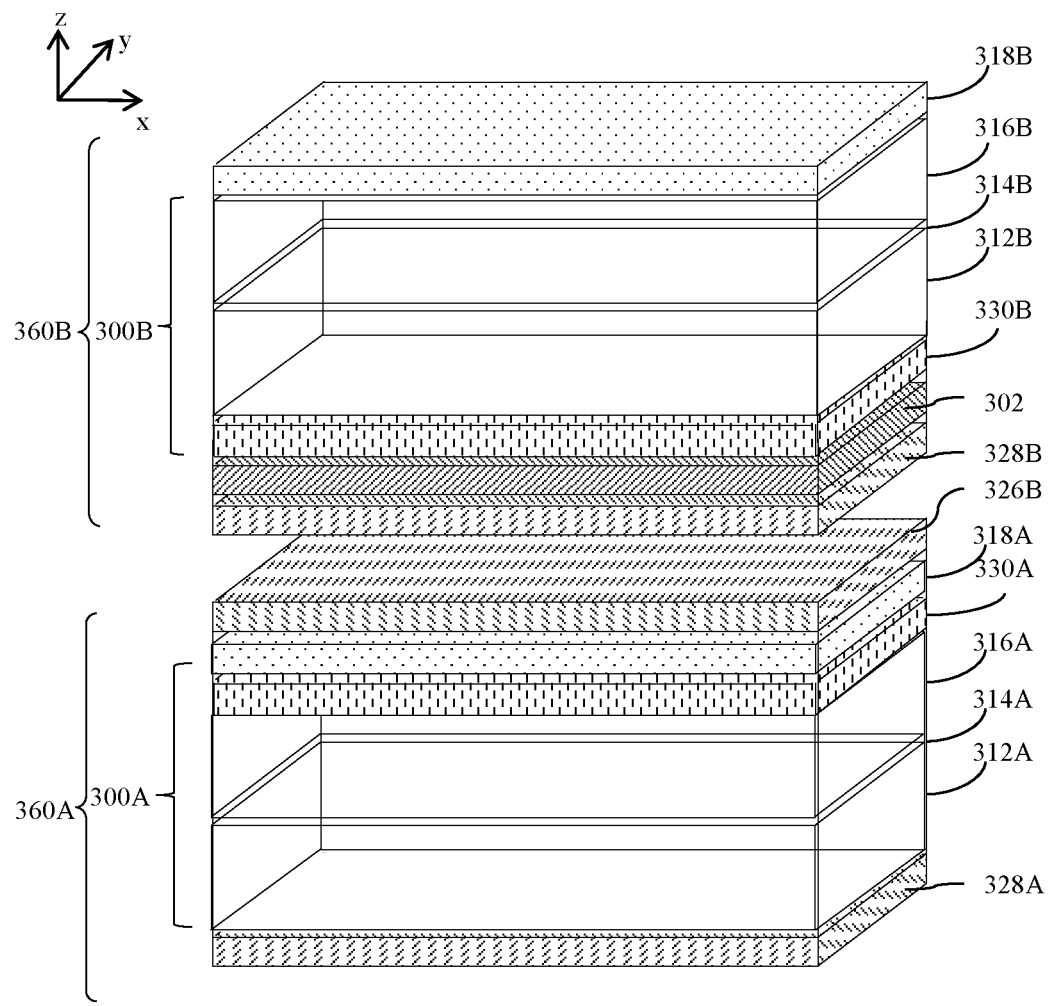
FIG. 16 is a schematic diagram illustrating in perspective side view angle control elements for use in the privacy display apparatuses of FIGS. 8A-15.

FIG. 16 is a schematic diagram illustrating in perspective side view angle control elements for use in the privacy display apparatus of FIG. 3A. Features of the embodiment of FIG. 16 not discussed in further detail may be assumed to correspond to the features with equivalent reference numerals as discussed above, including any potential variations in the features. View angle control elements 360A, 360B may be provided on spatial light modulators 48 that may be provided with quarter waveplates 328A, 326B, 328B.

In order to achieve front of display components with different curvatures, it would be desirable to provide air gaps between the spatial light modulator 48 and the view angle control elements 360A, 360B. Without control of reflections, such air gaps would degrade image contrast due to surface reflections. Such reflections can be reduced by means of the air gap retarders 326, 328. The operation of the air gap input retarder 326B and air gap output retarder 328B will now be described at the air gap 619B of FIG. 3A.

Figure 17:
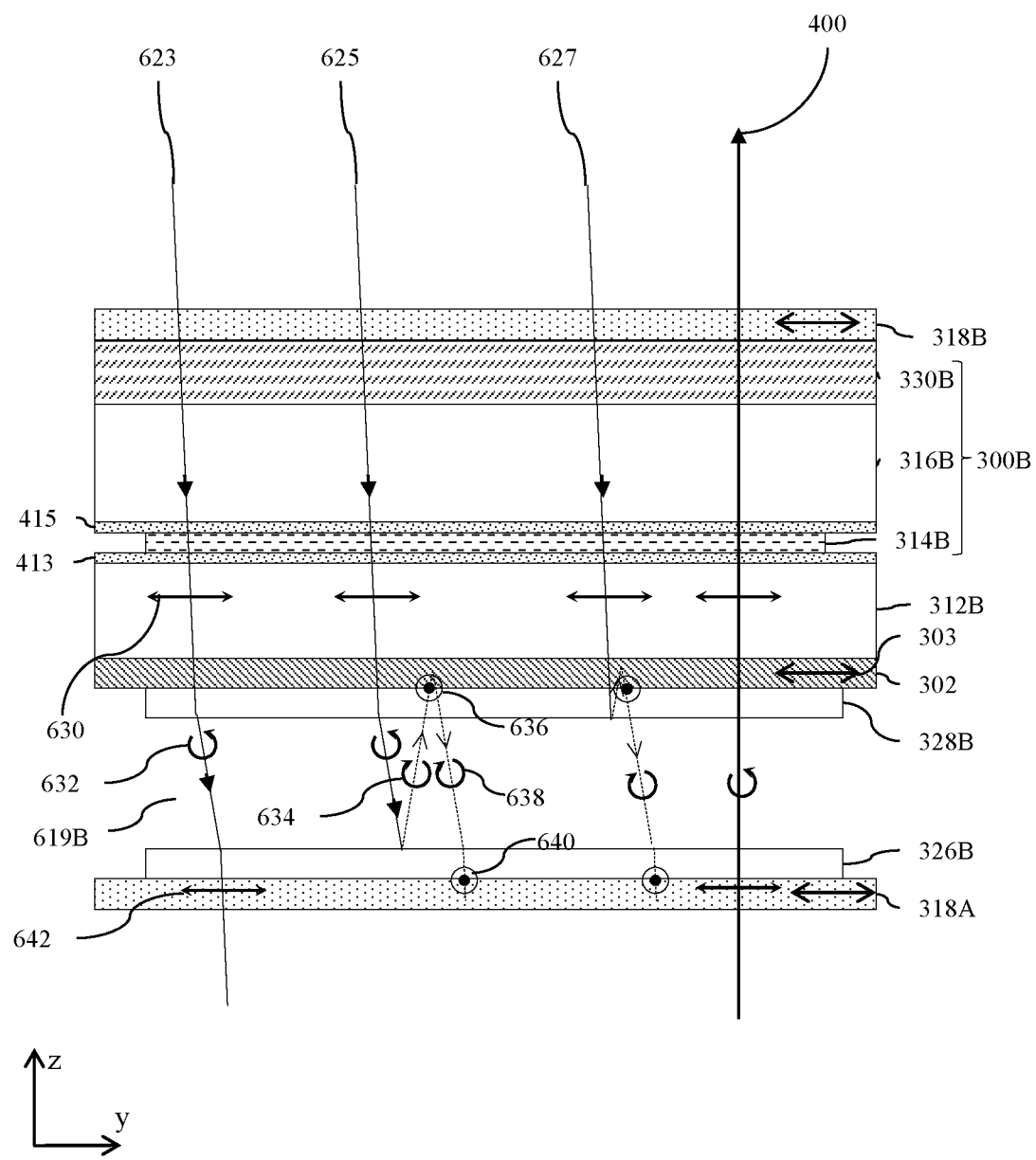
FIG. 17 is a schematic diagram illustrating in side view surface reflections in a privacy display apparatus comprising a pair of quarter waveplates arranged on opposite sides of an air gap.

FIG. 17 is a schematic diagram illustrating in side view surface reflections in part of a privacy display apparatus comprising a pair of quarter waveplates arranged on opposite sides of the air gap 619B.

The air gap input retarder 326B is arranged on one side of the air gap 619B and air gap output retarder 328B is arranged on the opposite side of the air gap 619B and comprise respectively quarter waveplates.

The first and second quarter waveplates of the air gap input and output retarders 326B, 328B have optical axes that are crossed; and light 400 from the spatial light modulator 48 has a polarisation component that undergoes equal and opposite phase shifts in the first and second crossed retarders 326B, 328B.

In operation on-axis ambient light rays 623 are incident onto the reflective polariser 302 with a polarisation component 630 that is substantially linear after transmission through the passive retarder 330 and switchable liquid crystal layer 314. The polarisation component 630 is parallel to the transmission electric vector direction of the reflective polariser 302 and is transmitted into the quarter waveplate of retarder 328B and undergoes a quarter wave phase shift to provide left circular polarisation component 632.

Quarter waveplate of retarder 328B provides an opposite phase shift for transmitted light ray 623 such that light is transmitted by polariser 218 and absorbed in the view angle control element 360A or spatial light modulator 48.

For output light rays 400, the crossed retarders 326B, 328B also cancel each other, advantageously achieving high output efficiency.

As illustrated by ambient light rays 625 some of the light at the interface of the quarter waveplate retarder 326B to air gap 619B undergoes a Fresnel reflection at which it undergoes a phase shift providing right circular polarisation component 634 that is incident onto quarter waveplate retarder 328B and converted to linear polarisation component 636 that is reflected at the reflective polariser 302 that is orthogonal to component 630. Such polarisation component is phase shifted to output right circular polarisation component 638 that is incident on quarter waveplate of retarder 326B that is phase shifted to linear polarisation state 640 that is extinguished by the display polariser 218.

Further as illustrated by ambient light rays 627, Fresnel reflections from the interface of the waveplate of retarder 328B are absorbed in a similar manner at the display polariser 218.

Advantageously a display with high on-axis contrast and low off-axis contrast may be provided while providing an air gap to increase yield and reduce cost and complexity of assembly. The angular variation of retardance with polar angle is small so that view angle control elements 360A, 360B may be provided with curved shapes, while maintaining high contrast images.

Returning to FIGS. 3A-B, the operation of the quarter waveplates 326A, 328A is similar to that of FIG. 17, other than the reflective polariser 302 is omitted and the operation of the quarter wave retarders 326A, 326B may be combined with the operation of the retarders 300A. Advantageously a display with high on-axis contrast and low off-axis luminance may be achieved while providing an air gap to increase yield and reduce cost and complexity of assembly.

Figure 18A:
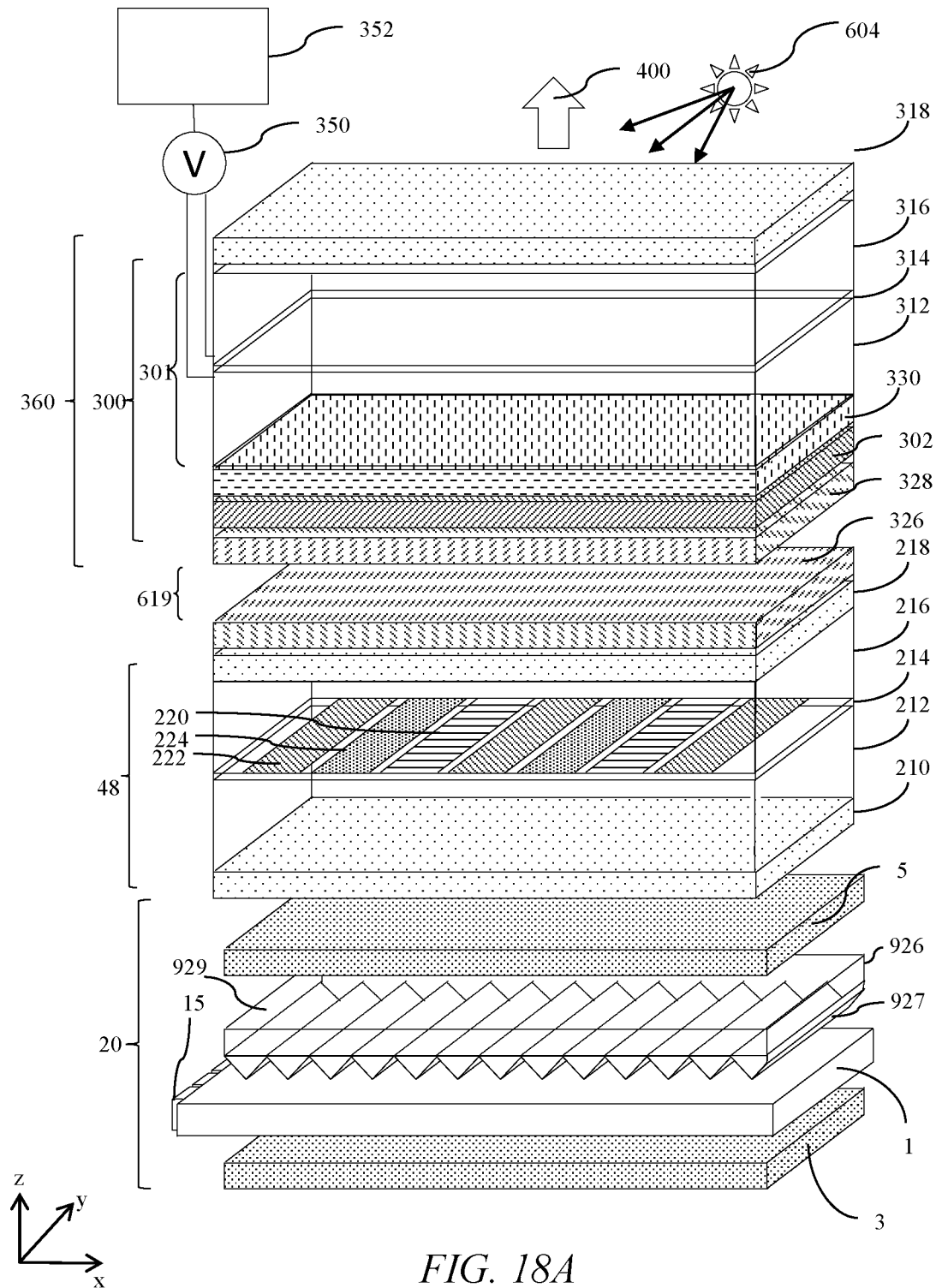
FIG. 18A is a schematic diagram illustrating in perspective side view a privacy display apparatus comprising a spatial light modulator, and single view angle control element.
Figure 18B:
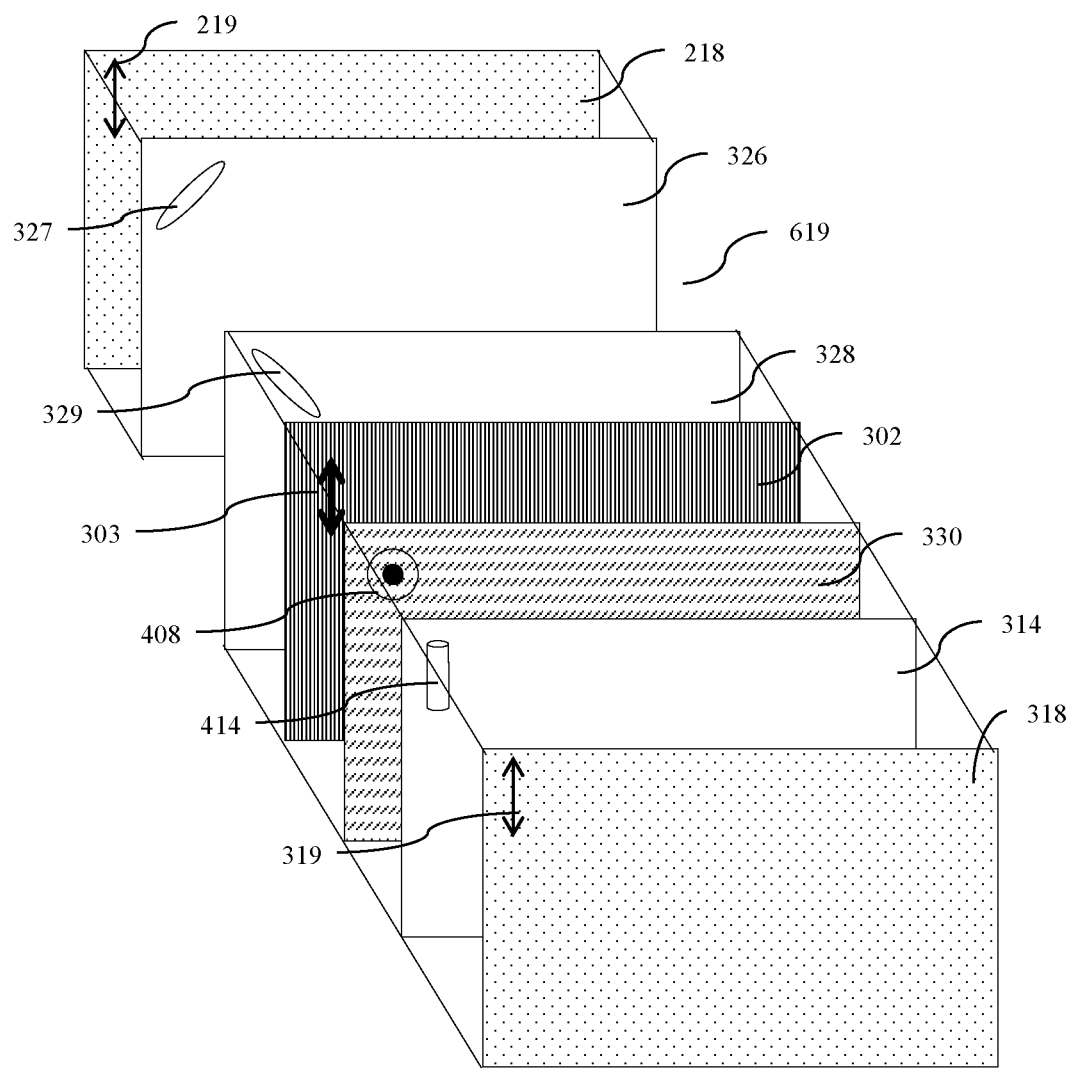
FIG. 18B is a schematic diagram illustrating in expanded view the arrangement of polarisers and retarders of FIG. 18A.

FIG. 18A is a schematic diagram illustrating in perspective side view a privacy display apparatus comprising a spatial light modulator, and single view angle control element; and FIG. 18B is a schematic diagram illustrating in expanded view the arrangement of polarisers and retarders of FIG. 18A. Features of the embodiment of FIGS. 18-19 not discussed in further detail may be assumed to correspond to the features with equivalent reference numerals as discussed above, including any potential variations in the features.

In comparison to the arrangements of FIGS. 3A-B, FIGS. 18-19 comprise a single view angle control element 360 rather than the separate elements 360A, 360B of FIG. 16.

Light turning film 926 comprises a prismatic layer with prismatic surfaces 927 arranged on a prismatic layer support substrate 929 is arranged between the optical waveguide 1 and the spatial light modulator to receive output light from the optical waveguide 1 and direct the output light through the spatial light modulator 48.

The prismatic layer is arranged between the optical waveguide 1 and the prismatic layer support substrate.

By way of comparison, in arrangements of spatial light modulator 48 and optional backlight 20 that have wide luminance fields of view as illustrated in FIG. 4 for example, a single element 360 may provide relatively high luminance for off-axis viewing directions in privacy mode of operation. Such high luminance would provide undesirably low visual security to an off-axis snooper 27. Light turning film 926 is arranged so that elongate prismatic surfaces 927 are arranged between prismatic layer support substrate 929 and waveguide 1 of the backlight 20. Advantageously light cones with low luminance for off-axis viewing locations may be provided as will be described further below.

It would be desirable to reduce the luminance to the off-axis snooper 27.

The backlight 20 may be a directional backlight that provides a luminance at polar angles to the normal to the spatial light modulator greater than 45 degrees that is at most 30% of the luminance along the normal to the spatial light modulator, preferably at most 20% of the luminance along the normal to the spatial light modulator, and more preferably at most 10% of the luminance along the normal to the spatial light modulator.

In comparison to the arrangement of FIG. 3A, in an illustrative embodiment of FIG. 18A the luminance at polar angles to the normal to the spatial light modulator greater than 45 degrees may be at most 18%. Such backlights 20 can be provided by means of collimating waveguides 1 for example, that are provided with surface extraction features that extract at angles close to grazing incidence from the waveguide surface and with narrow lateral angles. Such known collimating waveguides 1 may comprise lenticular surfaces and prismatic extraction features.

It would be desirable to provide further reduction of off-axis luminance by means of directional illumination from the spatial light modulator 48. Directional illumination of the spatial light modulator 48 by directional backlights 20 will now be described.

Figure 19A:
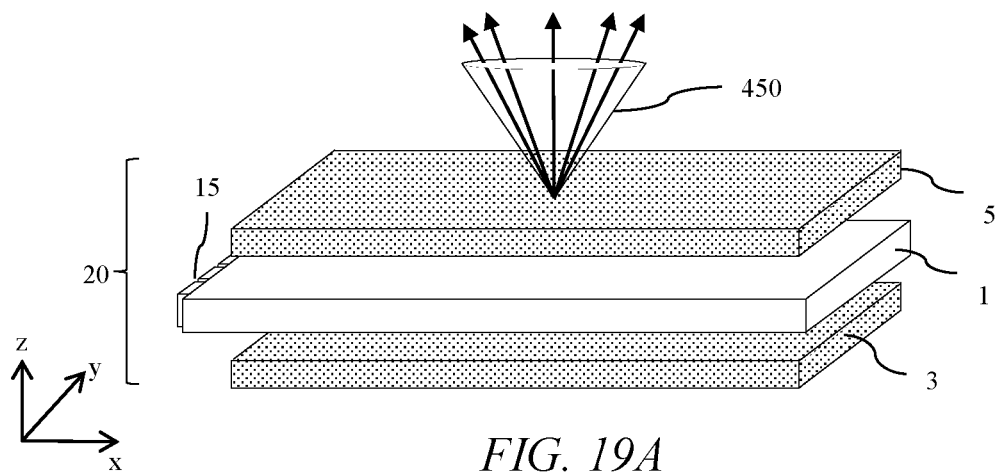
FIG. 19A is a schematic diagram illustrating in front perspective view a directional backlight.
Figure 19B:
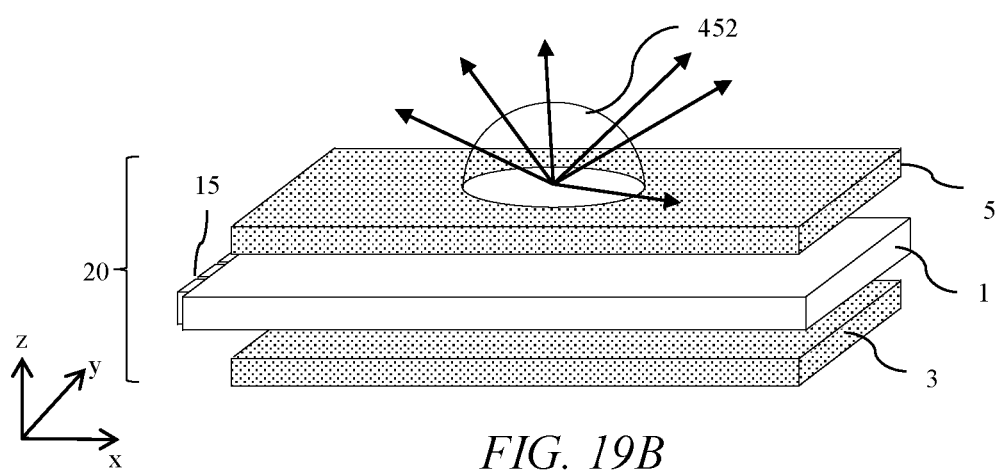
FIG. 19B is a schematic diagram illustrating in front perspective view a non-directional backlight.

FIG. 19A is a schematic diagram illustrating in front perspective view a directional backlight 20, and FIG. 19B is a schematic diagram illustrating in front perspective view a non-directional backlight 20, either of which may be applied in any of the devices described herein. Thus a directional backlight 20 as shown in FIG. 19A provides a narrow cone 450, whereas a non-directional backlight 20 as shown in FIG. 19B provides a wide angular distribution cone 452 of light output rays.

Figure 19C:
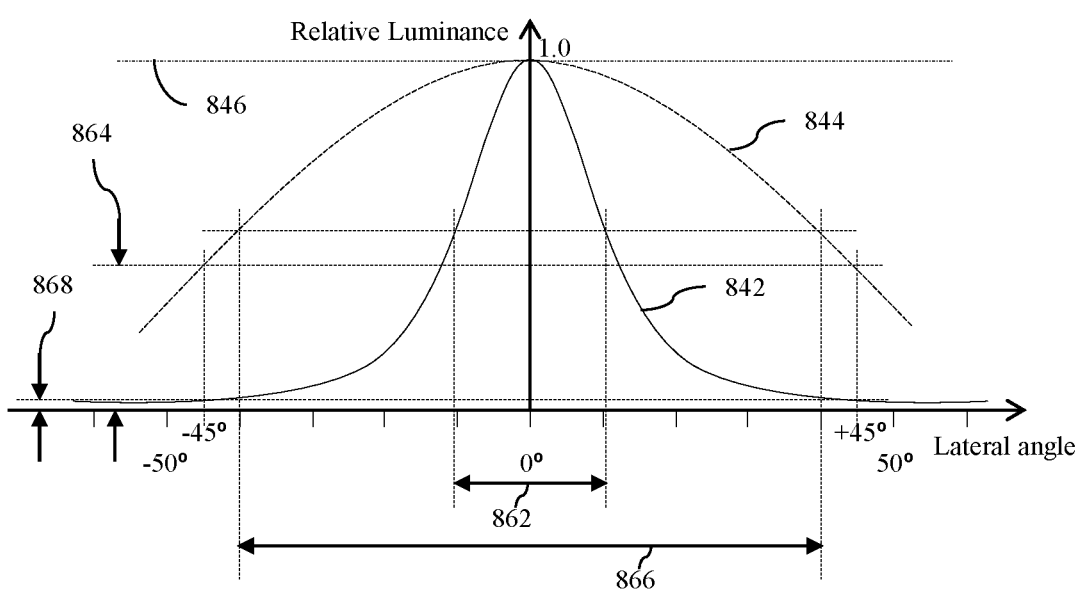
FIG. 19C is a schematic graph illustrating variation with luminance with lateral viewing angle of displays with different fields of view.

FIG. 19C is a schematic graph illustrating variation with luminance with lateral viewing angle for various different backlight arrangements. The graph of FIG. 19C may be a cross section through the polar field-of-view profiles described herein.

A Lambertian backlight has a luminance profile 846 that is independent of viewing angle.

A typical wide angle backlight has a roll-off 844 at higher angles such that the full width half maximum 866 of relative luminance may be greater than 40 degrees, preferably greater than 60 degrees and most preferably greater than 80 degrees. Further the relative luminance 864 at +/−45 degrees, is preferably greater than 7.5%, more preferably greater than 10% and most preferably greater than 20%.

By way of comparison a directional backlight 20 has a roll-off at higher angles such that the full width half maximum 862 of relative luminance may be less than 60 degrees, preferably less than 40 degrees and most preferably less than 20 degrees. Further the backlight 20 may provide a luminance 868 at polar angles to the normal to the spatial light modulator 48 greater than 45 degrees that is at most 33% of the luminance along the normal to the spatial light modulator 48, preferably at most 20% of the luminance along the normal to the spatial light modulator 48, and most preferably at most 10% of the luminance along the normal to the spatial light modulator 48.

Scatter and diffraction in the spatial light modulator 48 may degrade privacy mode operation when the switchable retarder 300 is arranged between the input display polariser 210 and additional polariser 318. The luminance at polar angles to the normal to the spatial light modulator greater than 45 degrees may be increased in arrangements wherein the switchable retarder 300 is arranged between the output display polariser 218 and additional polariser 318 in comparison to arrangements wherein the switchable retarder 300 is arranged between the input display polariser 210 and additional polariser 318.

Advantageously lower off-axis luminance may be achieved for the arrangement of FIG. 18A.

Figure 19D:
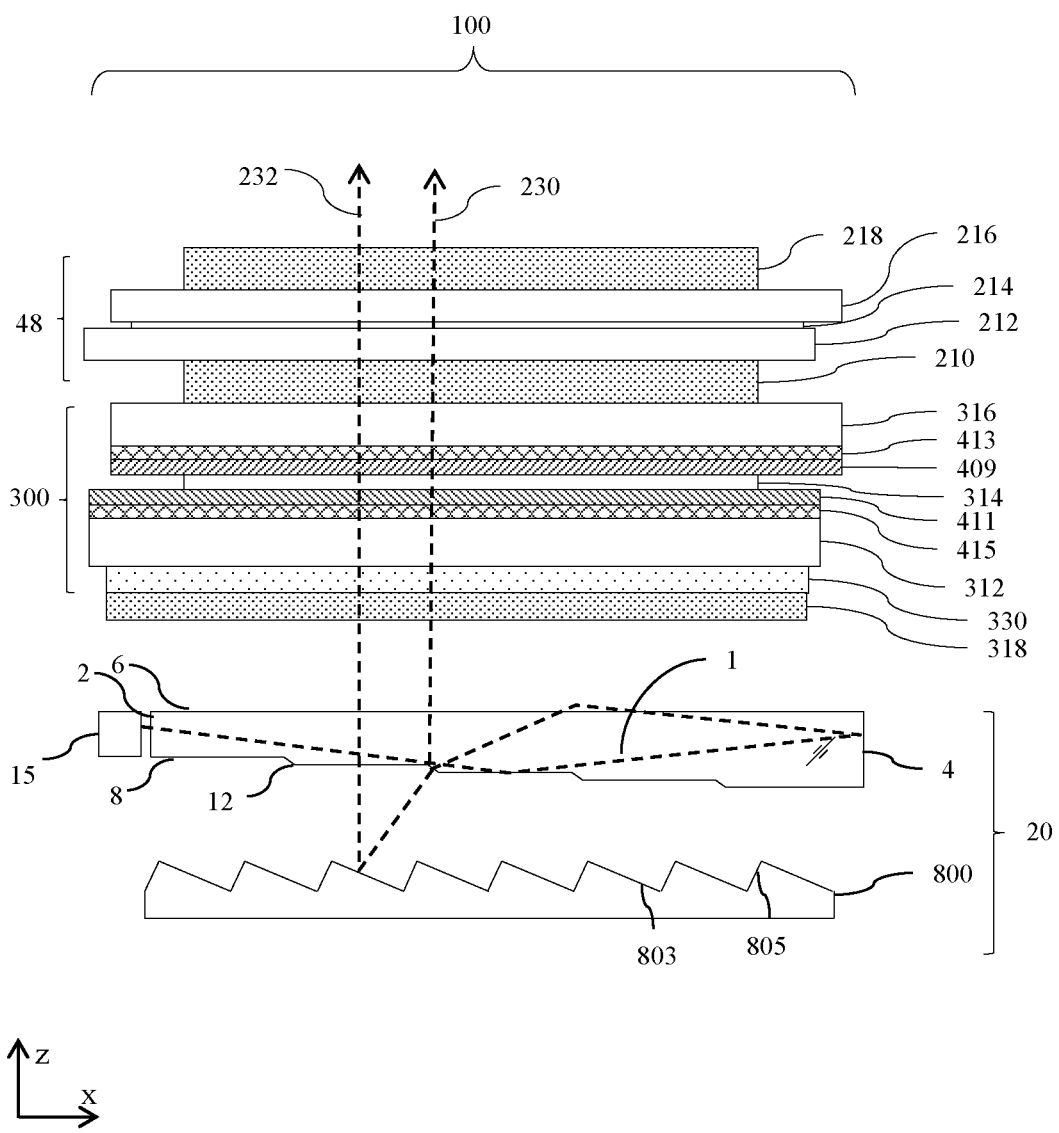
FIG. 19D is a schematic diagram illustrating in side view a switchable directional display apparatus comprising an imaging waveguide and switchable liquid crystal retarder.
Figure 19E:
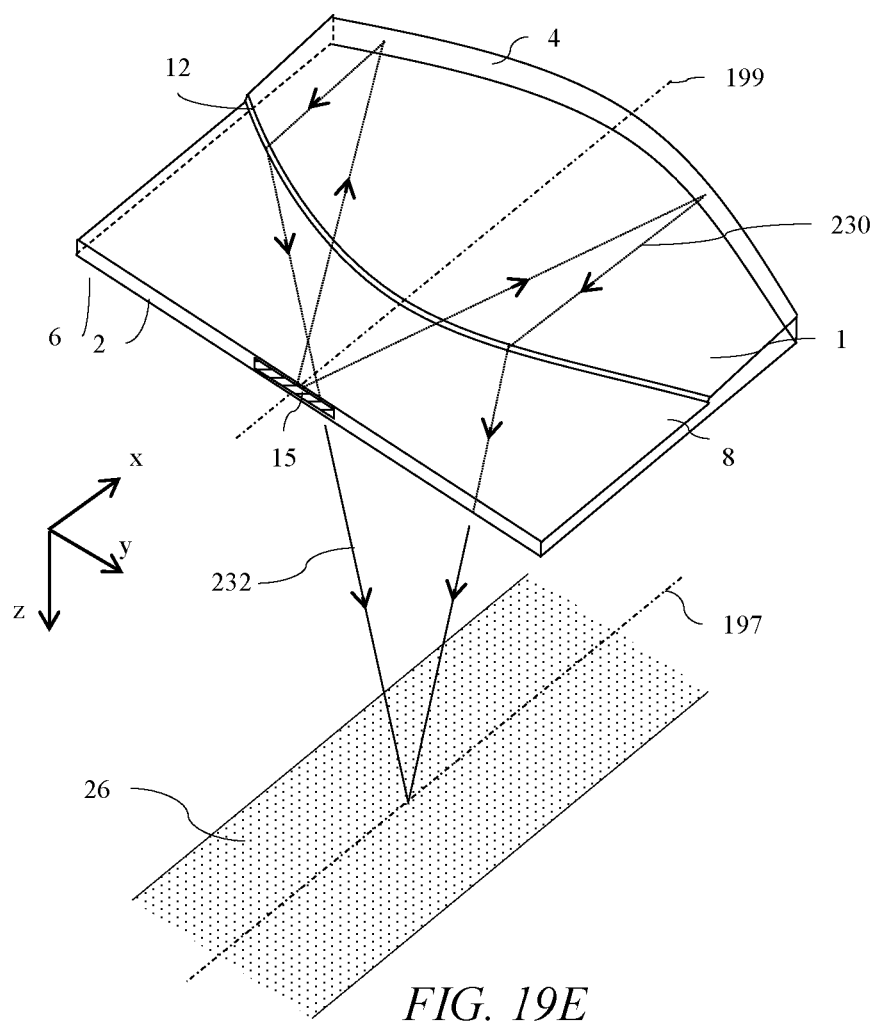
FIG. 19E is a schematic diagram illustrating in rear perspective view operation of an imaging waveguide in a narrow angle mode of operation.

FIG. 19D is a schematic diagram illustrating in side view a switchable directional display apparatus 100 comprising a switchable liquid crystal retarder 300 and backlight 20. The backlight 20 of FIG. 19D may be applied in any of the devices described herein and which comprises an imaging waveguide 1 illuminated by a light source array 15 through an input end 2. FIG. 19E is a schematic diagram illustrating in rear perspective view operation of the imaging waveguide 1 of FIG. 19D in a narrow angle mode of operation.

The imaging waveguides 1 is of the type described in U.S. Pat. No. 9,519,153, which is herein incorporated by reference in its entirety. The waveguide 1 has an input end 2 extending in a lateral direction along the waveguide 1. An array of light sources 15 are disposed along the input end 2 and input light into the waveguide 1.

The waveguide 1 also has opposed first and second guide surfaces 6, 8 extending across the waveguide 1 from the input end 2 to a reflective end 4 for guiding light input at the input end 2 forwards and back along the waveguide 1. The second guide surface 8 has a plurality of light extraction features 12 facing the reflective end 4 and arranged to deflect at least some of the light guided back through the waveguide 1 from the reflective end 4 from different input positions across the input end 2 in different directions through the first guide surface 6 that are dependent on the input position.

In operation, light rays are directed from light source array 15 through an input end and are guided between first and second guiding surfaces 6, 8 without loss to a reflective end 4. Reflected rays are incident onto facets 12 and output by reflection as light rays 230 or transmitted as light rays 232. Transmitted light rays 232 are directed back through the waveguide 1 by facets 803, 805 of rear reflector 800. Operation of rear reflectors are described further in U.S. Pat. No. 10,054,732, which is herein incorporated by reference in its entirety.

As illustrated in FIG. 19E, optical power of the curved reflective end 4 and facets 12 provide an optical window 26 that is transmitted through the spatial light modulator 48 and has an axis 197 that is typically aligned to the optical axis 199 of the waveguide 1. Similar optical window 26 is provided by transmitted light rays 232 that are reflected by the rear reflector 800.

Figure 19F:
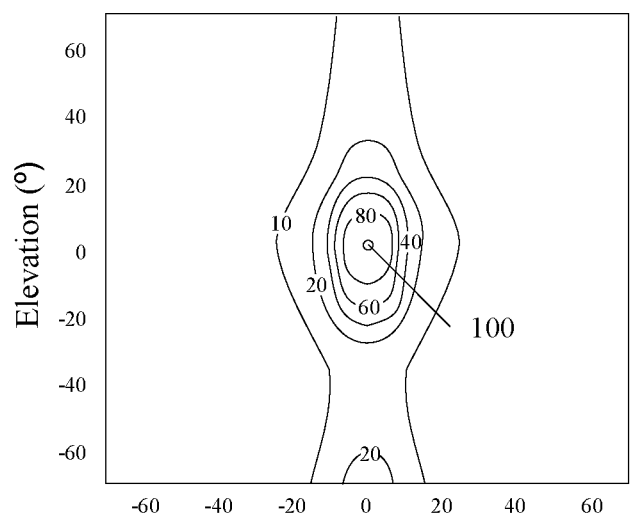
FIG. 19F is a schematic graph illustrating a field-of-view luminance plot of the output of FIG. 19E when used in a display apparatus with no switchable liquid crystal retarder.

FIG. 19F is a schematic graph illustrating field-of-view luminance plot of the output of FIG. 19E when used in a display apparatus with no switchable liquid crystal retarder.

Thus for off-axis viewing positions observed by snoopers 47 may have reduced luminance, for example between 1% and 3% of the central peak luminance at an elevation of 0 degrees and lateral angle of +/−45 degrees. Further reduction of off-axis luminance is achieved by the plural retarders 301, 330 of the present embodiments.

Another type of directional backlight with low off-axis luminance will now be described.

Figure 19G:
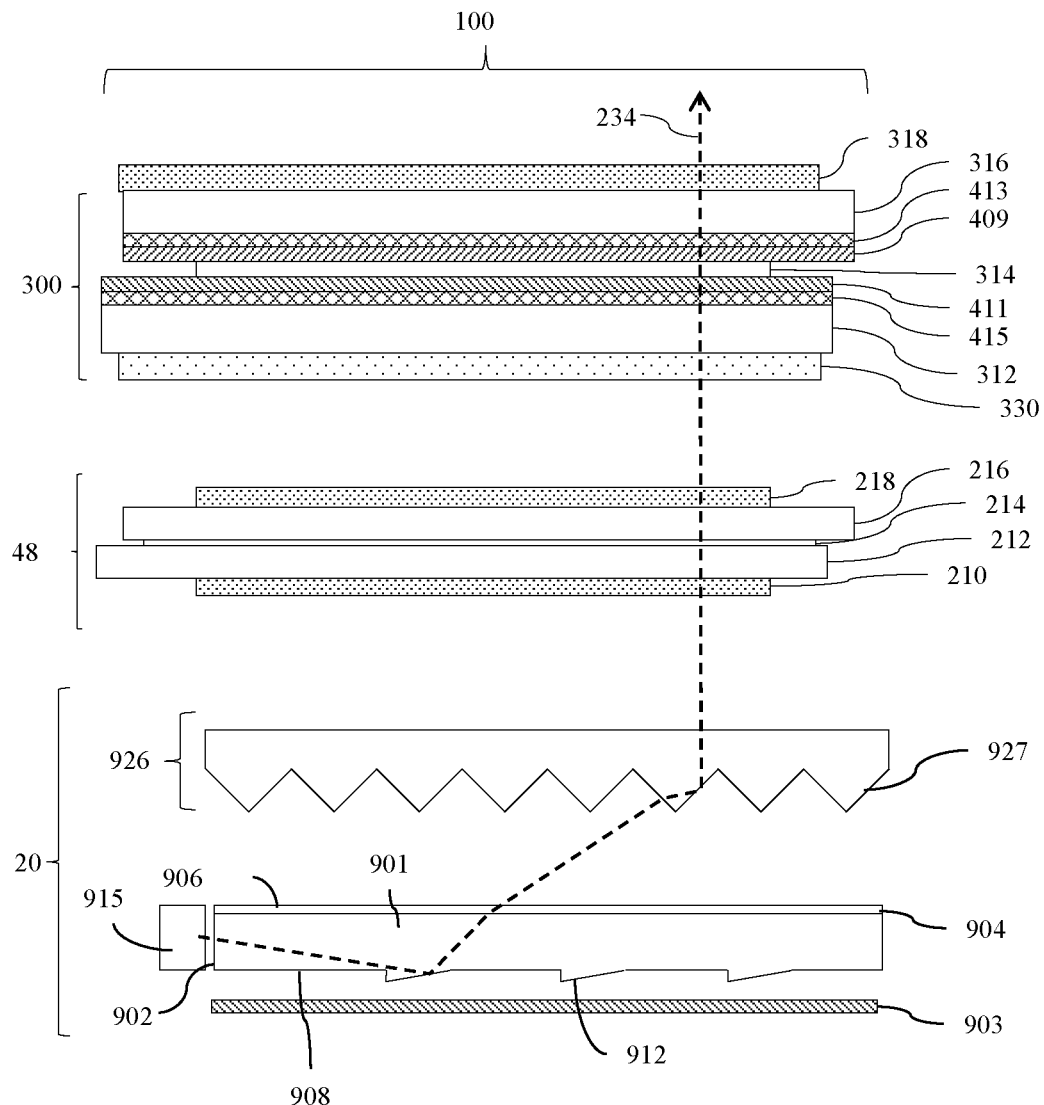
FIG. 19G is a schematic diagram illustrating in side view a switchable directional display apparatus comprising a switchable collimating waveguide and a switchable liquid crystal retarder operating in a privacy mode of operation.

FIG. 19G is a schematic diagram illustrating in side view a switchable directional display apparatus comprising a backlight 20 including a switchable collimating waveguide 901 and a switchable liquid crystal retarder 300 and additional polariser 318. The backlight 20 of FIG. 19G may be applied in any of the devices described herein and is arranged as follows.

The waveguide 901 has an input end 902 extending in a lateral direction along the waveguide 901. An array of light sources 915 are disposed along the input end 902 and input light into the waveguide 1. The waveguide 901 also has opposed first and second guide surfaces 906, 908 extending across the waveguide 1 from the input end 2 to a reflective end 4 for guiding light input at the input end 2 forwards and back along the waveguide 1. In operation, light is guided between the first and second guiding surface 906, 908.

The first guiding surface 906 may be provided with a lenticular structure 904 comprising a plurality of elongate lenticular elements 905 and the second guiding surface 908 may be provided with prismatic structures 912 which are inclined and act as light extraction features. The plurality of elongate lenticular elements 905 of the lenticular structure 904 and the plurality of inclined light extraction features deflect input light guided through the waveguide 901 to exit through the first guide surface 906.

A rear reflector 903 that may be a planar reflector is provided to direct light that is transmitted through the surface 908 back through the waveguide 901.

Output light rays that are incident on both the prismatic structures 912 and lenticular elements 905 of the lenticular structure 904 are output at angles close to grazing incidence to the surface 906. A prismatic turning film 926 comprising facets 927 is arranged to redirect output light rays 234 by total internal reflection through the spatial light modulator 48 and compensated switchable liquid crystal retarder 300.

Figure 19H:
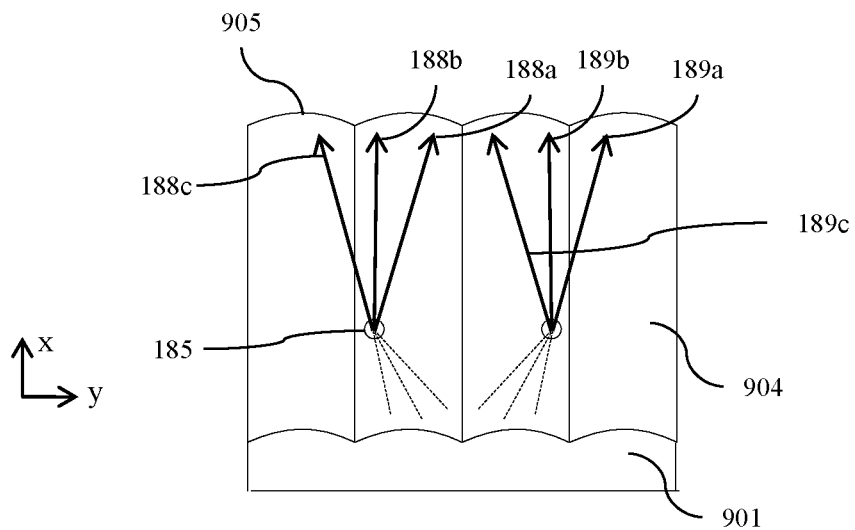
FIG. 19H is a schematic diagram illustrating in top view output of a collimating waveguide.

FIG. 19H is a schematic diagram illustrating in top view output of the collimating waveguide 901. Prismatic structures 912 are arranged to provide light at angles of incidence onto the lenticular structure 904 that are below the critical angle and thus may escape. On incidence at the edges of a lenticular surface, the inclination of the surface provides a light deflection for escaping rays and provides a collimating effect. Light ray 234 may be provided by light rays 188*a-c* and light rays 189a-c, with incidence on locations 185 of the lenticular structure 904 of the collimated waveguide 901.

Figure 19I:
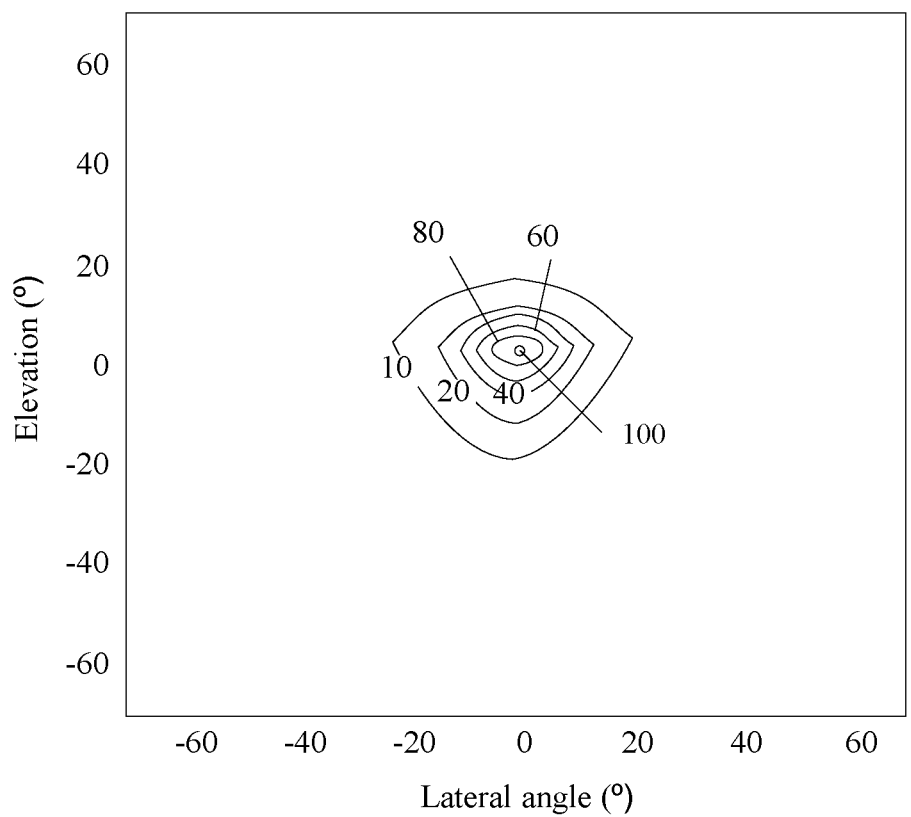
FIG. 19I is a schematic graph illustrating an iso-luminance field-of-view polar plot for the display apparatus of FIG. 19G.

FIG. 19I is a schematic graph illustrating an iso-luminance field-of-view polar plot for the display apparatus of FIG. 19G. Thus a narrow output light cone may be provided, with size determined by the structures 904, 912 and the turning film 926.

Advantageously in regions in which snoopers may be located with lateral angles of 45 degrees or greater for example, the luminance of output from the display is small, typically less than 2%. It would be desirable to achieve further reduction of output luminance. Such further reduction is provided by the compensated switchable liquid crystal retarder 300 and additional polariser 318 as illustrated in FIG. 19G. Advantageously a high performance privacy display with low off-axis luminance may be provided over a wide field of view.

Directional backlights such as the types described in FIG. 19D and FIG. 19G together with the plural retarders 301, 330 of the present embodiments may achieve off-axis luminance of less than 1.5%, preferably less than 0.75% and most preferably less than 0.5% may be achieved for typical snooper 47 locations. Further, high on-axis luminance and uniformity may be provided for the primary user 45. Advantageously a high performance privacy display with low off-axis luminance may be provided over a wide field of view, that may be switched to a wide angle mode by means of control of the switchable retarder 301 by means of control system 352 illustrated in FIG. 18A.

The waveguides 1 of the above embodiments may be curved to achieve curved backlights 20. In embodiments comprising curved concave backlights 20, similar improvements in image uniformity and visual security level may be obtained as illustrated for the curved view angle control embodiments illustrated in FIG. 5 for example.

It may be desirable to provide a mobile display device with curved view angle control element 360.

Figure 20:
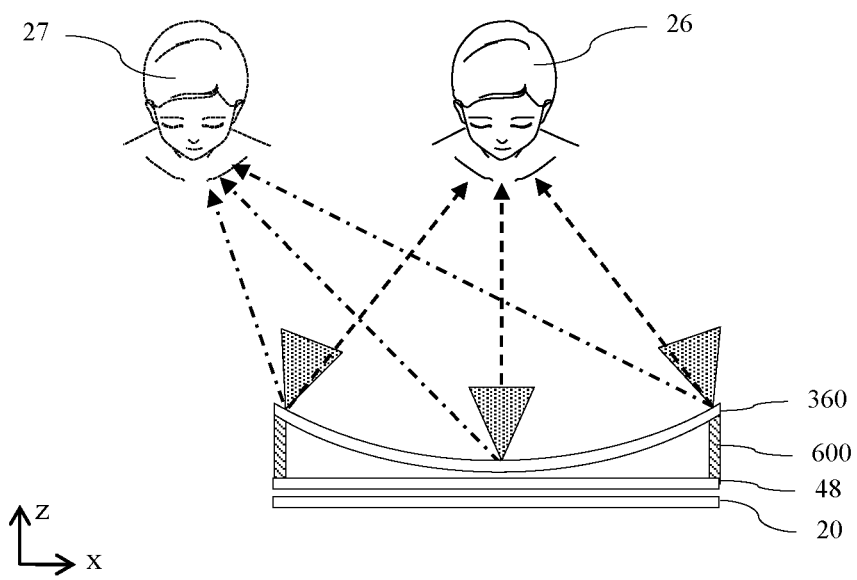
FIG. 20 is a schematic diagram illustrating in top view a display apparatus comprising a planar spatial light modulator and backlight, and a curved view angle control element in a display operating arrangement.
Figure 21:
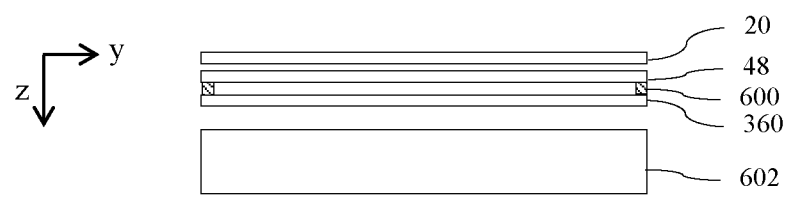
FIG. 21 is a schematic diagram illustrating in top view a display apparatus comprising a planar spatial light modulator and backlight, and a bendable view angle control element in a folded arrangement.

FIG. 20 is a schematic diagram illustrating in top view a display apparatus comprising a planar spatial light modulator and backlight, and a curved view angle control element in a display operating arrangement; and FIG. 21 is a schematic diagram illustrating in top view a display apparatus comprising a planar spatial light modulator and backlight, and a bendable view angle control element in a folded arrangement. Such arrangement may be applied to a foldable device such as a laptop for example. In operating mode as illustrated in FIG. 20, flexible members 600 are extended while the centre of the view angle control element 360 is held in close proximity to the spatial light modulator 48. In transport mode as illustrated in FIG. 21, the members 600 may retract and the element 360 may fold flat to keyboard 602, for example of a notebook device. Advantageously a compact display may be provided with increased uniformity to the head-on user in operating mode, and may be provided in a thin package in transportation mode.

The operation of retarder layers between parallel polarisers for off-axis illumination will now be described further. In the various devices described above, at least one retarder is arranged between the reflective polariser 318 and the additional polariser 218 in various different configurations. In each case, the at least one retarder is configured so that it does not affect the luminance of light passing through the reflective polariser 318, the at least one retarder, and the additional polariser 218 along an axis along a normal to the plane of the retarder(s) but it does reduce the luminance of light passing through the reflective polariser 318, the at least one retarder, and the additional polariser 218 along an axis inclined to a normal to the plane of the retarder(s), at least in one of the switchable states of the compensated switchable retarder 300. There will now be given a description of this effect in more detail, the principles of which may be applied in general to all of the devices described above.

Figure 22A:
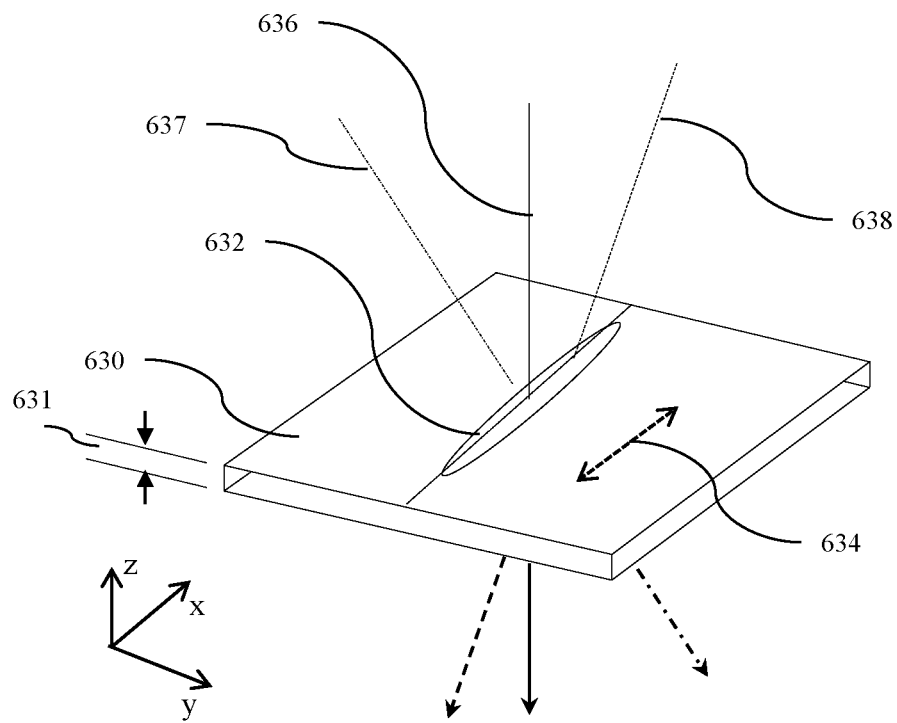
FIG. 22A is a schematic diagram illustrating in perspective view illumination of a retarder layer by off-axis light.

FIG. 22A is a schematic diagram illustrating in perspective view illumination of a retarder layer by off-axis light. Correction retarder 630 may comprise birefringent material, represented by refractive index ellipsoid 632 with optical axis direction 634 at 0 degrees to the x-axis, and have a thickness 631. Normal light rays 636 propagate so that the path length in the material is the same as the thickness 631. Light rays 637 that are in the y-z plane have an increased path length; however the birefringence of the material is substantially the same as the rays 636. By way of comparison light rays 638 that are in the x-z plane have an increased path length in the birefringent material and further the birefringence is different to the normal ray 636.

The retardance of the retarder 630 is thus dependent on the angle of incidence of the respective ray, and also the plane of incidence, that is rays 638 in the x-z will have a retardance different from the normal rays 636 and the rays 637 in the y-z plane.

The interaction of polarized light with the retarder 630 will now be described. To distinguish from the first and second polarization components during operation in a directional backlight 101, the following explanation will refer to third and fourth polarization components.

Figure 22B:
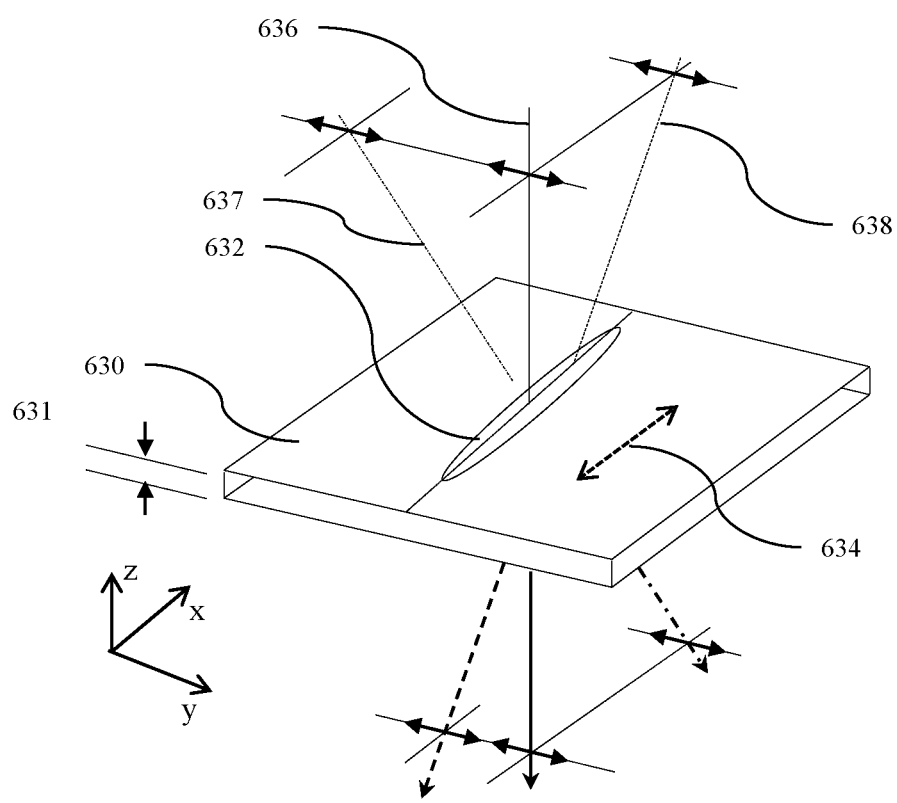
FIG. 22B is a schematic diagram illustrating in perspective view illumination of a retarder layer by off-axis light of a first linear polarization state at 0 degrees.
Figure 22C:
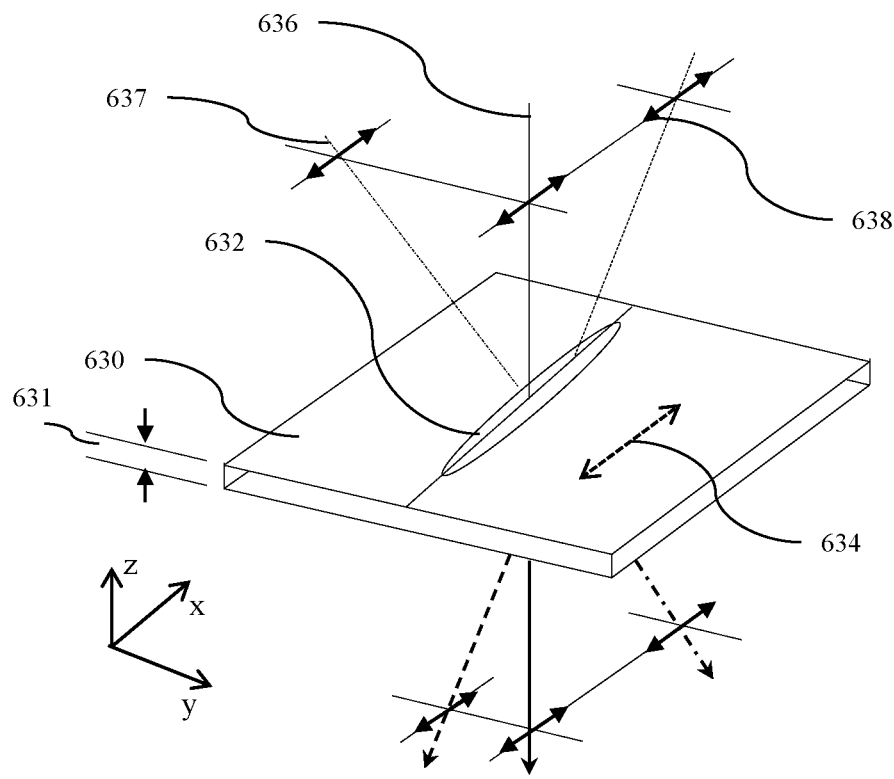
FIG. 22C is a schematic diagram illustrating in perspective view illumination of a retarder layer by off-axis light of a first linear polarization state at 90 degrees.

FIG. 22B is a schematic diagram illustrating in perspective view illumination of a retarder layer by off-axis light of a third linear polarization state at 90 degrees to the x-axis and FIG. 22C is a schematic diagram illustrating in perspective view illumination of a retarder layer by off-axis light of a fourth linear polarization state at 0 degrees to the x-axis. In such arrangements, the incident linear polarization states are aligned to the optical axes of the birefringent material, represented by ellipse 632. Consequently, no phase difference between the third and fourth orthogonal polarization components is provided, and there is no resultant change of the polarization state of the linearly polarized input for each ray 636, 637, 638. Thus, the retarder 630 introduces no phase shift to polarisation components of light passed by the polariser on the input side of the retarder 630 along an axis along a normal to the plane of the retarder 630. Accordingly, the retarder 630 does not affect the luminance of light passing through the retarder 630 and polarisers (not shown) on each side of the retarder 630. Although FIGS. 29A-C relate specifically to the retarder 630 that is passive, a similar effect is achieved by the retarders in the devices described above.

Figure 22D:
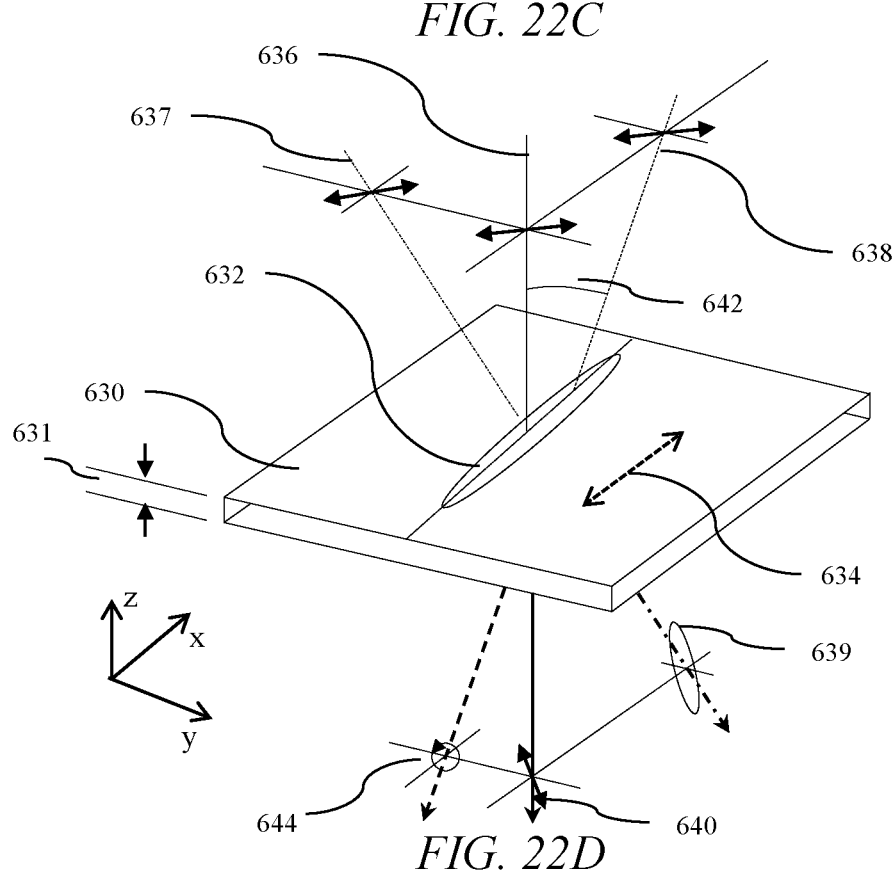
FIG. 22D is a schematic diagram illustrating in perspective view illumination of a retarder layer by off-axis light of a first linear polarization state at 45 degrees.

FIG. 22D is a schematic diagram illustrating in perspective view illumination of a retarder 630 layer by off-axis light of a linear polarization state at 45 degrees. The linear polarization state may be resolved into third and fourth polarization components that are respectively orthogonal and parallel to optical axis 634 direction. The retarder thickness 631 and material retardance represented by refractive index ellipsoid 632 may provide a net effect of relatively shifting the phase of the third and fourth polarization components incident thereon in a normal direction represented by ray 636 by half a wavelength, for a design wavelength. The design wavelength may for example be in the range of 500 to 550 nm.

At the design wavelength and for light propagating normally along ray 636 then the output polarization may be rotated by 90 degrees to a linear polarization state 640 at −45 degrees. Light propagating along ray 637 may see a phase difference that is similar but not identical to the phase difference along ray 637 due to the change in thickness, and thus an elliptical polarization state 639 may be output which may have a major axis similar to the linear polarization axis of the output light for ray 636.

By way of contrast, the phase difference for the incident linear polarization state along ray 638 may be significantly different, in particular a lower phase difference may be provided. Such phase difference may provide an output polarization state 644 that is substantially circular at a given inclination angle 642. Thus, the retarder 630 introduces a phase shift to polarisation components of light passed by the polariser on the input side of the retarder 630 along an axis corresponding to ray 638 that is inclined to a normal to the plane of the retarder 630. Although FIG. 29D relates to the retarder 630 that is passive, a similar effect is achieved by the retarders described above, in a switchable state of the switchable liquid crystal retarder corresponding to the privacy mode.

To illustrate the off-axis behaviour of retarder stacks, the angular luminance control of C-plates 308A, 308B between an additional polariser 318 and output display polariser 218 will now be described for various off-axis illumination arrangements with reference to the operation of a C-plate between the parallel polarisers 500, 210 will now be described.

Figure 23A:
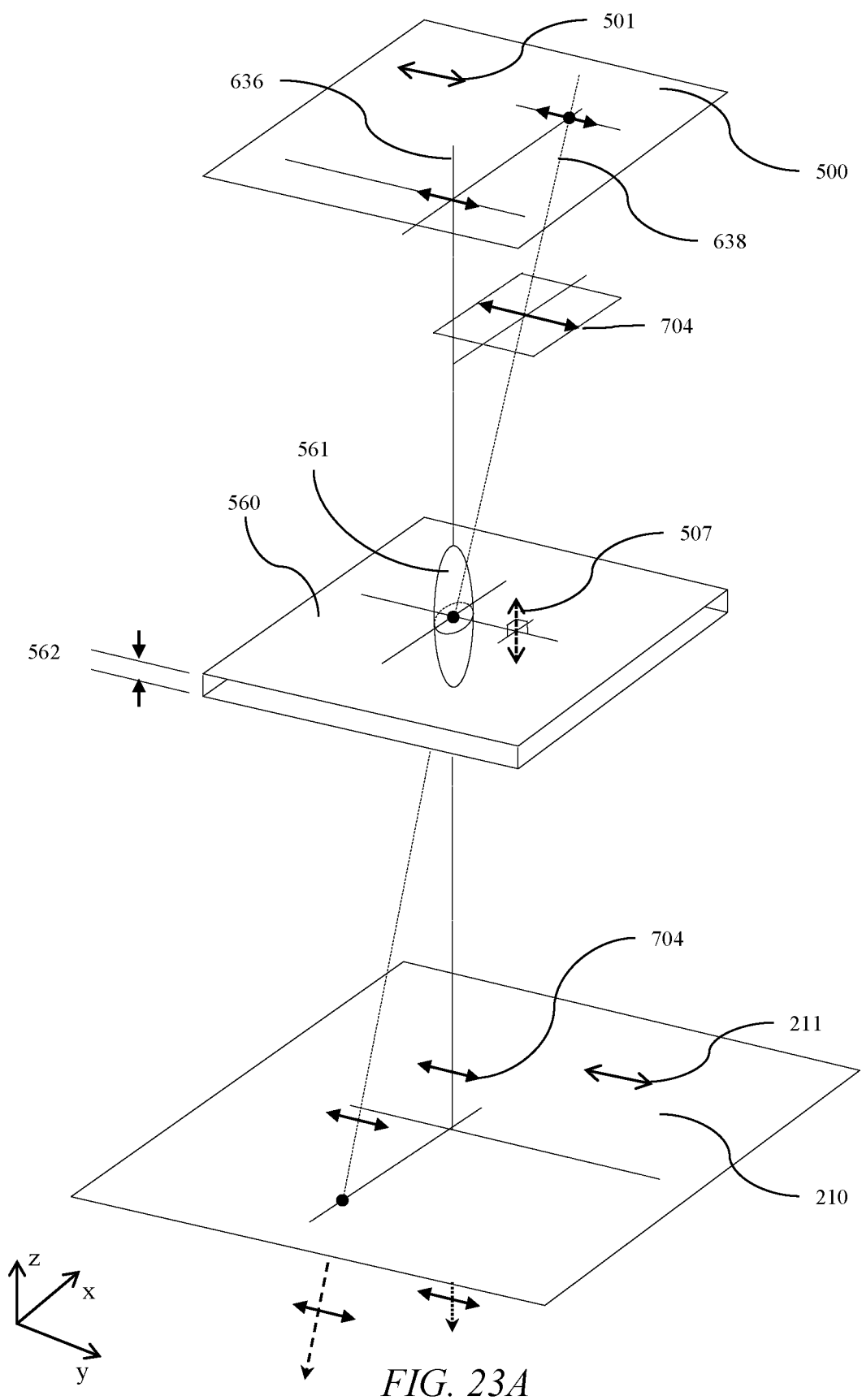
FIG. 23A is a schematic diagram illustrating in perspective view illumination of a C-plate retarder by off-axis polarised light with a positive elevation.

FIG. 23A is a schematic diagram illustrating in perspective view illumination of a C-plate layer by off-axis polarised light with a positive elevation. Incident linear polarisation component 704 is incident onto the birefringent material 632 of the retarder 560 that is a C-plate with optical axis direction 507 that is perpendicular to the plane of the retarder 560. Polarisation component 704 sees no net phase difference on transmission through the liquid crystal molecule and so the output polarisation component is the same as component 704. Thus a maximum transmission is seen through the polariser 210. Thus the retarder 560 having an optical axis 561 perpendicular to the plane of the retarder 560, that is the x-y plane. The retarder 560 having an optical axis perpendicular to the plane of the retarder comprises a C-plate.

Figure 23B:
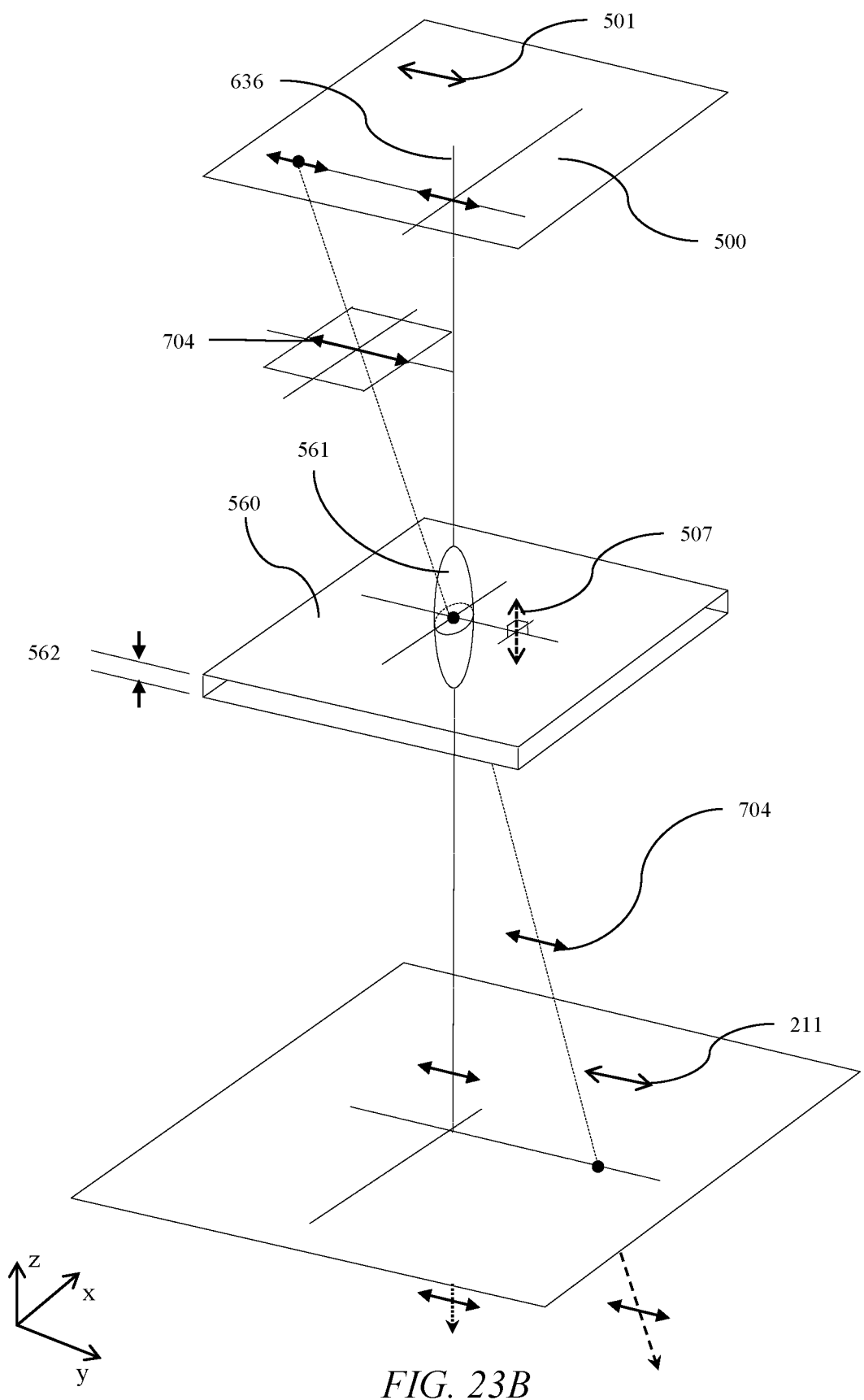
FIG. 23B is a schematic diagram illustrating in perspective view illumination of a C-plate retarder by off-axis polarised light with a negative lateral angle.

FIG. 23B is a schematic diagram illustrating in perspective view illumination of a C-plate layer by off-axis polarised light with a negative lateral angle. As with the arrangement of FIG. 23A, polarisation state 704 sees no net phase difference and is transmitted with maximum luminance. Thus, the retarder 560 introduces no phase shift to polarisation components of light passed by the polariser on the input side of the retarder 560 along an axis along a normal to the plane of the retarder 560. Accordingly, the retarder 560 does not affect the luminance of light passing through the retarder 560 and polarisers (not shown) on each side of the retarder 560. Although FIGS. 29A-C relate specifically to the retarder 560 that is passive, a similar effect is achieved by the retarders in the devices described above.

Figure 23C:
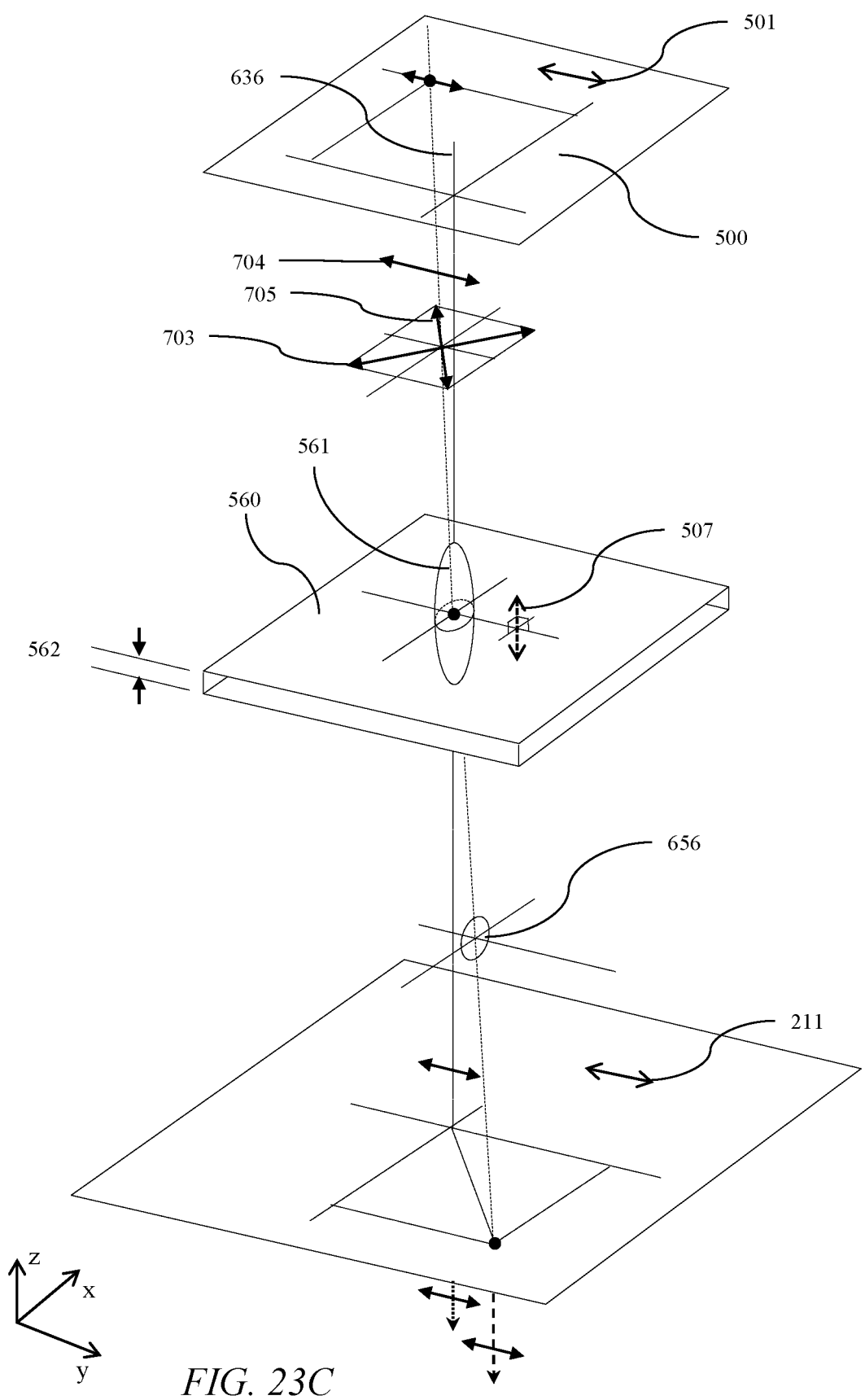
FIG. 23C is a schematic diagram illustrating in perspective view illumination of a C-plate retarder by off-axis polarised light with a positive elevation and negative lateral angle.

FIG. 23C is a schematic diagram illustrating in perspective view illumination of a C-plate layer by off-axis polarised light with a positive elevation and negative lateral angle. In comparison to the arrangement of FIGS. 23A-B, the polarisation state 704 resolves onto eigenstates 703, 705 with respect to the birefringent material 632 providing a net phase difference on transmission through the retarder 560. The resultant elliptical polarisation component 656 is transmitted through polariser 210 with reduced luminance in comparison to the rays illustrated in FIGS. 23A-B.

Figure 23D:
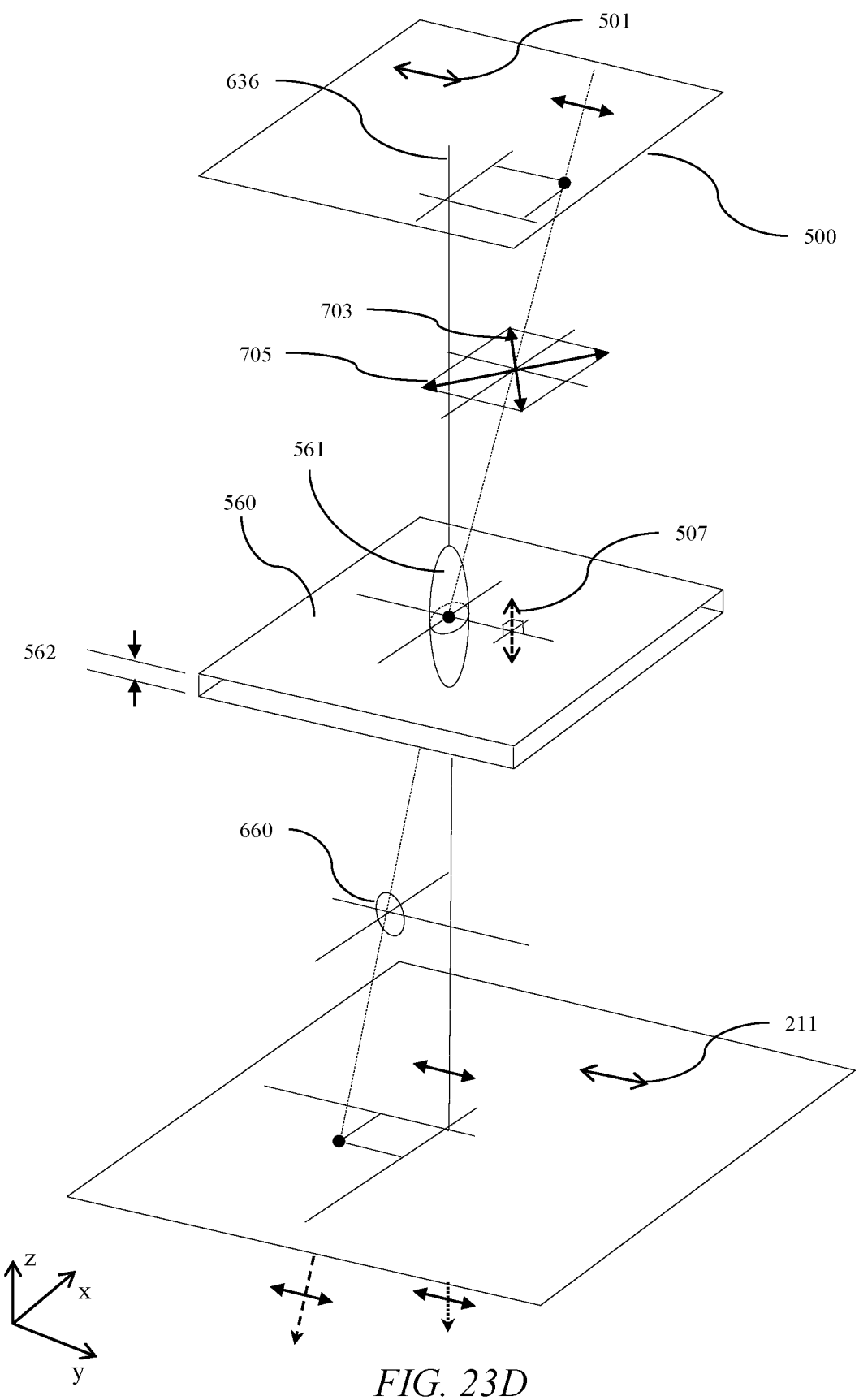
FIG. 23D is a schematic diagram illustrating in perspective view illumination of a C-plate retarder by off-axis polarised light with a positive elevation and positive lateral angle.

FIG. 23D is a schematic diagram illustrating in perspective view illumination of a C-plate layer by off-axis polarised light with a positive elevation and positive lateral angle. In a similar manner to FIG. 23C, the polarisation component 704 is resolved into eigenstates 703, 705 that undergo a net phase difference, and elliptical polarisation component 660 is provided, which after transmission through the polariser reduces the luminance of the respective off-axis ray. Thus, the retarder 560 introduces a phase shift to polarisation components of light passed by the polariser on the input side of the retarder 560 along an axis that is inclined to a normal to the plane of the retarder 560. Although FIG. 29D relates to the retarder 560 that is passive, a similar effect is achieved by the retarders described above, in a switchable state of the switchable liquid crystal retarder corresponding to the privacy mode.

Figure 24:
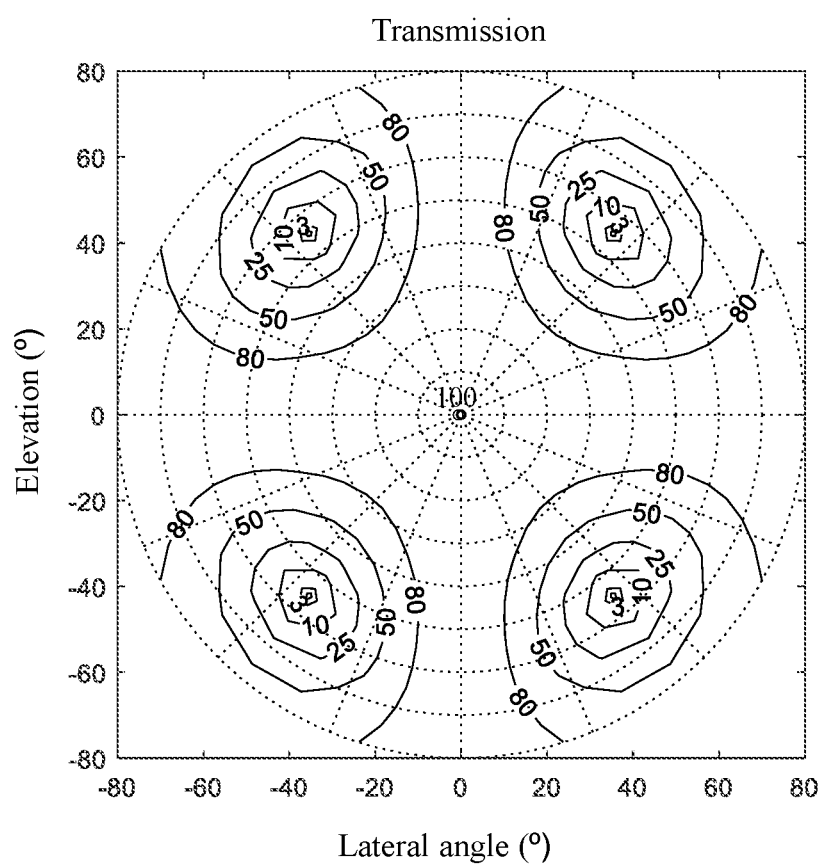
FIG. 24 is a schematic graph illustrating the variation of output transmission with polar direction for transmitted light rays in FIGS. 23A-D.

FIG. 24 is a schematic graph illustrating the variation of output transmission with polar direction for transmitted light rays in FIGS. 23A-D. Thus, the C-plate may provide luminance reduction in polar quadrants. In combination with switchable liquid crystal retarder layer 314 described elsewhere herein, (i) removal of luminance reduction of the C-plate may be provided in a first wide angle state of operation (ii) extended polar region for luminance reduction may be achieved in a second privacy state of operation.

To illustrate the off-axis behaviour of retarder stacks, the angular luminance control of crossed A-plates 308A, 308B between an additional polariser 318 and output display polariser 218 will now be described for various off-axis illumination arrangements.

Figure 25A:
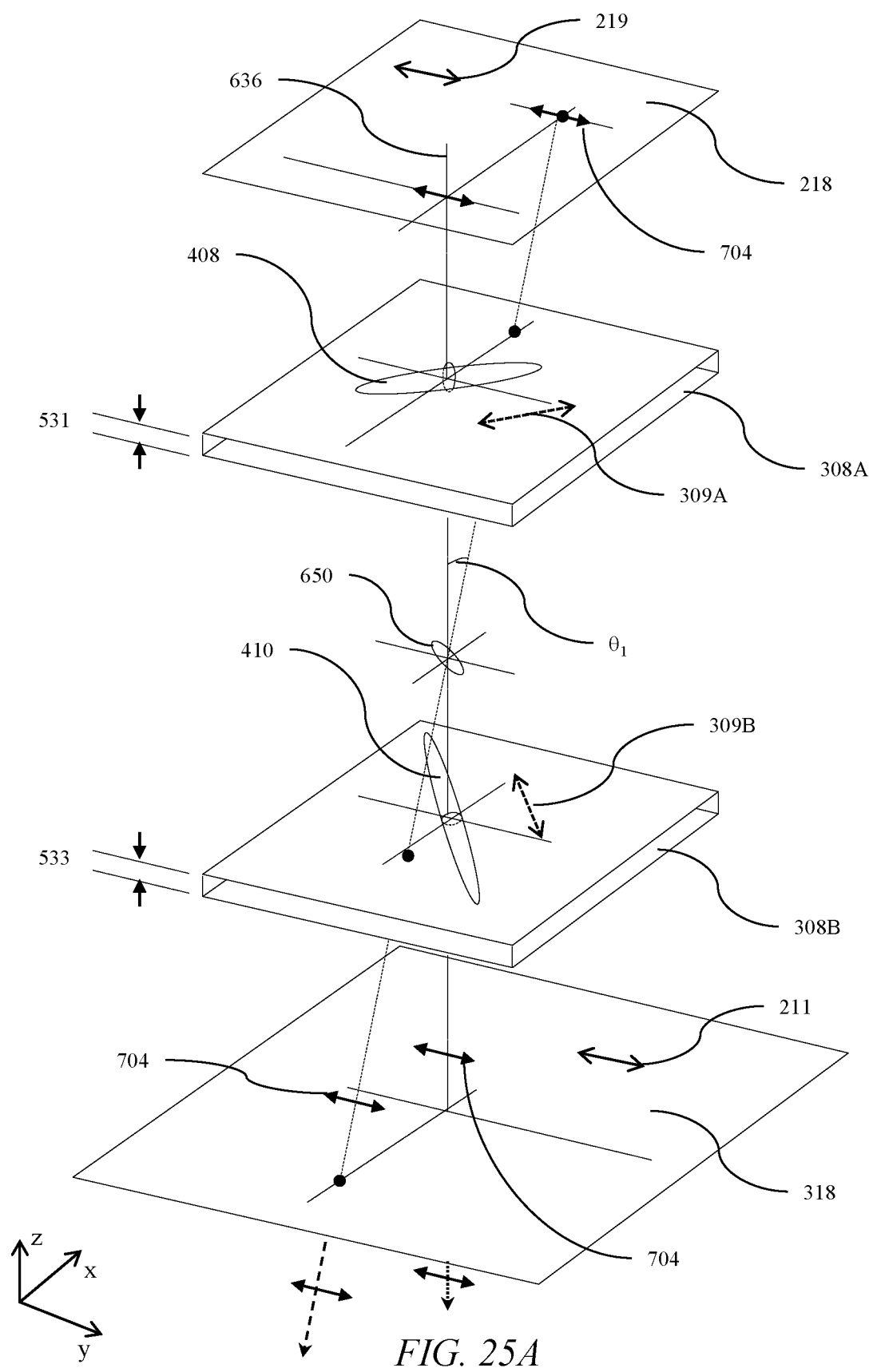
FIG. 25A is a schematic diagram illustrating in perspective view illumination of crossed A-plate retarder layers by off-axis polarised light with a positive elevation.

FIG. 25A is a schematic diagram illustrating in perspective view illumination of crossed A-plate retarder layers by off-axis polarised light with a positive elevation. Linear polariser 218 with electric vector transmission direction 219 is used to provide a linear polarisation state 704 that is parallel to the lateral direction onto first A-plate 308A of the crossed A-plates 308A, 308B. The optical axis direction 309A is inclined at +45 degrees to the lateral direction. The retardance of the retarder 308A for the off-axis angle $\theta_1$ in the positive elevation direction provides a resultant polarisation component 650 that is generally elliptical on output. Polarisation component 650 is incident onto the second A-plate 308B of the crossed A-plates 308A, 308B that has an optical axis direction 309B that is orthogonal to the optical axis direction 309A of the first A-plate 308A. In the plane of incidence of FIG. 25A, the retardance of the second A-plate 308B for the off-axis angle $\theta_1$ is equal and opposite to the retardance of the first A-plate 308A. Thus a net zero retardation is provided for the incident polarisation component 704 and the output polarisation component is the same as the input polarisation component 704.

The output polarisation component is aligned to the electric vector transmission direction of the additional polariser 318, and thus is transmitted efficiently. Advantageously substantially no losses are provided for light rays that have zero lateral angle angular component so that full transmission efficiency is achieved.

Figure 25B:
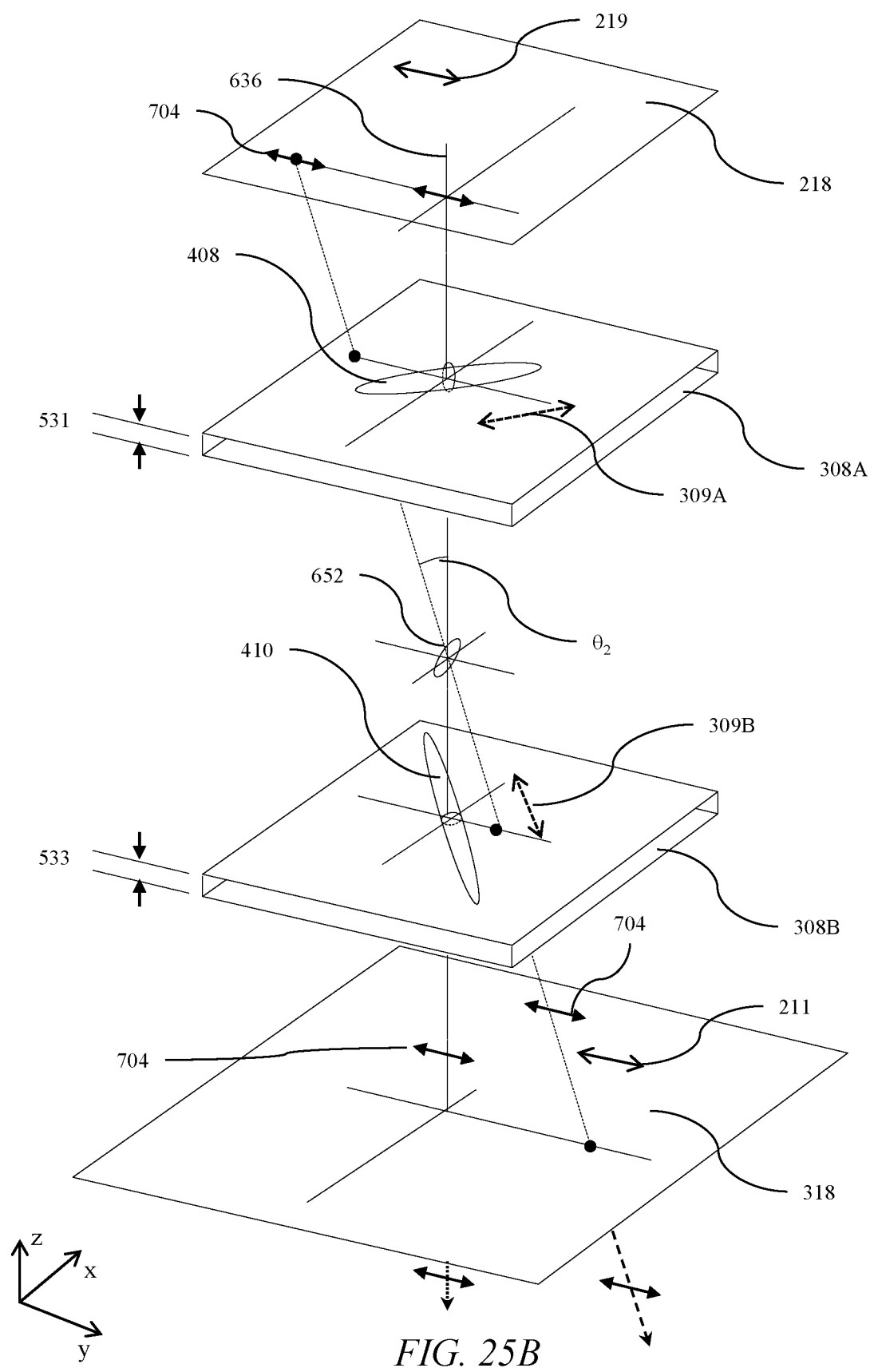
FIG. 25B is a schematic diagram illustrating in perspective view illumination of crossed A-plate retarder layers by off-axis polarised light with a negative lateral angle.

FIG. 25B is a schematic diagram illustrating in perspective view illumination of crossed A-plate retarder layers by off-axis polarised light with a negative lateral angle. Thus input polarisation component is converted by the first A-plate 308A to an intermediate polarisation component 652 that is generally an elliptical polarisation state. The second A-plate 308B again provides an equal and opposite retardation to the first A-plate so that the output polarisation component is the same as the input polarisation component 704 and light is efficiently transmitted through the polariser 318.

Thus the retarder comprises a pair of retarders 308A, 308B which have optical axes in the plane of the retarders 308A, 308B that are crossed, that is the x-y plane in the present embodiments. The pair of retarders 308A, 308B have optical axes 309A, 309B that each extend at 45 degrees with respect to an electric vector transmission direction that is parallel to the electric vector transmission of the polariser 318.

Advantageously substantially no losses are provided for light rays that have zero elevation angular component so that full transmission efficiency is achieved.

Figure 25C:
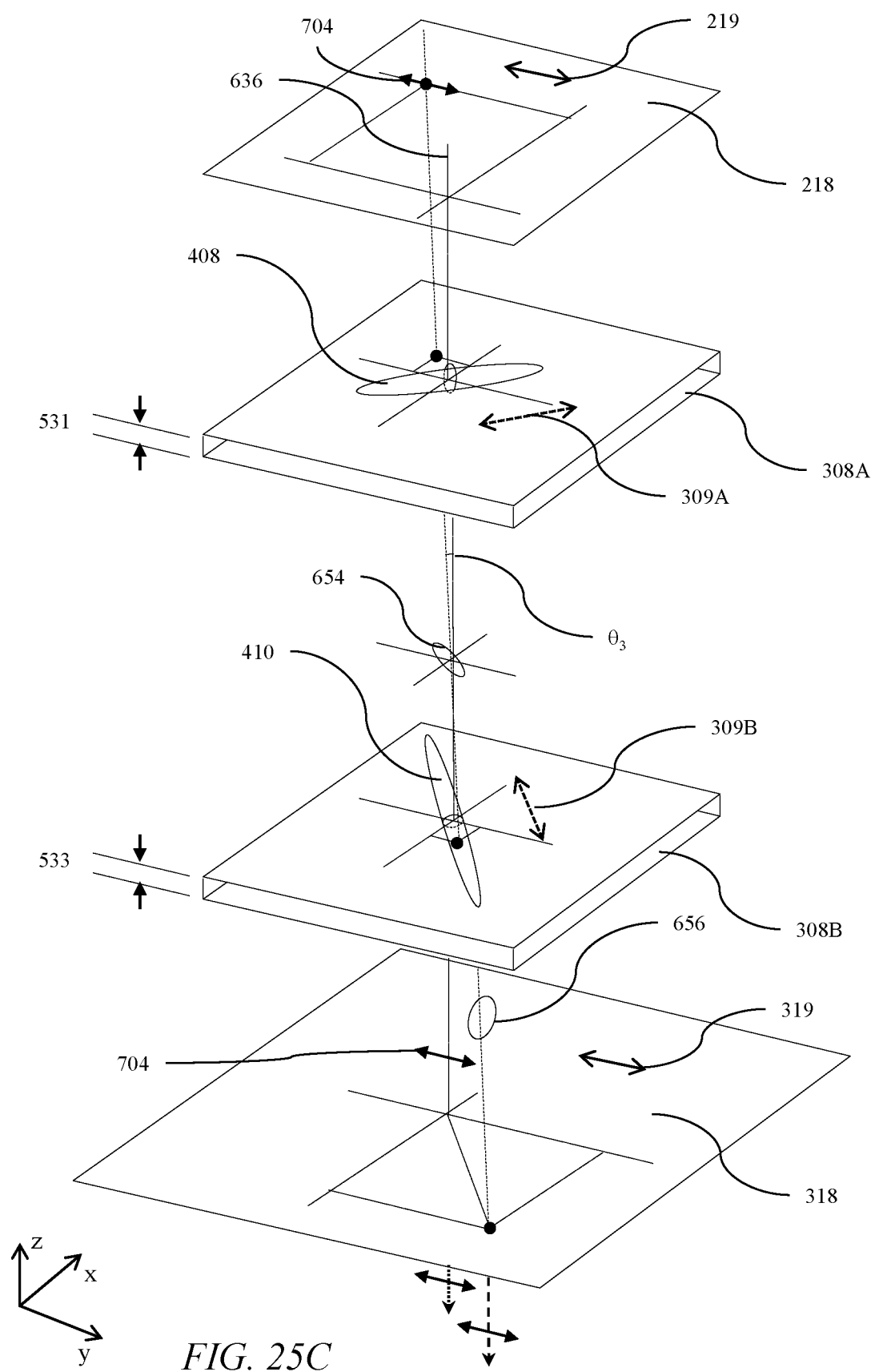
FIG. 25C is a schematic diagram illustrating in perspective view illumination of crossed A-plate retarder layers by off-axis polarised light with a positive elevation and negative lateral angle.

FIG. 25C is a schematic diagram illustrating in perspective view illumination of crossed A-plate retarder layers by off-axis polarised light with a positive elevation and negative lateral angle. Polarisation component 704 is converted to an elliptical polarisation component 654 by first A-plate 308A. A resultant elliptical component 656 is output from the second A-plate 308B. Elliptical component 656 is analysed by input polariser 318 with reduced luminance in comparison to the input luminance of the first polarisation component 704.

Figure 25D:
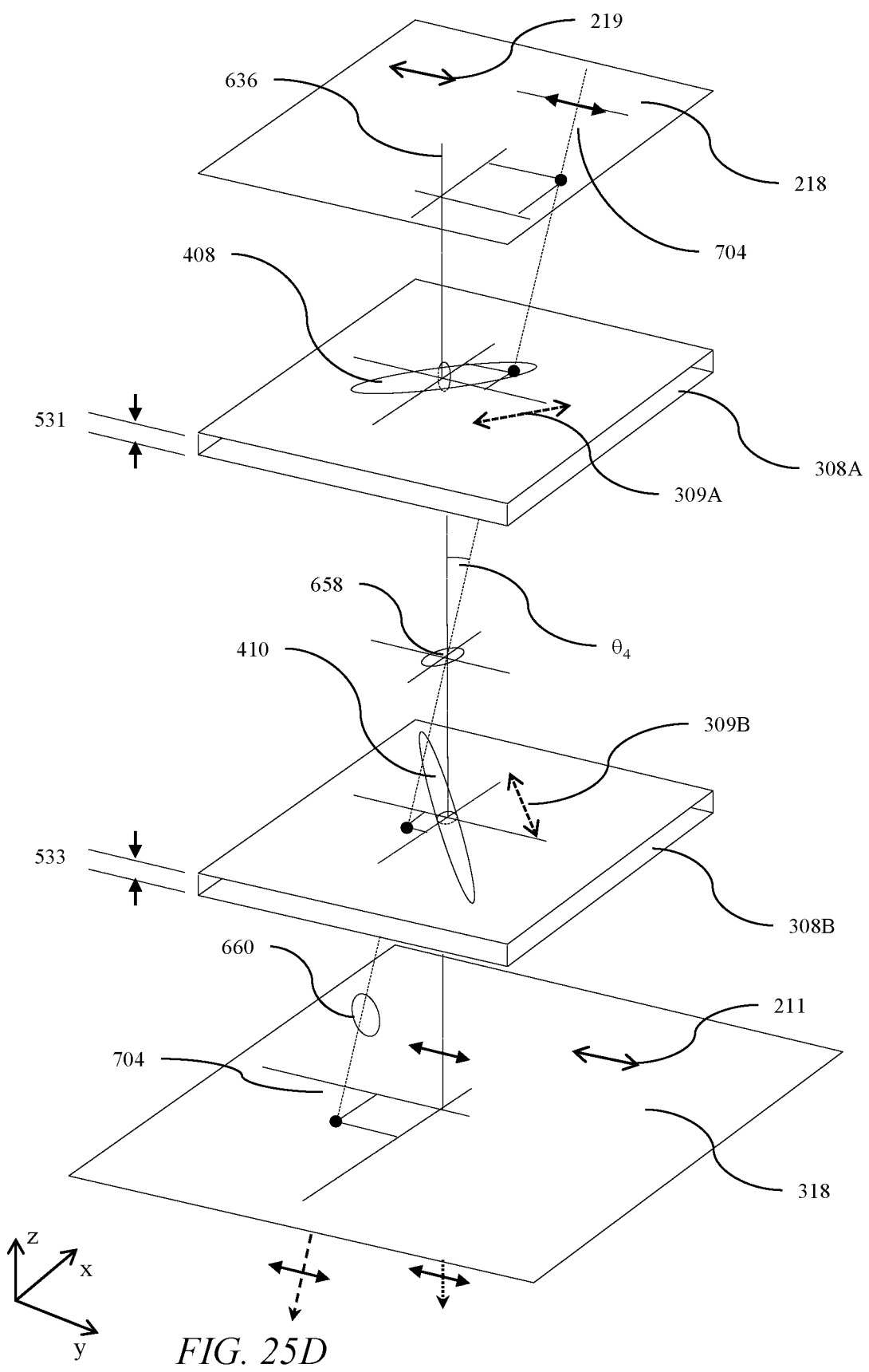
FIG. 25D is a schematic diagram illustrating in perspective view illumination of crossed A-plate retarder layers by off-axis polarised light with a positive elevation and positive lateral angle.

FIG. 25D is a schematic diagram illustrating in perspective view illumination of crossed A-plate retarder layers by off-axis polarised light with a positive elevation and positive lateral angle. Polarisation components 658 and 660 are provided by first and second A-plates 308A, 308B as net retardance of first and second retarders does not provide compensation.

Thus luminance is reduced for light rays that have non-zero lateral angle and non-zero elevation components. Advantageously display privacy can be increased for snoopers that are arranged in viewing quadrants while luminous efficiency for primary display users is not substantially reduced.

Figure 26:
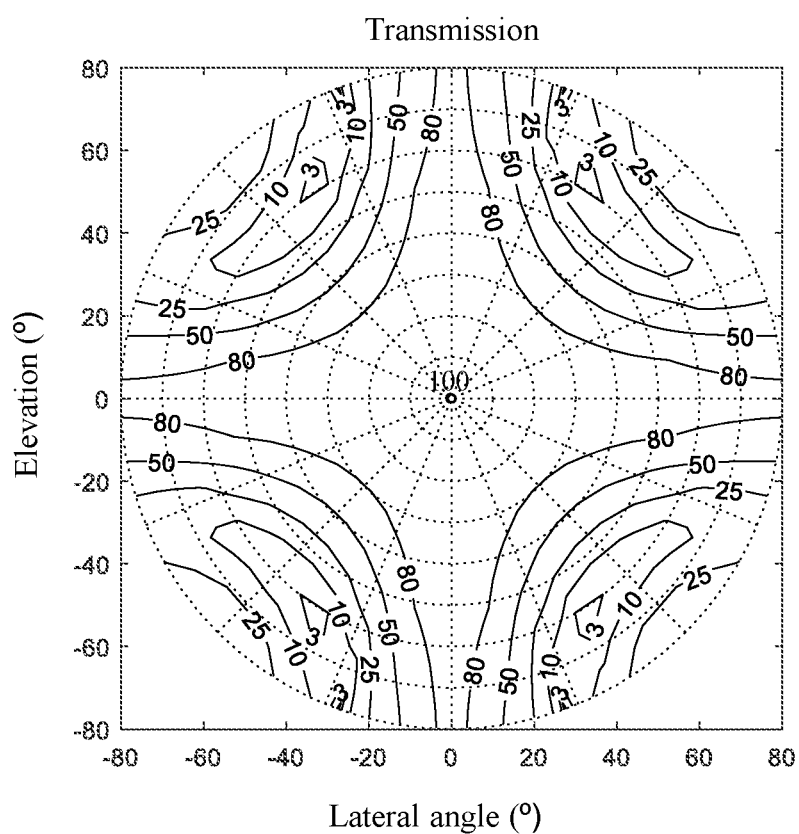
FIG. 26 is a schematic graph illustrating the variation of output transmission with polar direction for transmitted light rays in FIGS. 25A-D.

FIG. 26 is a schematic graph illustrating the variation of output transmission with polar direction for transmitted light rays in FIGS. 25A-D. In comparison to the arrangement of FIG. 24, the area of luminance reduction is increased for off-axis viewing. However, the switchable liquid crystal retarder layer 301 may provide reduced uniformity in comparison to the C-plate arrangements for off-axis viewing in the first wide mode state of operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display apparatus comprising:
   at least one spatial light modulator arranged to output light on an output side;
   a display polariser arranged on a side of each of the at least one spatial light modulator; and
   a view angle control element arranged on the same side of the at least one spatial light modulator as the display polariser of the at least one spatial light modulator,
   wherein
   the view angle control element comprises:
      an additional polariser; and
      at least one retarder arranged between the additional polariser and the display polariser of the at least one spatial light modulator,
   the at least one retarder is capable of simultaneously introducing no net relative phase shift to orthogonal polarisation components of light passed by the display polariser along an axis along a normal to the at least one retarder and introducing a relative phase shift to orthogonal polarisation components of light passed by the display polariser along an axis inclined to a normal to the at least one retarder, and
   the view angle control element is curved with a concave curvature as viewed from the output side.

2. A display apparatus according to claim 1, wherein the view angle control element is curved in a first direction and is linear in a second direction orthogonal to the first direction.

3. A display apparatus according to claim 2, wherein the display apparatus has a major axis and a minor axis and the first direction is the direction of the major axis.

4. A display apparatus according to claim 1, wherein the at least one spatial light modulator is curved with a concave curvature as viewed from the output side.

5. A display apparatus according to claim 1, comprising at least two spatial light modulators wherein the spatial light modulators are tiled.

6. A display apparatus according to claim 5, wherein at least two of the spatial light modulators are tilted with respect to each other in at least the first direction.

7. A display apparatus according to claim 1, comprising at least two view angle control elements wherein the at least two view angle control elements are arranged in series.

8. A display apparatus according to claim 1, wherein the curvature in the first direction of the at least one view angle control element is different to the curvature in the first direction of the at least one spatial light modulator.

9. A display apparatus according to claim 1, wherein the curvature of the view angle control element is greater than the curvature of the at least one spatial light modulator.

10. A display apparatus according to claim 1, further comprising a further additional polariser arranged on the output side of the at least one spatial light modulator and at least one further retarder arranged between the at least one further additional polariser and the output polariser.

11. A display apparatus according to claim 1, wherein the at least one spatial light modulator comprises an emissive spatial light modulator arranged to output light and the display polariser is an output display polariser arranged on the output side of the emissive spatial light modulator, the display polariser is an output polariser arranged on the output side of the at least one spatial light modulator, and the at least one view angle control element is arranged on the output side of the at least one spatial light modulator.

12. A display apparatus according to claim 1, wherein the at least one spatial light modulator is a transmissive spatial light modulator, and the display apparatus further comprises at least one backlight arranged to illuminate the at least one spatial light modulator.

13. A display apparatus according to claim 12, wherein the at least one backlight is curved with a concave curvature as viewed from the output side.

14. A display apparatus according to claim 12, wherein the at least one backlight comprises an optical waveguide and an array of light sources, the optical waveguide being arranged to receive light from the array of light sources.

15. A display apparatus according to claim 14, wherein a light turning film comprising a prismatic layer arranged on a prismatic layer support substrate is arranged between the optical waveguide and the at least one spatial light modulator to receive output light from the optical waveguide and direct the output light through the at least one spatial light modulator.

16. A display apparatus according to claim 15, wherein the prismatic layer is arranged between the optical waveguide and the prismatic layer support substrate.

17. A display apparatus according to claim 15, wherein the prismatic layer support substrate is arranged between the optical waveguide and the prismatic layer.

18. A display apparatus according to claim 17, further comprising a further light turning film, wherein
the prismatic surfaces on the turning film and further turning films are elongate, and
the orientation of the elongate prismatic surfaces of the turning film and further turning film are crossed.

19. A display apparatus according to claim 12, wherein the backlight provides a luminance at polar angles to the normal to the spatial light modulator greater than 45 degrees that is at most 33% of the luminance along the normal to the spatial light modulator, preferably at most 20% of the luminance along the normal to the spatial light modulator, and most preferably at most 10% of the luminance along the normal to the spatial light modulator.

20. A display apparatus according to claim 12, wherein the at least one spatial light modulator comprises plural spatial light modulators, and the at least one backlight comprises a respective backlight arranged to illuminate each spatial light modulator.

21. A display apparatus according to claim 12, wherein the at least one spatial light modulator comprises plural spatial light modulators, at least two of the spatial light modulators being illuminated by a single backlight.

22. A display apparatus according to claim 12, wherein the display polariser is an input polariser arranged on the input side of the spatial light modulator, and the at least one view angle control element is arranged on the input side of the at least one spatial light modulator between the at least one spatial light modulator and the at least one backlight.

23. A display apparatus according to claim 22, further comprising:
a further display polariser that is an output polariser arranged on the output side of the spatial light modulator,
a further additional polariser arranged on the output side of the spatial light modulator; and
at least one further retarder arranged between the at least one further additional polariser and the further display polariser.

24. A display apparatus according to claim 1, wherein the display polariser is an output polariser arranged on the output side of the spatial light modulator, and the at least one view angle control element is arranged on the output side of the at least one spatial light modulator to receive output light from the spatial light modulator.

25. A display apparatus according to claim 24, wherein a reflective polariser is arranged between the display polariser and the additional polariser.

26. A display apparatus according to claim 24, wherein
an air gap is arranged between the display polariser and the additional polariser;
the at least one retarder comprises:
an air gap input retarder comprising at least one retarder arranged between the display polariser and the air gap; and
an air gap output retarder comprising at least one retarder arranged between the air gap and the additional polariser, the air gap input retarder being arranged to provide a phase shift to provide a circularly polarised light component in the air gap of light passed by the display polariser along an axis along a normal to the plane of the air gap input retarder, and
the at least one retarder is capable of simultaneously introducing no net relative phase shift to orthogonal polarisation components of light passed by the display polariser along an axis along a normal to the plane of the at least one retarder and introducing a net relative phase shift to orthogonal polarisation components of light passed by the display polariser along an axis inclined to a normal to the plane of the at least one retarder.

27. A display apparatus according to claim 24, further comprising at least one further retarder and a further additional polariser, wherein the further additional polariser is arranged on output side of the first-mentioned additional polariser, and the at least one further retarder is arranged between the first-mentioned additional polariser and the further additional polariser.

28. A display apparatus according to claim 1, wherein the display polariser and the at least one additional polariser have electric vector transmission directions that are parallel.

29. A display apparatus according to claim 1, wherein the at least one retarder comprises a switchable liquid crystal retarder.

30. A view angle control optical element for application to a display apparatus comprising a spatial light modulator and a display polariser arranged on a side of the spatial light modulator, the view angle control optical element comprising:
an additional polariser; and at least one retarder arranged between the additional polariser and the display polariser of the at least one spatial light modulator, wherein the at least one retarder is capable of simultaneously introducing no net relative phase shift to orthogonal polarisation components of light passed by the display polariser along an axis along a normal to the at least one retarder and introducing a relative phase shift to orthogonal polarisation components of light passed by the display polariser along an axis inclined to a normal to the at least one retarder, and the view angle control element is curved with a concave curvature as viewed from the output side.

31. A view angle control optical element according to claim 30, further comprising at least one further retarder and a further additional polariser, wherein the further additional polariser is arranged on output side of the first-mentioned additional polariser, and the at least one further retarder is arranged between the first-mentioned additional polariser and the further additional polariser.

\* \* \* \* \*